(12) United States Patent
Wang et al.

(10) Patent No.: US 8,625,711 B2
(45) Date of Patent: *Jan. 7, 2014

(54) METHOD AND APPARATUS FOR ACQUIRING A PRECODING MATRIX INDICATOR AND A PRECODING MATRIX

(71) Applicant: Huawei Technologies Co., Ltd., Shenzhen (CN)

(72) Inventors: Jianguo Wang, Beijing (CN); Yongxing Zhou, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/730,044

(22) Filed: Dec. 28, 2012

(65) Prior Publication Data

US 2013/0121437 A1  May 16, 2013

Related U.S. Application Data

(63) Continuation of application No. 13/549,810, filed on Jul. 16, 2012, which is a continuation of application No. PCT/CN2011/070323, filed on Jan. 17, 2011.

(30) Foreign Application Priority Data

Jan. 16, 2010 (CN) .......................... 2010 1 0005350
Feb. 11, 2010 (CN) .......................... 2010 1 0111526

(51) Int. Cl.
*H04B 7/04* (2006.01)
(52) U.S. Cl.
USPC ....................................................... 375/295
(58) Field of Classification Search
USPC .................. 375/260, 267, 285, 295, 316; 455/68–69
See application file for complete search history.

(56) References Cited

U.S. PATENT DOCUMENTS 7,629,902 B2 * 12/2009 Zhang et al. .................. 341/106
8,213,873 B2 *  7/2012 Bergljung et al. ......... 455/67.11
(Continued)

FOREIGN PATENT DOCUMENTS

| CN | 101043298 | 9/2007 |
|----|-----------|--------|
| CN | 101146078 | 3/2008 |

(Continued)

OTHER PUBLICATIONS

*Uplink MIMO Precoding Using Differential Feedback*, 3GPP TSG RAN WG1 #46, R1-062160, Aug. 28-Sep. 1, 2006 (10 pp.).

(Continued)

*Primary Examiner* — Khanh C Tran
(74) *Attorney, Agent, or Firm* — Staas & Halsey LLP

(57) ABSTRACT

In the field of communication technologies, a method and an apparatus for acquiring a Precoding Matrix Indicator (PMI) and a Precoding Matrix (PM) are provided. The method includes: acquiring a reference PMI and a differential PMI according to a first non-differential codebook and a first diagonal differential codebook, where codewords included in the first diagonal differential codebook form a diagonal matrix. The apparatus includes a PMI acquiring module. Acquiring a reference PMI and a differential PMI according to a non-differential codebook and a diagonal differential codebook can reduce the feedback overhead or improve the feedback precision; and the fact that codewords included in the diagonal differential codebook form a diagonal matrix can maintain amplitude characteristics (for example, a constant modulus characteristic, and a finite character set constraint characteristic) of elements of the non-differential codebook or facilitate power distribution among antennas.

30 Claims, 7 Drawing Sheets

(56) References Cited

U.S. PATENT DOCUMENTS

2007/0195974 A1    8/2007  Li et al.
2009/0116570 A1*  5/2009  Bala et al. ..................... 375/260

FOREIGN PATENT DOCUMENTS

| CN | 101512929 | 8/2009 |
|---|---|---|
| WO | 2008/021396 | 2/2008 |

OTHER PUBLICATIONS

*Consideration of Differential Feedback for SU-MIMO*, 3GPP TSG-RAN WG1 RAN49, R1-072403, May 7-11, 2007 (pp. 1-2).
*Further discussion on the differential feedback of PMI for LTE Downlink Closed-loop MIMO*, 3GPP TSG-RAN Working Group 1 Meeting #50, R1-073292, Aug. 20-24, 2007, pp. 1-5.
*Binary Differential Feedback Using Existing Codebooks for E-UTRA*, 3GPP TSG RAN WG1 Meeting #51, R1-074706, Nov. 5-9, 2007 (15 pp.).
*Evaluation of CL SU and MU MIMO codebooks*, IEEE 802.16 Broadband Wireless Access Working Group, Sep. 11, 2008 (21 pp.).
*3rd Generation Partnership Project; Technical Specification Group Radio Access Network; Evolved Universal Terrestrial Radio Access (E-UTRA); Physical Channels and Modulation (Release 9)*, 3GPP TS 36.211 V9.0.0, Dec. 2009, pp. 1-85.
Li, Q. et al, *A Low Feedback Scheme for WMAN MIMO Beamforming*, WE4C-3, pp. 349-352.
Pan, J. et al., *Efficient Feedback Design for MIMO SC-FDMA Systems*, pp. 2399-2403.
*Differential PMI Feedback for overhead Reduction in LTE-A DL MIMO*, 3GPP TSG-RAN WG1 #58, R1-093453, Aug. 24-28, 2009, pp. 1-5.
Griecco, D. et al., *Uplink Single-User MIMO for 3GPP LTE* (5 PP.).
International Search Report, dated Apr. 28, 2011, in corresponding International Application No. PCT/CN2011/070323 (4 pp.).
Written Opinion of the International Searching Authority, dated Apr. 28, 2011, in corresponding International Application No. PCT/CN2011/070323 (8 pp.).
Search Report in corresponding Chinese Application No. 201010111526.9 (16 pp.).
First Office Action, dated Jul. 4, 2012, in corresponding Chinese Application No. 201010111526.9 (14 pp.).
Second Office Action, dated Sep. 26, 2012, in corresponding Chinese Application No. 201010111526.9 (14 pp.).
Extended European Search Report, dated Oct. 9, 2012, in corresponding European Application No. 11732685.0 (8 pp.).
Office Action mailed Sep. 3, 2013 in Parent U.S. Appl. No. 13/549,810 (12 pages).
U.S. Appl. No. 13/549,810, filed Jul. 16, 2012, Wang et al., Huawei Technologies Co., Ltd.

\* cited by examiner

METHOD AND APPARATUS FOR ACQUIRING A PRECODING MATRIX INDICATOR AND A PRECODING MATRIX

CROSS-REFERENCE TO RELATED APPLICATIONS

This application is a continuation of a U.S. patent application Ser. No. 13/549,810, filed on Jul. 16, 2012, which is a continuation of International Application No. PCT/CN2011/070323, filed on Jan. 17, 2011, which claims priority to Chinese Patent Application No. 201010005350.9, filed on Jan. 16, 2010 and Chinese Patent Application No. 201010111526.9, filed on Feb. 11, 2010, all of which are hereby incorporated by reference in their entireties.

FIELD OF THE INVENTION

The present invention relates to the field of communication technologies, and more particularly, to a method and an apparatus for acquiring a Precoding Matrix Indicator (PMI) and a Precoding Matrix (PM).

BACKGROUND OF THE INVENTION

With continuous development of communication technologies, for purpose of improving the performance of data transmission, a data sending end (for example, a node B (NodeB), a base station (BS), or the like) may be configured to obtain a PM according to a Precoding Matrix Indicator (PMI) fed back by a data receiving end (for example, a user equipment (UE), a mobile station (MS), or the like) and a codebook pre-stored locally so that data to be sent are pre-processed through the PM and then sent to the data receiving end. In this way, a data sending process can be adaptive to variations in channel statuses so as to improve the performance of data transmission. Therefore, how to acquire a PMI and which kind of codebook is to be used are of vital importance.

The existing Long Term Evolution Release 8 (LTE R8) system supports 4-antenna transmission and employs a single fixed codebook which is obtained based on Householder reflection. In the existing Institute of Electrical and Electronics Engineers (IEEE) 802.16m system, a non-differential codebook and a differential codebook are employed, and feedback is performed mainly in a differential mode in the following process: in each preset feedback period, the UE firstly feeds back one non-differential PMI based on the non-differential codebook and then, according to the non-differential PMI, feeds back a plurality of differential PMIs based on the differential codebook in sequence.

During implementation of the present invention, the inventor finds that at least the following problems exist in the prior art:

In the existing LTE R8 system, a single fixed codebook is employed, the sub-band feedback suffers from a high overhead, and the broadband feedback has a low precision. In the existing IEEE 802.16m system, the time-domain differential feedback is employed, and acquisition of a PM relies on historical information of the feedback, which may cause the problem of error propagation. Moreover, because of characteristics of elements in each of codewords included in the differential codebook used in the existing IEEE 802.16m system, the PM finally obtained may not have a constant modulus characteristic, and particularly, it is difficult to satisfy the finite character set (for example, 8 phase shift keying (8PSK)) constraint characteristic of each of the elements.

Furthermore, it has been found through an experiment that when, in the aforesaid differential feedback, the codebook in the LTE R8 system is directly used as the non-differential codebook and the differential codebook of the IEEE 802.16m system is employed, the overhead is high and the feedback performance is scarcely improved compared to that when only the LTE R8 codebook is used for feedback, resulting in a low efficiency per feedback bit. Therefore, it is necessary to make further research on the structure of the feedback and the codebook used for the feedback in order to improve the feedback performance of the system.

SUMMARY OF THE INVENTION

In order to further improve the feedback performance, embodiments of the present invention provide a method and an apparatus for acquiring a PMI and a PM. The technical solutions are as follows.

In one aspect, an embodiment of the present invention provides a method for acquiring a PMI, where the method includes:

acquiring a reference PMI and a differential PMI according to a first non-differential codebook and a first diagonal differential codebook, where a codeword included in the first diagonal differential codebook is a diagonal matrix.

In one aspect, an embodiment of the present invention provides a method for acquiring a PM, where the method includes:

receiving a reference PMI and a differential PMI, where the reference PMI and the differential PMI are obtained according to a first non-differential codebook and a first diagonal differential codebook and then sent by a data receiving end, and a codeword included in the first diagonal differential codebook is a diagonal matrix; and obtaining a PM by using a second non-differential codebook and a second diagonal differential codebook pre-stored locally and according to the reference PMI and the differential PMI, where the second non-differential codebook and the second diagonal differential codebook are consistent with the first non-differential codebook and the first diagonal differential codebook respectively.

In one aspect, an embodiment of the present invention provides an apparatus for acquiring a PMI, where the apparatus includes:

a PMI acquiring module, configured to acquire a reference PMI and a differential PMI according to a first non-differential codebook and a first diagonal differential codebook, where a codeword included in the first diagonal differential codebook is a diagonal matrix.

In one aspect, an embodiment of the present invention provides an apparatus for acquiring a PM, where the apparatus includes:

a PMI receiving module, configured to receive a reference PMI and a differential PMI, where the reference PMI and the differential PMI are obtained according to a first non-differential codebook and a first diagonal differential codebook and then sent by a data receiving end, and a codeword included in the first diagonal differential codebook is a diagonal matrix; and a PM acquiring module, configured to, after the reference PMI and the differential PMI are received by the PMI receiving module, obtain a PM by using a second non-differential codebook and a second diagonal differential codebook pre-stored locally and according to the reference PMI and the differential PMI, where the second non-differential codebook and the second diagonal differential codebook are consistent with the first non-differential codebook and the first diagonal differential codebook respectively.

In one aspect, an embodiment of the present invention provides a method for acquiring a PMI, where the method includes:

calculating a non-differential PMI based on a preset criterion and according to a first non-differential codebook, where codewords included in the first non-differential codebook are obtained from a rotated Hadamard matrix.

In one aspect, an embodiment of the present invention provides a method for acquiring a PM, where the method includes:

receiving a non-differential PMI, where the non-differential PMI is obtained according to a first non-differential codebook and then sent by a data receiving end, and codewords included in the first non-differential codebook are obtained from a rotated Hadamard matrix; and obtaining a PM by using a second non-differential codebook pre-stored locally and according to the non-differential PMI, where the second non-differential codebook is consistent with the first non-differential codebook.

In one aspect, an embodiment of the present invention provides an apparatus for acquiring a PMI, where the apparatus includes:

a non-differential PMI acquiring module, configured to calculate a non-differential PMI based on a preset criterion and according to a first non-differential codebook, where codewords included in the first non-differential codebook are obtained from a rotated Hadamard matrix.

In one aspect, an embodiment of the present invention provides an apparatus for acquiring a PM, where the apparatus includes:

a non-differential PMI receiving module, configured to receive a non-differential PMI, where the non-differential PMI is obtained according to a first non-differential codebook and then sent by a data receiving end, and codewords included in the first non-differential codebook are obtained from a rotated Hadamard matrix; and a non-differential PM processing module, configured to, after the non-differential PMI is received by the PMI receiving module, obtain a PM by using a second non-differential codebook pre-stored locally and according to the non-differential PMI, where the second non-differential codebook is consistent with the first non-differential codebook.

The technical solutions provided by the embodiments of the present invention have the following benefits:

acquiring a reference PMI and a differential PMI according to a non-differential codebook and a diagonal differential codebook can reduce the feedback overhead and improve the feedback precision so as to further improve the feedback performance; and the fact that a codeword included in the diagonal differential codebook is a diagonal matrix can maintain amplitude characteristics (for example, a constant modulus characteristic, and a finite character set constraint characteristic) of elements of the non-differential codebook or facilitate power distribution among antennas.

DETAILED DESCRIPTION OF THE EMBODIMENTS

Hereinafter, in order to make the objectives, technical solutions and advantages of the present invention more apparent, the present invention will be further described in detail with reference to embodiments thereof and the accompany drawings.

Embodiment 1

Figure 1:
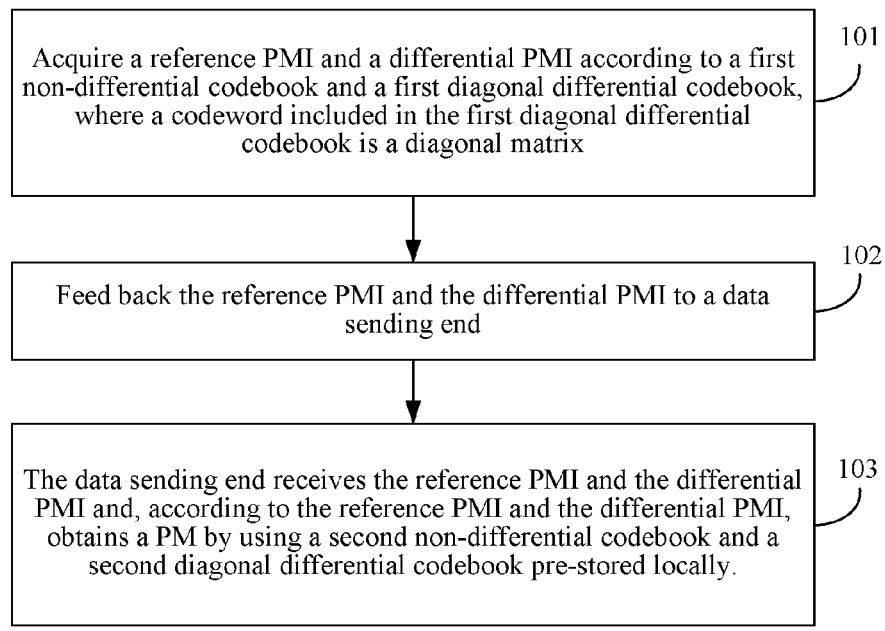
FIG. 1 is a flowchart of a method for acquiring a PMI according to Embodiment 1 of the present invention.

Referring to FIG. 1, this embodiment of the present invention provides a method for acquiring a PMI, where the method includes the following steps.

101: Acquire a reference PMI and a differential PMI according to a first non-differential codebook and a first diagonal differential codebook, where a codeword included in the first diagonal differential codebook is a diagonal matrix.

Further, the step of acquiring the reference PMI and the differential PMI according to the first non-differential codebook and the first diagonal differential codebook may include:

calculating the reference PMI based on a preset criterion and according to the first non-differential codebook; and calculating the differential PMI based on the preset criterion and according to the first non-differential codebook, the first diagonal differential codebook, and the reference PMI; or the step of acquiring the reference PMI and the differential PMI according to the first non-differential codebook and the first diagonal differential codebook may include:

calculating the reference PMI and the differential PMI based on the preset criterion and according to the first non-differential codebook and the first diagonal differential codebook.

Further, a codeword $C_k$ included in the first diagonal differential codebook has the following structure:

$$C_k = \mathrm{diag}\{e^{j\theta_{k,1}}, e^{j\theta_{k,2}}, \ldots, e^{j\theta_{k,i}}, \ldots, e^{j\theta_{k,N}}\}$$

where, k represents a differential PMI included in the first diagonal differential codebook D, k=0, 1 ... |D|−1, |D| represents the number of codewords included in the first diagonal differential codebook D, $j^2 = -1$, N represents the number of transmitting antennas and is a positive integer, $\theta_{k,i}$ represents a phase shift, and i=1, 2 ... N.

Further, the codeword $C_k$ included in the first diagonal differential codebook has the following structure:

$$C_k = \text{diag}\{e^{j0\cdot(m\theta)}, e^{j1*(m\theta)}, \ldots, e^{j(i)*(m\theta)}, \ldots, e^{j(N-1)*(m\theta)}\}$$

where, k represents a differential PMI included in the first diagonal differential codebook D, k=0, 1 ... |D|−1, |D| represents the number of codewords included in the first diagonal differential codebook D, $j^2=-1$, N represents the number of transmitting antennas and is a positive integer, i*(mθ) represents a phase shift, i=1, 2 ... N, and mθ represents a phase shift difference between adjacent transmitting antennas.

Further, when, in a dual-polarized transmitting antenna array including N transmitting antennas, the first N/2 transmitting antennas form a group of co-polarized transmitting antennas and the remaining N/2 transmitting antennas form another group of co-polarized transmitting antennas, the codeword $C_k$ included in the first diagonal differential codebook has the following structure:

$$C_k = \text{diag}\{S_m, e^{j\phi_n}S_m\}$$

where, $S_m = \text{diag}\{e^{j\theta_{m,1}}, e^{j\theta_{m,2}}, \ldots, e^{j\theta_{m,i}}, \ldots, e^{j\theta_{m,N/2}}\}$, k represents a differential PMI included in the first diagonal differential codebook D, k=0, 1 ... |D|−1, |D| represents the number of codewords included in the first diagonal differential codebook D, $j^2=-1$, N represents the number of transmitting antennas and is an even integer, $\phi_n$ and $\theta_{m,i}$ represent phase shifts, m and n are natural numbers, and i=1, 2 ..., N/2.

Further, the codeword $C_k$ included in the first diagonal differential codebook has the following structure:

$$C_k = \text{diag}\{a_{k,1}e^{j\theta_{k,1}}, a_{k,2}e^{j\theta_{k,2}}, \ldots, a_{k,i}e^{j\theta_{k,i}}, \ldots, a_{k,N}e^{j\theta_{k,N}}\}$$

where, k represents a differential PMI included in the first diagonal differential codebook D, k=0, 1 ... |D|−1, |D| represents the number of codewords included in the first diagonal differential codebook D, $j^2=-1$, N represents the number of transmitting antennas and is a positive integer, $a_{k,N}$ is a real number, $\theta_{k,i}$ represents a phase shift, and i=1, 2 ... N.

Further, a codeword $W_k^{(r)}$ included in the first non-differential codebook has the following structure:

$$W_k^{(r)} = \frac{1}{\sqrt{r}}(R_{i_k}H_{n,j_k})^{(r)}$$

where, k represents a non-differential PMI included in the first non-differential codebook $W^{(r)}$, k=0, 1 ... |$W^{(r)}$|−1, |$W^{(r)}$| represents the number of codewords included in the first non-differential codebook $W^{(r)}$, r represents a rank of the codewords included in the first non-differential codebook $W^{(r)}$, $i_k$ represents an index of a diagonal matrix $R_{i_k}$ corresponding to k, $R_{i_k}$ represents a $n^{th}$ order diagonal matrix corresponding to $i_k$, $j_k$ represents an index of a normalized Hadamard matrix corresponding to k, $H_{n,j_k}$ represents a $n^{th}$ order normalized Hadamard matrix corresponding to $j_k$, a value of n is equal to the number of the transmitting antennas, and $(R_{i_k}H_{n,j_k})^{(r)}$ represents a matrix formed by selecting r columns from a rotated Hadamard matrix $R_{i_k}H_{n,j_k}$.

It should be noted that, $R_{i_k}H_{n,j_k}$ is obtained through rotation of column vectors in $H_{n,j_k}$ by the diagonal matrix $R_{i_k}$, so it can be called as a rotated Hadamard matrix.

It should be noted that, the structure of the diagonal matrix $R_{i_k}$ may be represented as:

$$R_{i_k} = \text{diag}\{b_{i_k,1}e^{j\delta_{i_k,1}}, b_{i_k,2}e^{j\delta_{i_k,2}}, \ldots, b_{i_k,t}e^{j\delta_{i_k,t}}, \ldots, b_{i_k,n}e^{j\delta_{i_k,n}}\}$$

where, $b_{i_k,t}$ is a real number, $\delta_{i_k,t}$ represents a phase shift, $j^2=-1$, t=1, 2, ..., n, and a value of n is equal to the number of the transmitting antennas.

It should be noted that, in the step of forming the matrix $(R_{i_k}H_{n,j_k})^{(r)}$ by selecting r columns from the rotated Hadamard matrix $R_{i_k}H_{n,j_k}$ which r columns are selected may be determined by using a correlation method depending on actual applications. For example, for uncorrelated channels, the columns should be selected in such a way that in a set $\{(R_{i_k}H_{n,j_k})^{(r)}\}$ formed by extracting one r-column sub-matrix from each matrix $R_{i_k}H_{n,j_k}$, each of matrixes has a maximum chordal distance; and for correlated channels, the columns should be selected in such a way that in a set $\{(R_{i_k}H_{n,j_k})^{(r)}\}$ formed by extracting one r-column sub-matrix from each matrix $R_{i_k}H_{n,j_k}$, each of matrixes has a maximum gain in a zero direction of a spatial projection of the antenna array. Any other feasible method may also be employed for selection, and no limitation is made thereon.

Further, the codeword $W_k^{(r)}$ included in the first non-differential codebook may have the following structure:

$$W_k^{(r)} = \frac{1}{\sqrt{r}}(R_{i_k}H_{n,j_k}R_{i_k}^H)^{(r)}$$

where, k represents a PMI included in the first non-differential codebook $W^{(r)}$, k=0, 1 ... |$W^{(r)}$|−1, |$W^{(r)}$| represents the number of codewords included in the first non-differential codebook $W^{(r)}$, r represents a rank of the codewords included in the first non-differential codebook $W^{(r)}$, $i_k$ represents an index of a diagonal matrix $R_{i_k}$ corresponding to k, $R_{i_k}$ represents a $n^{th}$ order diagonal matrix corresponding to $i_k$, $j_k$ represents an index of a normalized Hadamard matrix corresponding to k, $H_{n,j_k}$ represents a $n^{th}$ order normalized Hadamard matrix corresponding to $j_k$, a value of n is equal to the number of the transmitting antennas, and $(R_{i_k}H_{n,j_k}R_{i_k}^H)^{(r)}$ represents a matrix formed by selecting r columns from a rotated Hadamard matrix $R_{i_k}H_{n,j_k}R_{i_k}^H$.

It should be noted that, $R_{i_k}H_{n,j_k}R_{i_k}^H$ is obtained through rotation of column vectors in by the diagonal matrix $R_{i_k}$, so $R_{i_k}H_{n,j_k}R_{i_k}^H$ is also a rotated Hadamard matrix.

It should be noted that, the structure of the diagonal matrix $R_{i_k}$ may be represented as:

$$R_{i_k} = \text{diag}\{b_{i_k,1}e^{j\delta_{i_k,1}}, b_{i_k,2}e^{j\delta_{i_k,2}}, \ldots, b_{i_k,t}e^{j\delta_{i_k,t}}, \ldots, b_{i_k,n}e^{j\delta_{i_k,n}}\}$$

where, $b_{i_k,t}$ is a real number, $\delta_{i_k,t}$ represents a phase shift, $j^2=-1$, t=1, 2, ..., n, and a value of n is equal to the number of the transmitting antennas.

It should be noted that, in the step of forming the matrix $(R_{i_k}H_{n,j_k}R_{i_k}^H)^{(r)}$ by selecting r columns from the rotated Hadamard matrix $R_{i_k}H_{n,j_k}R_{i_k}^H$, which r columns are selected may be determined by using a correlation method depending on actual applications. For example, for uncorrelated channels, the columns should be selected in such a way that in a set $\{(R_{i_k}H_{n,j_k}R_{i_k}^H)^{(r)}\}$ formed by extracting one r-column sub-matrix from each matrix $R_{i_k}H_{n,j_k}R_{i_k}^H$, each of matrixes has a maximum chordal distance; and for correlated channels, columns should be selected in such a way that in a set $\{(R_{i_k}H_{n,j_k}R_{i_k}^H)^{(r)}\}$ formed by extracting one r-column sub-matrix from each matrix $R_{i_k}H_{n,j_k}R_{i_k}{}^H$, each of matrixes has a maximum gain in a zero direction of a spatial projection of the antenna array. Any other feasible method may also be employed for selection, and no limitation is made thereon.

Further, referring to FIG. 1, after acquiring the reference PMI and the differential PMI, the method may further include the following steps.

102: Feed back the reference PMI and the differential PMI to a data sending end; and

103: The data sending end receives the reference PMI and the differential PMI and, according to the reference PMI and the differential PMI, obtains a PM by using a second non-differential codebook and a second diagonal differential codebook pre-stored locally.

The second non-differential codebook and the second diagonal differential codebook are consistent with the first non-differential codebook and the first diagonal differential codebook respectively.

Further, the first non-differential codebook is a first basic codebook, and the first diagonal differential codebook is a first transformed codebook.

Further, the second non-differential codebook is a second basic codebook, and the second diagonal differential codebook is a second transformed codebook.

In the method for acquiring a PMI according to the embodiment of the present invention, acquiring a reference PMI and a differential PMI can reduce the feedback overhead and improve the feedback precision so as to further improve the feedback performance; and the fact that a codeword included in the diagonal differential codebook is a diagonal matrix can maintain amplitude characteristics (for example, a constant modulus characteristic and a finite character set constraint characteristic) of elements already existing in the non-differential codebook or facilitate power distribution among antennas. Moreover, a non-differential codebook obtained from a rotated Hadamard matrix may be used. Individual columns of the Hadamard matrix may be matched with eigenvectors of strongly correlated channels and weakly correlated channels in a uniform linear array transmitting antenna arrangement and a dual-polarized transmitting antenna arrangement respectively so as to improve the accuracy of quantization. The rotated matrix is in the form of a diagonal matrix, and this can maintain a fine quantization of the space on basis of the quantization of the Hadamard matrix. Furthermore, each of elements of the Hadamard matrix is +1 or −1, which can satisfy the constant modulus characteristic; and multiplication of the Hadamard matrix with other matrixes or vectors may be simplified into addition or subtraction operations, which can significantly reduce the computational complexity of channel quality indicator (CQI) calculation based on a signal to interference noise ratio (SINR), PMI selection, and rank adaptation. The individual columns of the Hadamard matrix are orthogonal to each other, and this can maintain, after normalization, the unitary matrix characteristic of codewords in the non-differential codebook so that individual transmitted spatial streams are guaranteed to have the same power distribution and, in case of a full rank, individual transmitting antennas have the same power distribution. Additionally, the approach to obtain a non-differential codebook from a rotated Hadamard matrix may be applied to cases where the number of transmitting antennas is 2, 4, 8, 16, 32, 64 or the like, and the obtained non-differential codebook may satisfy the constant modulus characteristic and the unitary matrix characteristic and reduce the computational complexity of CQI calculation based on the SINR, PMI selection and rank adaptation.

Embodiment 2

Figure 2:
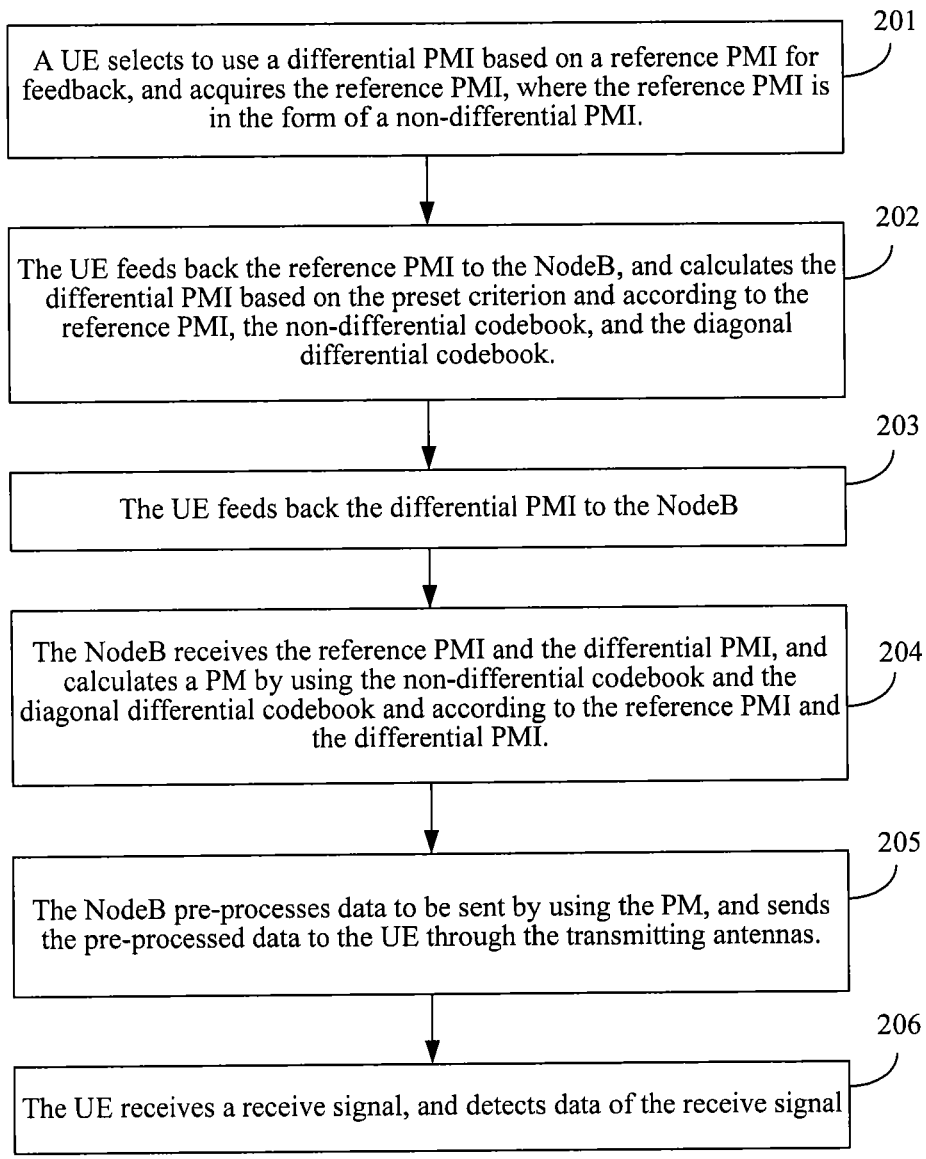
FIG. 2 is a flowchart of a method for acquiring a PMI according to Embodiment 2 of the present invention.

Referring to FIG. 2, this embodiment of the present invention provides a method for acquiring a PMI, where the method includes the following steps.

201: A UE selects to use a differential PMI based on a reference PMI for feedback, and acquires the reference PMI.

The reference PMI may be a non-differential PMI lately fed back by the UE and, particularly, a non-differential broadband PMI or a non-differential sub-band PMI, which may be selected depending on actual applications.

In the embodiment of the present invention, the reference PMI is in the form of a non-differential PMI. The reference PMI may at least be obtained in either of the following two ways: 1) calculating the reference PMI as n (may be marked as the reference PMI n) based on a preset criterion and according to a non-differential codebook, as shown in Equation (1):

$$n = \operatorname*{argmax}_{i=0,1 \ldots |W^{(r)}|-1, W_i \in W^{(r)}} f(W_i) \qquad (1)$$

where, $|W^{(r)}|$ represents the size of the non-differential codebook $W^{(r)}$, that is, the number of codewords included in the non-differential codebook $W^{(r)}$; r represents a rank of the codewords included in the non-differential codebook $W^{(r)}$; $W_i$ represents a codeword in the non-differential codebook $W^{(r)}$ corresponding to a reference PMI i; and $f(W_i)$ represents an objective function corresponding to the preset criterion.

It should be noted that, the aforesaid preset criterion may be a throughput maximization criterion, and the objective function corresponding to this criterion may be a throughput maximization function, which may be achieved based on information capacity calculation or based on mutual information or variants of mutual information (for example, weighting of mutual information). Furthermore, the aforesaid preset criterion may also be a chordal-distance maximization criterion. Of course, the objective function corresponding to the preset criterion may further be set flexibly depending on actual applications, and no limitation is made thereon. The preset criterion(s) described elsewhere is similar to that described here, so no further description will be made thereon.

Specifically, the non-differential codebook $W^{(r)}$ may be a non-differential codebook set according to the embodiment of the present invention. The codewords in the non-differential codebook $W^{(r)}$ are obtained from a rotated Hadamard matrix, and specifically, a codeword $W_k^{(r)}$ included in the non-differential codebook $W^{(r)}$ may have the following structure:

$$W_k^{(r)} = \frac{1}{\sqrt{r}}(R_{i_k} H_{n,j_k})^{(r)}$$

where, k represents a non-differential PMI included in the non-differential codebook $W^{(r)}$, k=0, 1 . . . $|W^{(r)}|-1$, $|W^{(r)}|$ represents the number of codewords included in the non-differential codebook $W^{(r)}$, r represents a rank of the codewords included in the non-differential codebook, $i_k$ represents an index of a diagonal matrix $R_{i_k}$ corresponding to k, $R_{i_k}$ represents a $n^{th}$ order diagonal matrix corresponding to $i_k$, $j_k$ represents an index of a normalized Hadamard matrix corresponding to k, $H_{n,j_k}$ represents a $n^{th}$ order normalized Hadamard matrix corresponding to $j_k$, a value of n is equal to the number of transmitting antennas, and $(R_{i_k}H_{n,j_k})^{(r)}$ represents a matrix formed by selecting r columns from a rotated Hadamard matrix $R_{i_k}H_{n,j_k}$.

It should be noted that, the structure of the diagonal matrix $R_{i_k}$ may be represented as:

$$R_{i_k} = diag\{b_{i_k,1}e^{j\delta_{i_k,1}}, b_{i_k,2}e^{j\delta_{i_k,2}}, \ldots, b_{i_k,t}e^{j\delta_{i_k,t}}, \ldots, b_{i_k,n}e^{j\delta_{i_k,n}}\}$$

where, $b_{i_k,t}$ is a real number, $\delta_{i_k,t}$ represents a phase shift, $j^2=-1$, $t=1, 2, \ldots, n$, and a value of n is equal to the number of transmitting antennas.

It should be noted that, in the step of forming the matrix $(R_{i_k}H_{n,j_k})^{(r)}$ by selecting r columns from the rotated Hadamard matrix $R_{i_k}H_{n,j_k}$, which r columns are selected may be determined by using a correlation method depending on actual applications. For example, for uncorrelated channels, the columns should be selected in such a way that in a set $\{(R_{i_k}H_{n,j_k})^{(r)}\}$ formed by extracting one r-column sub-matrix from each matrix $R_{i_k}H_{n,j_k}$, each of matrixes has a maximum chordal distance; and for correlated channels, the columns should be selected in such a way that in a set $\{(R_{i_k}H_{n,j_k})^{(r)}\}$ formed by extracting one r-column sub-matrix from each matrix $R_{i_k}H_{n,j_k}$, matrixes has a maximum gain in a zero direction of a spatial projection of an antenna array. Any other feasible method may also be employed for selection, and no limitation is made thereon. For example, for a 4-bit 8-antenna non-differential codebook, the codeword is $$W_k^{(r)} = \frac{1}{\sqrt{r}}(R_{i_k}H_{8,j_k})^{(r)},$$

where: $i_k=0, 1, 2, 3$, it is supposed that $k=j_k*4+i_k$ (it should be noted that, the present invention is not limited to this form, and any other feasible form may be adopted depending on actual applications; for example, it may also be supposed that $k=i_k*4+j_k$), and $r=1, 2 \ldots 8$. For example, when $r=1$, $W_k^{(1)}=(R_{i_k}H_{8,j_k})^{(1)}$, where $(R_{i_k}H_{8,j_k})^{(1)}$ represents an operation of taking one of the columns (for example, the first column) of $R_{i_k}H_{8,j_k}$. Cases where $r=2, 3 \ldots 8$ are similar to the case where $r=1$, so no further description will be made thereon. $H_{8,0}$, $H_{8,1}$, $H_{8,2}$ and $H_{8,3}$ are as follows:

$$H_{8,0} = \frac{1}{\sqrt{8}}\begin{bmatrix} 1 & 1 & 1 & 1 & 1 & 1 & 1 & 1 \\ 1 & -1 & 1 & -1 & 1 & -1 & 1 & -1 \\ 1 & 1 & 1 & 1 & -1 & -1 & -1 & -1 \\ 1 & -1 & 1 & -1 & -1 & 1 & -1 & 1 \\ 1 & 1 & -1 & -1 & 1 & 1 & -1 & -1 \\ 1 & -1 & -1 & 1 & 1 & -1 & -1 & 1 \\ 1 & 1 & -1 & -1 & -1 & -1 & 1 & 1 \\ 1 & -1 & -1 & 1 & -1 & 1 & 1 & -1 \end{bmatrix},$$

$$H_{8,1} = \frac{1}{\sqrt{8}}\begin{bmatrix} 1 & 1 & -1 & -1 & 1 & 1 & -1 & -1 \\ 1 & -1 & -1 & 1 & 1 & -1 & -1 & 1 \\ -1 & -1 & 1 & 1 & 1 & 1 & -1 & -1 \\ -1 & 1 & 1 & -1 & 1 & -1 & -1 & 1 \\ 1 & 1 & 1 & 1 & 1 & 1 & 1 & 1 \\ 1 & -1 & 1 & -1 & 1 & -1 & 1 & -1 \\ -1 & -1 & -1 & -1 & 1 & 1 & 1 & 1 \\ -1 & 1 & -1 & 1 & 1 & -1 & 1 & -1 \end{bmatrix}$$

$$H_{8,2} = \frac{1}{\sqrt{8}}\begin{bmatrix} 1 & 1 & 1 & 1 & -1 & -1 & -1 & -1 \\ 1 & -1 & 1 & -1 & -1 & 1 & -1 & 1 \\ 1 & 1 & 1 & 1 & 1 & 1 & 1 & 1 \\ 1 & -1 & 1 & -1 & 1 & -1 & 1 & -1 \\ -1 & -1 & 1 & 1 & 1 & 1 & -1 & -1 \\ -1 & 1 & 1 & -1 & 1 & -1 & -1 & 1 \\ -1 & -1 & 1 & 1 & -1 & -1 & 1 & 1 \\ -1 & 1 & 1 & -1 & -1 & 1 & 1 & -1 \end{bmatrix},$$

$$H_{8,3} = \frac{1}{\sqrt{8}}\begin{bmatrix} 1 & 1 & -1 & -1 & -1 & -1 & 1 & 1 \\ 1 & -1 & -1 & 1 & -1 & 1 & 1 & -1 \\ -1 & -1 & 1 & 1 & -1 & -1 & 1 & 1 \\ -1 & 1 & 1 & 1 & -1 & 1 & 1 & -1 \\ -1 & -1 & -1 & -1 & 1 & 1 & 1 & 1 \\ -1 & 1 & -1 & 1 & 1 & -1 & 1 & -1 \\ 1 & 1 & 1 & 1 & 1 & 1 & 1 & 1 \\ 1 & -1 & 1 & -1 & 1 & -1 & 1 & -1 \end{bmatrix}$$

Diagonal elements of $R_{i_k}$ may be selected to be consistent with 8-point Discrete Fourier Transformation (DFT) vectors, which are as follows:

$$R_0 = diag\{1, 1, 1, 1, 1, 1, 1, 1\},$$

$$R_1 = diag\{1, j, -1, -j, 1, j, -1, -j\},$$

$$R_2 = diag\{1, e^{j\frac{\pi}{4}}, e^{j\frac{2\pi}{4}}, e^{j\frac{3\pi}{4}}, -1, -e^{j\frac{\pi}{4}}, -e^{j\frac{2\pi}{4}}, -e^{j\frac{3\pi}{4}}\}, \text{ and}$$

$$R_3 = diag\{1, e^{-j\frac{\pi}{4}}, e^{-j\frac{2\pi}{4}}, e^{-j\frac{3\pi}{4}}, -1, -e^{-j\frac{\pi}{4}}, -e^{-j\frac{2\pi}{4}}, -e^{-j\frac{3\pi}{4}}\}.$$

Additionally, a full-rank precoding codebook may be given as shown in Table 1 or Table 2 below.

TABLE 1

| Diagonal rotation matrix $R_i$ | Normalized Hadamard matrix | | | |
|---|---|---|---|---|
| | $H_{8,0}$ | $H_{8,1}$ | $H_{8,2}$ | $H_{8,3}$ |
| diag $\{1, 1, 1, 1, 1, 1, 1, 1\}$ | $W_0^{(8)}$ | $W_2^{(8)}$ | $W_8^{(8)}$ | $W_{10}^{(8)}$ |
| diag$\{1, e^{j\frac{\pi}{4}}, e^{j\frac{2\pi}{4}}, e^{j\frac{3\pi}{4}}, e^{j\frac{4\pi}{4}}, e^{j\frac{5\pi}{4}}, e^{j\frac{6\pi}{4}}, e^{j\frac{7\pi}{4}}\}$ | $W_4^{(8)}$ | $W_6^{(8)}$ | | |

TABLE 1-continued

| Diagonal rotation matrix $R_i$ | Normalized Hadamard matrix | | | |
|---|---|---|---|---|
| | $H_{8,0}$ | $H_{8,1}$ | $H_{8,2}$ | $H_{8,3}$ |
| $diag\{1, e^{j\frac{\pi}{2}}, e^{j\frac{2\pi}{2}}, e^{j\frac{3\pi}{2}}, e^{j\frac{4\pi}{2}}, e^{j\frac{5\pi}{2}}, e^{j\frac{6\pi}{2}}, e^{j\frac{7\pi}{2}}\}$ | $W_1^{(8)}$ | $W_3^{(8)}$ | $W_9^{(8)}$ | $W_{11}^{(8)}$ |
| $diag\{1, e^{j\frac{3\pi}{4}}, e^{j\frac{6\pi}{4}}, e^{j\frac{9\pi}{4}}, e^{j\frac{12\pi}{4}}, e^{j\frac{15\pi}{4}}, e^{j\frac{18\pi}{4}}, e^{j\frac{21\pi}{4}}\}$ | $W_5^{(8)}$ | $W_7^{(8)}$ | | |
| $diag\{1, 1, 1, -1, 1, 1, 1, -1\}$ | $W_{12}^{(8)}$ | $W_{14}^{(8)}$ | $W_{13}^{(8)}$ | $W_{15}^{(8)}$ | or

TABLE 2

| Diagonal rotation matrix $R_i$ | Normalized Hadamard matrix | | | |
|---|---|---|---|---|
| | $H_{8,0}$ | $H_{8,1}$ | $H_{8,2}$ | $H_{8,3}$ |
| $diag\{1, 1, 1, 1, 1, 1, 1, 1\}$ | $W_0^{(8)}$ | $W_2^{(8)}$ | $W_8^{(8)}$ | $W_{10}^{(8)}$ |
| $diag\{1, e^{j\frac{\pi}{4}}, e^{j\frac{2\pi}{4}}, e^{j\frac{3\pi}{4}}, e^{j\frac{4\pi}{4}}, e^{j\frac{5\pi}{4}}, e^{j\frac{6\pi}{4}}, e^{j\frac{7\pi}{4}}\}$ | $W_4^{(8)}$ | $W_6^{(8)}$ | $W_{12}^{(8)}$ | $W_{14}^{(8)}$ |
| $diag\{1, e^{j\frac{\pi}{2}}, e^{j\frac{2\pi}{2}}, e^{j\frac{3\pi}{2}}, e^{j\frac{4\pi}{2}}, e^{j\frac{5\pi}{2}}, e^{j\frac{6\pi}{2}}, e^{j\frac{7\pi}{2}}\}$ | $W_1^{(8)}$ | $W_3^{(8)}$ | $W_9^{(8)}$ | $W_{11}^{(8)}$ |
| $diag\{1, e^{j\frac{3\pi}{4}}, e^{j\frac{6\pi}{4}}, e^{j\frac{9\pi}{4}}, e^{j\frac{12\pi}{4}}, e^{j\frac{15\pi}{4}}, e^{j\frac{18\pi}{4}}, e^{j\frac{21\pi}{4}}\}$ | $W_5^{(8)}$ | $W_7^{(8)}$ | $W_{13}^{(8)}$ | $W_{15}^{(8)}$ |

Under the condition that a nested characteristic is met, other low-rank precoding codebooks can be derived from the aforesaid full-rank precoding codebook.

Specifically, the codeword $W_k^{(r)}$ included in the non-differential codebook may have the following structure:

$$W_k^{(r)} = \frac{1}{\sqrt{r}}(R_{i_k} H_{n,j_k} R_{i_k}^H)^{(r)}$$

where, k represents a PMI included in the non-differential codebook $W^{(r)}$, k=0, 1 . . . $|W^{(r)}|$−1, $|W^{(r)}|$ represents the number of codewords included in the non-differential codebook $W^{(r)}$, r represents a rank of the codewords included in the non-differential codebook $W^{(r)}$, $i_k$ represents an index of a diagonal matrix $R_{i_k}$ corresponding to k, $R_{i_k}$ represents a $n^{th}$ order diagonal matrix corresponding to $i_k$, $j_k$ represents an index of a normalized Hadamard matrix corresponding to k, $H_{n,j_k}$ represents a $n^{th}$ order normalized Hadamard matrix corresponding to $j_k$, a value of n is equal to the number of transmitting antennas, and $(R_{i_k} H_{n,j_k} R_{i_k}^H)^{(r)}$ represents a matrix formed by selecting r columns from a rotated Hadamard matrix $R_{i_k} H_{n,j_k} R_{i_k}^H$.

It should be noted that, the structure of the diagonal matrix $R_{i_k}$ may be represented as:

$$R_{i_k} = diag\{b_{i_k,1} e^{j\delta_{i_k,1}}, b_{i_k,2} e^{j\delta_{i_k,2}}, \ldots, b_{i_k,t} e^{j\delta_{i_k,t}}, \ldots, b_{i_k,n} e^{j\delta_{i_k,n}}\}$$

where, $b_{i_k,t}$ is a real number, $\delta_{i_k,t}$ represents a phase shift, $j^2$=−1, t=1, 2, . . . , n, and a value of n is equal to the number of transmitting antennas.

It should be noted that, in the step of forming the matrix $(R_{i_k} H_{n,j_k} R_{i_k}^H)^{(r)}$ by selecting r columns from the rotated Hadamard matrix $R_{i_k} H_{n,j_k} R_{i_k}^H$, which r columns are selected may be determined by using a correlation method depending on actual applications. For example, for uncorrelated channels, the columns should be selected in such a way that in a set $\{(R_{i_k} H_{n,j_k} R_{i_k}^H)^{(r)}\}$ formed by extracting one r-column sub-matrix from each matrix $R_{i_k} H_{n,j_k} R_{i_k}^H$, each of matrixes has a maximum chordal distance; and for correlated channels, the columns should be selected in such a way that in a set $\{(R_{i_k} H_{n,j_k} R_{i_k}^H)^{(r)}\}$ formed by extracting one r-column sub-matrix from each matrix $R_{i_k} H_{n,j_k} R_{i_k}^H$, each of matrixes has a maximum gain in a zero direction of a spatial projection of an antenna array. Any other feasible method may also be employed for selection, and no limitation is made thereon.

For example, for a 4-bit 8-antenna non-differential codebook, the codeword is $$W_k^{(r)} = \frac{1}{\sqrt{r}}(R_{i_k} H_{8,j_k} R_{i_k}^H)^{(r)},$$

where: $i_k$=0, 1, 2, 3, it is supposed that k=$j_k$*4+$i_k$ (it should be noted that, the present invention is not limited to this form, and any other feasible form may be adopted depending on actual applications; for example, it may also be supposed that k=$i_k$*4+$j_k$), and r=1, 2 . . . 8. When r=1, $W_k^{(1)}$=$(R_{i_k} H_{8,j_k} R_{i_k}^H)^{(1)}$, where $(R_{i_k} H_{8,j_k} R_{i_k}^H)^{(1)}$, represents an operation of taking one of the columns (for example, the first column) of $R_{i_k} H_{8,j_k} R_{i_k}^H$. Cases where r=2, 3 . . . 8 are similar to the case where r=1, so no further description will be made thereon. $H_{8,0}$, $H_{8,1}$, $H_{8,2}$ and $H_{8,3}$ are as follows:

$$H_{8,0} = \frac{1}{\sqrt{8}} \begin{bmatrix} 1 & 1 & 1 & 1 & 1 & 1 & 1 & 1 \\ 1 & -1 & 1 & -1 & 1 & -1 & 1 & -1 \\ 1 & 1 & 1 & 1 & -1 & -1 & -1 & -1 \\ 1 & -1 & 1 & -1 & -1 & 1 & -1 & 1 \\ 1 & 1 & -1 & -1 & 1 & 1 & -1 & -1 \\ 1 & -1 & -1 & 1 & 1 & -1 & -1 & 1 \\ 1 & 1 & -1 & -1 & -1 & -1 & 1 & 1 \\ 1 & -1 & -1 & 1 & -1 & 1 & 1 & -1 \end{bmatrix},$$

$$H_{8,1} = \frac{1}{\sqrt{8}} \begin{bmatrix} 1 & 1 & -1 & -1 & 1 & 1 & -1 & -1 \\ 1 & -1 & -1 & 1 & 1 & -1 & -1 & 1 \\ -1 & -1 & 1 & 1 & 1 & 1 & -1 & -1 \\ -1 & 1 & 1 & -1 & 1 & -1 & -1 & 1 \\ 1 & 1 & 1 & 1 & 1 & 1 & 1 & 1 \\ 1 & -1 & 1 & -1 & 1 & -1 & 1 & -1 \\ -1 & -1 & -1 & -1 & 1 & 1 & 1 & 1 \\ -1 & 1 & -1 & 1 & 1 & -1 & 1 & -1 \end{bmatrix},$$

$$H_{8,2} = \frac{1}{\sqrt{8}} \begin{bmatrix} 1 & 1 & 1 & 1 & -1 & -1 & -1 & -1 \\ 1 & -1 & 1 & -1 & -1 & 1 & -1 & 1 \\ 1 & 1 & 1 & 1 & 1 & 1 & 1 & 1 \\ 1 & -1 & 1 & -1 & 1 & -1 & 1 & -1 \\ -1 & -1 & 1 & 1 & 1 & 1 & -1 & -1 \\ -1 & 1 & 1 & -1 & 1 & -1 & -1 & 1 \\ -1 & -1 & 1 & 1 & -1 & -1 & 1 & 1 \\ -1 & 1 & 1 & -1 & -1 & 1 & 1 & -1 \end{bmatrix},$$

-continued $$H_{8,3} = \frac{1}{\sqrt{8}} \begin{bmatrix} 1 & 1 & -1 & -1 & -1 & -1 & 1 & 1 \\ 1 & -1 & -1 & 1 & -1 & 1 & 1 & -1 \\ -1 & -1 & 1 & 1 & -1 & -1 & 1 & 1 \\ -1 & 1 & 1 & -1 & -1 & 1 & 1 & -1 \\ -1 & -1 & -1 & -1 & 1 & 1 & 1 & 1 \\ -1 & 1 & -1 & 1 & 1 & -1 & 1 & -1 \\ 1 & 1 & 1 & 1 & 1 & 1 & 1 & 1 \\ 1 & -1 & 1 & -1 & 1 & -1 & 1 & -1 \end{bmatrix}$$

Diagonal elements of $R_{i_k}$ may be selected to be consistent with the 8-point DFT vectors, which are as follows:

$R_0 = \text{diag}\{1, 1, 1, 1, 1, 1, 1, 1\}$, $R_1 = \text{diag}\{1, j, -1, -j, 1, j, -1, -j\}$, $R_2 = \text{diag}\{1, e^{j\frac{\pi}{4}}, e^{j\frac{2\pi}{4}}, e^{j\frac{3\pi}{4}}, -1, -e^{j\frac{\pi}{4}}, -e^{j\frac{2\pi}{4}}, -e^{j\frac{3\pi}{4}}\}$, $R_3 = \text{diag}\{1, e^{-j\frac{\pi}{4}}, e^{-j\frac{2\pi}{4}}, e^{-j\frac{3\pi}{4}}, -1, -e^{-j\frac{\pi}{4}}, -e^{-j\frac{2\pi}{4}}, -e^{-j\frac{3\pi}{4}}\}$.

Additionally, a full-rank precoding codebook may be given as shown in Table 3 or Table 4.

TABLE 3

| Diagonal rotation matrix | Normalized Hadamard matrix | | | |
|---|---|---|---|---|
| $R_i$ | $H_{8,0}$ | $H_{8,1}$ | $H_{8,2}$ | $H_{8,3}$ |
| $\text{diag}\{1, 1, 1, 1, 1, 1, 1, 1\}$ | $W_0^{(8)}$ | $W_2^{(8)}$ | $W_8^{(8)}$ | $W_{10}^{(8)}$ |
| $\text{diag}\{1, e^{j\frac{\pi}{4}}, e^{j\frac{2\pi}{4}}, e^{j\frac{3\pi}{4}}, e^{j\frac{4\pi}{4}}, e^{j\frac{5\pi}{4}}, e^{j\frac{6\pi}{4}}, e^{j\frac{7\pi}{4}}\}$ | $W_4^{(8)}$ | $W_6^{(8)}$ | | |
| $\text{diag}\{1, e^{j\frac{\pi}{2}}, e^{j\frac{2\pi}{2}}, e^{j\frac{3\pi}{2}}, e^{j\frac{4\pi}{2}}, e^{j\frac{5\pi}{2}}, e^{j\frac{6\pi}{2}}, e^{j\frac{7\pi}{2}}\}$ | $W_1^{(8)}$ | $W_3^{(8)}$ | $W_9^{(8)}$ | $W_{11}^{(8)}$ |
| $\text{diag}\{1, e^{j\frac{3\pi}{4}}, e^{j\frac{6\pi}{4}}, e^{j\frac{9\pi}{4}}, e^{j\frac{12\pi}{4}}, e^{j\frac{15\pi}{4}}, e^{j\frac{18\pi}{4}}, e^{j\frac{21\pi}{4}}\}$ | $W_5^{(8)}$ | $W_7^{(8)}$ | | |
| $\text{diag}\{1, 1, 1, -1, 1, 1, 1, -1\}$ | $W_{12}^{(8)}$ | $W_{14}^{(8)}$ | $W_{13}^{(8)}$ | $W_{15}^{(8)}$ | or

TABLE 4

| Diagonal rotation matrix | Normalized Hadamard matrix | | | |
|---|---|---|---|---|
| $R_i$ | $H_{8,0}$ | $H_{8,1}$ | $H_{8,2}$ | $H_{8,3}$ |
| $\text{diag}\{1, 1, 1, 1, 1, 1, 1, 1\}$ | $W_0^{(8)}$ | $W_2^{(8)}$ | $W_8^{(8)}$ | $W_{10}^{(8)}$ |
| $\text{diag}\{1, e^{j\frac{\pi}{4}}, e^{j\frac{2\pi}{4}}, e^{j\frac{3\pi}{4}}, e^{j\frac{4\pi}{4}}, e^{j\frac{5\pi}{4}}, e^{j\frac{6\pi}{4}}, e^{j\frac{7\pi}{4}}\}$ | $W_4^{(8)}$ | $W_6^{(8)}$ | $W_{12}^{(8)}$ | $W_{14}^{(8)}$ |
| $\text{diag}\{1, e^{j\frac{\pi}{2}}, e^{j\frac{2\pi}{2}}, e^{j\frac{3\pi}{2}}, e^{j\frac{4\pi}{2}}, e^{j\frac{5\pi}{2}}, e^{j\frac{6\pi}{2}}, e^{j\frac{7\pi}{2}}\}$ | $W_1^{(8)}$ | $W_3^{(8)}$ | $W_9^{(8)}$ | $W_{11}^{(8)}$ |
| $\text{diag}\{1, e^{j\frac{3\pi}{4}}, e^{j\frac{6\pi}{4}}, e^{j\frac{9\pi}{4}}, e^{j\frac{12\pi}{4}}, e^{j\frac{15\pi}{4}}, e^{j\frac{18\pi}{4}}, e^{j\frac{21\pi}{4}}\}$ | $W_5^{(8)}$ | $W_7^{(8)}$ | $W_{13}^{(8)}$ | $W_{15}^{(8)}$ |

Under the condition that a nesting characteristic is met, other low-rank precoding codebooks can be derived from the aforesaid full-rank precoding codebook.

Specifically, the codeword $W_k^{(r)}$ included in the non-differential codebook may have the following structure:

$$W_k^{(r)} = R_{i_k} B_{n,j_k}^{(r)}$$

where, k represents a PMI included in the non-differential codebook $W^{(r)}$, k=0, 1, ... $|W^{(r)}|-1$, $|W^{(r)}|$ represents the number of codewords included in the non-differential codebook $W^{(r)}$, r represents a rank of the codewords included in the non-differential codebook $W^{(r)}$, $i_k$ represents an index of a diagonal matrix $R_{i_k}$ corresponding to k, $R_{i_k}$ represents a $n^{th}$ order diagonal matrix corresponding to $i_k$, $B_{n,j_k}^{(r)}$ represents a codeword in a non-differential codebook having a rank of r for n transmitting antennas and corresponding to an index $j_k$, and $j_k$ corresponds to k.

It should be noted that, the structure of the diagonal matrix $R_{i_k}$ may be represented as:

$$R_{i_k} = \text{diag}\{b_{i_k,1} e^{j\delta_{i_k,1}}, b_{i_k,2} e^{j\delta_{i_k,2}}, \ldots, b_{i_k,t} e^{j\delta_{i_k,t}}, \ldots, b_{i_k,n} e^{j\delta_{i_k,n}}\}$$

where, $b_{i_k,t}$ is a real number, $\delta_{i_k,t}$ represents a phase shift, $j^2=-1$, t=1, 2, ..., n, and a value of n is equal to the number of transmitting antennas.

Moreover, the non-differential codebook may also be any non-differential codebook known in the prior art (for example, an LTE R8 codebook) and may be flexibly selected depending on actual applications, and no limitation is made thereon herein.

2) selecting a non-differential broadband PMI (supposing that the non-differential broadband PMI is n) lately fed back by the UE for use as the reference PMI.

Specifically, the NodeB may, through a high-level signaling or a downlink physical control channel, instruct the UE to use the differential PMI based on the reference PMI for feedback, and after receiving the instruction from the NodeB, the UE selects to use the differential PMI based on the reference PMI for feedback. Alternatively, the NodeB and the UE make beforehand an agreement that the UE uses the differential PMI based on the reference PMI for feedback so that when performing the feedback, the UE automatically selects to use the differential PMI based on the reference PMI for feedback. The present invention is not merely limited to the aforesaid two approaches, and any other feasible approach may be set depending on actual applications so that the UE can select to use the differential PMI based on the reference PMI for feedback.

202: The UE feeds back the reference PMI to the NodeB, and calculates the differential PMI based on the preset criterion and according to the reference PMI, the non-differential codebook $W^{(r)}$, and the diagonal differential codebook D.

The non-differential codebook $W^{(r)}$ may be a non-differential codebook similar to that in the step 201 (that is, the codewords set in the embodiment of the present invention obtained from a non-differential codebook obtained from a rotated Hadamard matrix), or may be any non-differential codebook known in the prior art.

The diagonal differential codebook is a differential codebook whose codewords are a diagonal matrixes according to the embodiment of the present invention. The structure of a codeword $C_k$ included in the diagonal differential codebook D according to the embodiment of the present invention is as shown in Equation (2):

$$C_k = \text{diag}\{e^{j\theta_{k,1}}, e^{j\theta_{k,2}}, \ldots, e^{j\theta_{k,N}}\} \quad (2)$$

where, k represents a differential PMI included in the diagonal differential codebook D, k=0, 1, ... $|D|-1$, $|D|$ represents the number of codewords included in the differential codebook D, $j^2=-1$, N represents the number of transmitting antennas and is a positive integer, $\theta_{k,i}$ (i=1, 2, 3 ... N) represents a phase shift, and $\theta_{k,i}$ may be obtained according to the number of the transmitting antennas and arrangement of the transmitting antennas.

The differential PMI is calculated as k (marked as the differential PMI k) based on the preset criterion and according to the reference PMI, the non-differential codebook $W^{(r)}$ and the diagonal differential codebook D, as shown in Equation (3):

$$k = \underset{i=0,1 \ldots |D|-1, C_i \in D}{\text{argmax}} f(C_i W_n) \quad (3)$$

where, $C_i$ represents a codeword in the diagonal differential codebook D corresponding to a differential PMI i, $W_n$ represents a codeword in the non-differential codebook) $W^{(r)}$ corresponding to a reference PMI n, and $f(C_i W_n)$ represents an objective function corresponding to the preset criterion.

203: The UE feeds back the differential PMI to the NodeB.

In the embodiment of the present invention, the differential PMI is k, so k is fed back to the NodeB.

204: The NodeB receives the reference PMI and the differential PMI, and calculates a PM $\hat{V}$ by using the non-differential codebook $W^{(r)}$ and the diagonal differential codebook D and according to the reference PMI and the differential PMI.

It should be noted that, because the UE already feeds back the reference PMI to the NodeB in the step 202 before feeding back the differential PMI to the NodeB in the step 203, the NodeB firstly receives the reference PMI and then receives the differential PMI. Therefore, the NodeB may store the reference PMI that is firstly received and then, after the differential PMI is received, calculate the PM $\hat{V}$ according to the reference PMI and the differential PMI.

Specifically, for a Single User Multiple Input Multiple Output (SU-MIMO) system, the NodeB obtains a codeword corresponding to the reference PMI through query from the non-differential codebook $W^{(r)}$ (consistent with a non-differential codebook pre-stored in the UE) pre-stored in the NodeB according to the reference PMI, obtains a codeword corresponding to the differential PMI through query from the diagonal differential codebook D (consistent with a diagonal differential codebook pre-stored in the UE) pre-stored in the NodeB according to the differential PMI, and multiplies the codeword corresponding to the reference PMI by the codeword corresponding to the differential PMI to obtain a multiplication result for use as the PM $\hat{V}$.

In the embodiment of the present invention, the reference PMI is n, a codeword corresponding to the reference PMI n is $W_n$, the differential PMI is k, and a codeword corresponding to the differential PMI k is $C_k$. Therefore, the PM $\hat{V}$ obtained according to the embodiment of the present invention is as shown in Equation (4):

$$\hat{V} = C_k W_n \quad (4)$$

For a Multiple User Multiple Input Multiple Output (MU-MIMO) system, the NodeB calculates, by using the non-differential codebook $W^{(r)}$ and the diagonal differential codebook D, the PM $\hat{V}$ based on a Zero-Forcing Beam Forming (ZF-BF) algorithm or a maximum Signal-Leakage Plus Noise Ratio (SLNR) criterion and according to reference PMIs and differential PMIs fed back by individual UEs that are simultaneously paired.

The process for the individual UEs to feed back the PMIs is similar to the steps 201-203, and will not be further described herein. Moreover, for ease of understanding of the calculation process in case of the MU-MIMO system, a case where the PM $\hat{V}$ is calculated by using the ZF-BF algorithm will be described as an example hereinafter:

For two UEs that are simultaneously paired, suppose that a reference PMI corresponding to one of the two UEs is $n_1$ (and suppose that a codeword corresponding to the reference PMI $n_1$ is $W_{n1}$), and that a differential PMI corresponding to the one of the two UEs is $k_1$ (and suppose that a codeword corresponding to the differential PMI $k_1$ is $C_{k1}$); and suppose that a reference PMI corresponding to the other UE is $n_2$ (and suppose that a codeword corresponding to the reference PMI $n_2$ is $W_{n2}$), and that a differential PMI corresponding to the other UE is $k_2$ (and suppose that a codeword corresponding to the differential PMI $k_2$ is $C_{k2}$). Then, by using the aforesaid method for the SU-MIMO system, a PM $\hat{V}_1$ corresponding to the one of the two UEs is calculated as shown in Equation (5) and a PM $\hat{V}_2$ corresponding to the other UE is calculated as shown in Equation (6):

$$\hat{V}_1 = C_{k1} W_{n1} \quad (5)$$

$$\hat{V}_2 = C_{k2} W_{n2} \quad (6)$$

$\hat{H} = [(\hat{V}_1)^T (\hat{V}_2)^T]^T$ and $G = \hat{H}^H (\hat{H}\hat{H}^H)^{-1}$ are set.

A PM $\hat{V}$ obtained according to $\hat{H}$ and $G$ is as shown in Equation (7):

$$\hat{V} = \frac{P}{\sqrt{S}} G \mathrm{diag}\{\|g_0\|^{-1}, \|g_1\|^{-1} \ldots \|g_i\|^{-1} \ldots \|g_{S-1}\|^{-1}\} \quad (7)$$

where, P represents a total transmitting power of the NodeB, S represents the total number of layers for spatial multiplexing of the two UEs, $g_i$ (i=0, 1 ... S−1) represents an $i^{th}$ column vector of G, and $\|g_i\|$ (i=0, 1 ... S−1) represents an Euclid norm of G.

The process for calculating the PM $\hat{V}$ based on the maximum SLNR criterion is similar to that in the prior art, and will not be further described herein.

205: The NodeB pre-processes data s to be sent by using the PM $\hat{V}$, and sends the pre-processed data s to the UE through the transmitting antennas.

206: The UE receives a receive signal y, and detects data of the receive signal y.

Specifically, the receive signal y received by the UE is as shown in Equation (8):

$$y = H\hat{V}s + n \quad (8)$$

where, y represents a receive signal received by the UE, H represents a channel matrix, $\hat{V}$ represents a PM, s represents data to be sent, and n represents Additive White Gaussian Noise (AWGN).

It should be noted that, in the aforesaid process, the reference PMI and the differential PMI are fed back to the NodeB in the step 202 and the step 203 respectively; however, in actual applications, the reference PMI and the differential PMI may also be fed back to the NodeB simultaneously. Specifically, after obtaining the reference PMI, the UE may firstly store the reference PMI; and then, in the step 203, the UE feeds back the reference PMI and the differential PMI to the NodeB simultaneously. Alternatively, it is possible to, in the step 201, calculate the reference PMI as n and the differential PMI as k simultaneously based on the preset criterion and according to the non-differential codebook $W^{(r)}$ and the diagonal differential codebook D, as shown in Equation (9):

$$(k, n) = \underset{\substack{i=0,1,\ldots,|D|-1, C_i \in D \\ j=0,1,\ldots,|W^{(r)}|-1, W_j \in W^{(r)}}}{\mathrm{argmax}} f(C_i W_j) \quad (9)$$

Then, after the reference PMI and the differential PMI are fed back to the NodeB simultaneously in the step 202, the step 204 is executed directly.

Moreover, it should be noted that, in the aforesaid process of feeding back the reference PMI and the differential PMI, whether the differential PMI or the reference PMI is fed back, it is possible that one PMI is fed back for the whole system bandwidth; or, provided that the system is divided into a plurality of bandwidth parts (BPs) and each of the BPs includes a plurality of sub-bands, then it is possible that one PMI is fed back for each of the sub-bands or for multiple ones of the sub-bands (for example, the Best-M manner: one PMI is fed back for the selected M sub-band(s)). That is, the reference PMI and the differential PMI may be either a broadband PMI or a sub-band PMI, and also one PMI may be fed back for a plurality of sub-bands in the Best-M manner.

In the method for acquiring a PMI according to the embodiment of the present invention, acquiring a reference PMI and a differential PMI according to a non-differential codebook and a diagonal differential codebook can reduce the feedback overhead and improve the feedback precision so as to improve the feedback performance; and the fact that a codeword included in the diagonal differential codebook is a diagonal matrix can maintain amplitude characteristics (for example, a constant modulus characteristic, and a finite character set constraint characteristic) of elements already existing in the non-differential codebook. Moreover, a non-differential codebook obtained from a rotated Hadamard matrix may be used. Individual columns of the Hadamard matrix may be matched with eigenvectors of strongly correlated channels and weakly correlated channels in a uniform linear array transmitting antenna arrangement and a dual-polarized transmitting antenna arrangement respectively so as to improve the accuracy of quantization. The rotated matrix is in the form of a diagonal matrix, and this can maintain a fine quantization of the space on basis of the quantization of the Hadamard matrix. Furthermore, each of elements of the Hadamard matrix is +1 or −1, which can satisfy the constant modulus characteristic; and multiplication of the Hadamard matrix with other matrixes or vectors may be simplified into addition or subtraction operations, which can significantly reduce the computational complexity of CQI calculation based on the SINR, PMI selection and rank adaptation. The individual columns of the Hadamard matrix are orthogonal to each other, and this can maintain, after normalization, the unitary matrix characteristic of codewords in the non-differential codebook so that individual sent spatial streams are guaranteed to have the same power distribution and, in case of a full rank, individual transmitting antennas have the same power distribution. Further, the approach to obtain a non-differential codebook from a rotated Hadamard matrix may be applied to cases where the number of transmitting antennas is 2, 4, 8, 16, 32, 64 or the like, and the obtained non-differential codebook may satisfy the constant modulus characteristic and the unitary matrix characteristic and reduce the computational complexity of CQI calculation based on the SINR, PMI selection and rank adaptation. Additionally, using the non-differential PMI that is lately fed back by the UE as the reference PMI can not only reduce the overhead but also make full use of the correlation of channels in the frequency domain and the time domain or in the space domain, thereby improving feedback precision.

Embodiment 3

Figure 3:
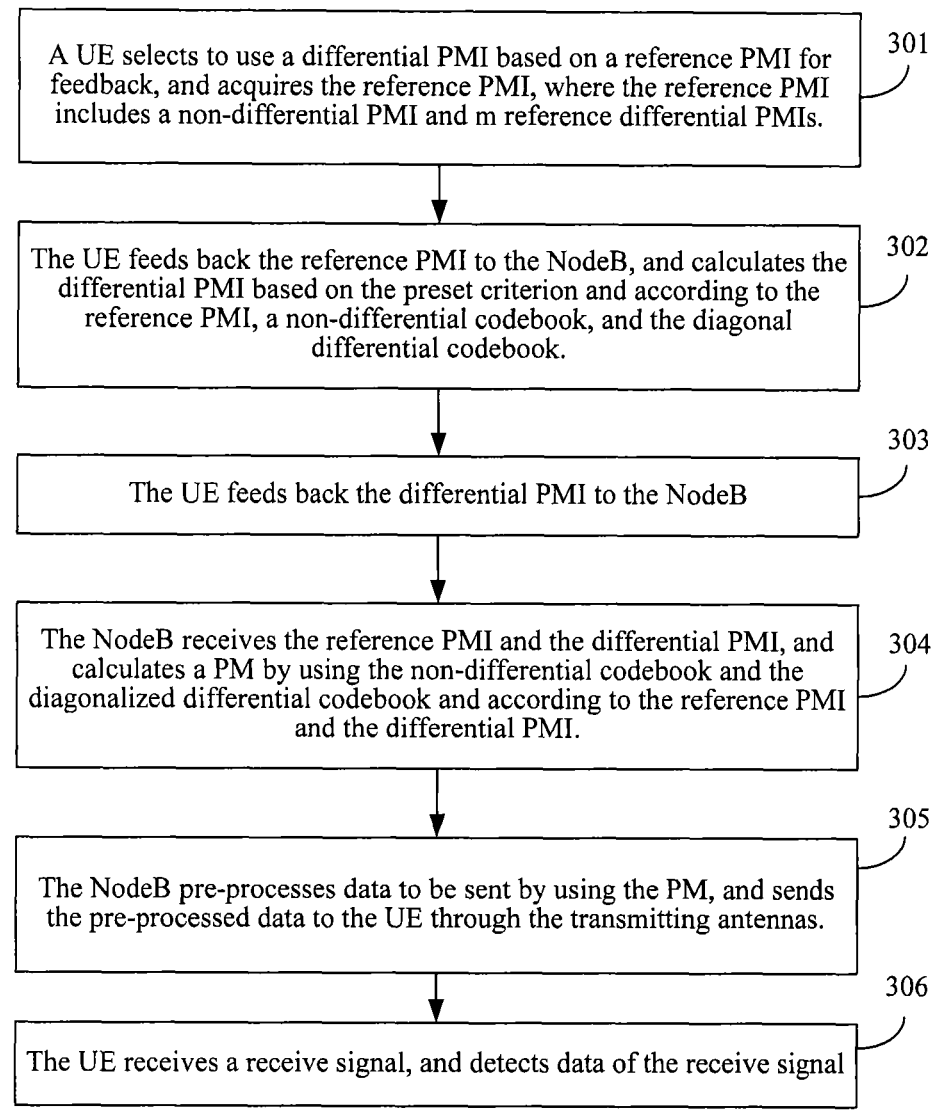
FIG. 3 is a flowchart of a method for acquiring a PMI according to Embodiment 3 of the present invention.

Referring to FIG. 3, this embodiment of the present invention provides a method for acquiring a PMI, where the method includes the following steps.

301: A UE selects to use a differential PMI based on a reference PMI for feedback, and acquires the reference PMI.

The reference PMI may be a non-differential PMI and a differential PMI that are lately fed back by the UE.

In the embodiment of the present invention, the reference PMI may include a non-differential PMI and m reference differential PMIs (m is a natural number, and a value of m may be determined depending on actual applications, for example, depending on the number of sub-bands). By using the approach described in the step 201 of Embodiment 2, the non-differential PMI may be obtained as n. Furthermore, m reference differential PMIs may be calculated as $n_0, n_1, \ldots, n_m$ based on a preset criterion and according to a diagonal differential codebook D (the m reference differential PMIs are marked as the reference differential PMI $n_0$, the reference differential PMI $n_1, \ldots$, and the reference differential PMI $n_m$ respectively), as shown in Equation (10):

$$(n_0, n_1 \ldots n_m) = \operatorname*{argmax}_{(i_0, i_1, \ldots, i_m), i_j = 0, 1 \ldots |D|-1, C_{i_j} \in D, j=0, 1, \ldots, m} f(C_{i_m} \ldots C_{i_1} C_{i_0} W_n) \quad (10)$$

302: The UE feeds back the reference PMI to the NodeB, and calculates the differential PMI based on the preset criterion and according to the reference PMI, a non-differential codebook $W^{(r)}$, and the diagonal differential codebook D.

The non-differential codebook $W^{(r)}$ and the diagonal differential codebook D are identical to those in the step 202 of Embodiment 2 respectively, and will not be further described herein.

The differential PMI is calculated as k (marked as the differential PMI k) based on the preset criterion and according to the reference PMI (n, $n_0, n_1, \ldots, n_m$), the non-differential codebook $W^{(r)}$, and the diagonal differential codebook D, as shown in Equation (11):

$$k = \operatorname*{argmax}_{i=0,1 \ldots |D|-1, C_i \in D} f(C_i(C_{n_m} \, 6 \, C_{n_1} \, C_{n_0} \, W_n)) \quad (11)$$

where, $C_i$ represents a codeword in the diagonal differential codebook D corresponding to a differential PMI; $C_{n_0} C_{n_1}$ 6 $C_{n_m}$ represent codewords in the diagonal differential codebook D corresponding to the reference differential PMI $n_0$, the reference differential PMI $n_1, \ldots$, and the reference differential PMI $n_m$ respectively; and $W_n$ represents a codeword in the non-differential codebook $W^{(r)}$ corresponding to the non-differential PMI n.

303: The UE feeds back the differential PMI to the NodeB.

In the embodiment of the present invention, the differential PMI is k, so k is fed back to the NodeB.

304: The NodeB receives the reference PMI and the differential PMI, and calculates a PM $\hat{V}$ by using the non-differential codebook $W^{(r)}$ and the diagonal differential codebook D and according to the reference PMI and the differential PMI.

Specifically, for an SU-MIMO system, the NodeB obtains a codeword corresponding to the reference PMI through query from the non-differential codebook $W^{(r)}$ (consistent with a non-differential codebook pre-stored in the UE) pre-stored in the NodeB according to the reference PMI, obtains a codeword corresponding to the differential PMI through query from the diagonal differential codebook D (consistent with a diagonal differential codebook pre-stored in the UE) pre-stored in the NodeB according to the differential PMI, and multiplies the codeword corresponding to the reference PMI by the codeword corresponding to the differential PMI to obtain a multiplication result for use as the PM $\hat{V}$.

In the embodiment of the present invention, the reference PMI includes a non-differential PMI and m reference differential PMIs, the non-differential PMI is n, the m reference differential PMIs are $n_0, n_1, \ldots, n_m$ respectively, a codeword corresponding to the non-differential PMI n is $W_n$, codewords corresponding to the reference differential PMIs $n_0, n_1, \ldots, n_m$ are $C_{n_0}, C_{n_1}$ 6 $C_{n_m}$ respectively, the differential PMI is k, and a codeword corresponding to the differential PMI k is $C_k$. Therefore, the PM $\hat{V}$ obtained according to the embodiment of the present invention is as shown in Equation (12):

$$\hat{V} = C_k(C_{n_m} 6 C_{n_1} C_{n_0} W_n) \quad (12)$$

For an MU-MIMO system, the NodeB calculates, by using the non-differential codebook $W^{(r)}$ and the diagonal differential codebook D, the PM $\hat{V}$ based on the ZF-BF algorithm or the maximum SLNR criterion and according to reference PMIs and differential PMIs fed back by individual UEs that are simultaneously paired. This process is similar to the step 204 of Embodiment 2, and will not be further described herein.

305: The NodeB pre-processes data s to be sent by using the PM $\hat{V}$, and sends the pre-processed data s to the UE through the transmitting antennas.

306: The UE receives a receive signal y, and detects data of the receive signal y.

Specifically, the receive signal y received by the UE is as shown in Equation (13):

$$y = H\hat{V}s + n \quad (13)$$

where, y represents a receive signal received by the UE, H represents a channel matrix, $\hat{V}$ represents a PM, s represents data to be sent, and n represents AWGN.

It should be noted that, in the aforesaid process, the reference PMI and the differential PMI are fed back to the NodeB in the step 302 and the step 303 respectively; however, in actual applications, the reference PMI and the differential PMI may also be fed back to the NodeB simultaneously. Specifically, after obtaining the reference PMI, the UE may firstly store the reference PMI; and then, in the step 303, the UE feeds back the reference PMI and the differential PMI to the NodeB simultaneously. Alternatively, it is possible to, in the step 301, calculate the reference PMI as n, $n_0, n_1, \ldots, n_m$ and the differential PMI as k simultaneously based on the preset criterion and according to the non-differential codebook $W^{(r)}$ and the diagonal differential codebook D, as shown in Equation (14a):

$$(k, n, n_0, n_1, n \ldots n_m) = \quad (14a)$$
$$\operatorname*{argmax}_{(i, l, i_0, i_1, \ldots, i_m), i=0,1 \ldots |D|-1, C_i \in D; l=0,1, \ldots, |W^{(r)}|-1, W_l \in W^{(r)};}$$
$$i_j = 0, 1 \ldots |D|-1, C_{i_j} \in D, j=0,1, \ldots, m.$$

-continued $$f(C_i C_{i_m} \ldots C_{i_1} C_{i_0} W_l)$$

Moreover, it should be noted that, the reference differential PMIs in the step 301 may also be achieved recursively, as shown in Equation (14b):

$$n_j = \underset{i_j=0,1 \ldots |D|-1, C_{i_j} \in D}{\operatorname{argmax}} f\left(C_{i_j}\left(C_{i_{j-1}} \ldots C_{i_1} C_{i_0} W_n\right)\right), \quad (14b)$$

$$j = 0, 1, \ldots, m$$

Then, after the reference PMI and the differential PMI are fed back to the NodeB simultaneously in the step 302, the step 304 is executed directly.

Moreover, it should be noted that, in the aforesaid process of feeding back the reference PMI and the differential PMI, whether the differential PMI or the reference PMI is fed back, it is possible that one PMI is fed back for the whole system bandwidth; or, provided that the system is divided into a plurality of BPs and each of the BPs includes a plurality of sub-bands, one PMI is fed back for each of the sub-bands or for multiple ones of the sub-bands (for example, the Best-M manner: one PMI is fed back for the M selected sub-band(s)). That is, the reference PMI and the differential PMI may be either a broadband PMI or a sub-band PMI, and also one PMI may be fed back for a plurality of sub-bands in the Best-M manner.

In the method for acquiring a PMI according to the embodiment of the present invention, acquiring a reference PMI and a differential PMI according to a non-differential codebook and a diagonal differential codebook can reduce the feedback overhead and improve the feedback precision so as to improve the feedback performance; and the fact that a codeword included in the diagonal differential codebook is form a diagonal matrix can maintain amplitude characteristics (for example, a constant modulus characteristic, and a finite character set constraint characteristic) of elements already existing in the non-differential codebook. Moreover, a non-differential codebook obtained from a rotated Hadamard matrix may be used. Individual columns of the Hadamard matrix may be matched with eigenvectors of strongly correlated channels and weakly correlated channels in a uniform linear array transmitting antenna arrangement and a dual-polarized transmitting antenna arrangement respectively so as to improve the accuracy of quantization. The rotated matrix is in the form of a diagonal matrix, and this can maintain a fine quantization of the space on basis of the quantization of the Hadamard matrix. Furthermore, each of elements of the Hadamard matrix is +1 or -1, which can maintain the constant modulus characteristic of the non-differential codebook; and multiplication of the Hadamard matrix with other matrixes or vectors may be simplified into addition or subtraction operations, which can significantly reduce the computational complexity of CQI calculation based on the SINR, PMI selection and rank adaptation. The individual columns of the Hadamard matrix are orthogonal to each other, and this can maintain the unitary matrix characteristic of codewords in the non-differential codebook so that individual sent spatial streams are guaranteed to have the same power distribution and, in case of a full rank, individual transmitting antennas have the same power distribution. Further, the approach to obtain a non-differential codebook from a rotated Hadamard matrix may be applied to cases where the number of transmitting antennas is 2, 4, 8, 16, 32, 64 or the like, and the obtained non-differential codebook may satisfy the constant modulus characteristic and the unitary matrix characteristic and reduce the computational complexity of CQI calculation based on the SINR, PMI selection and rank adaptation. Additionally, using the non-differential PMI and the m reference differential PMIs that are lately fed back by the UE as the reference PMI can not only further reduce the overhead but also make full use of the correlation of channels in the frequency domain and the time domain or in the space domain, further improving feedback precision.

The methods described in Embodiment 2 and Embodiment 3 are also applicable to a Coordinated Multiple Point transmission (CoMP) system. Hereinafter, a case where the methods are applied to the CoMP system will be further described as an example.

Embodiment 4

Figure 4:
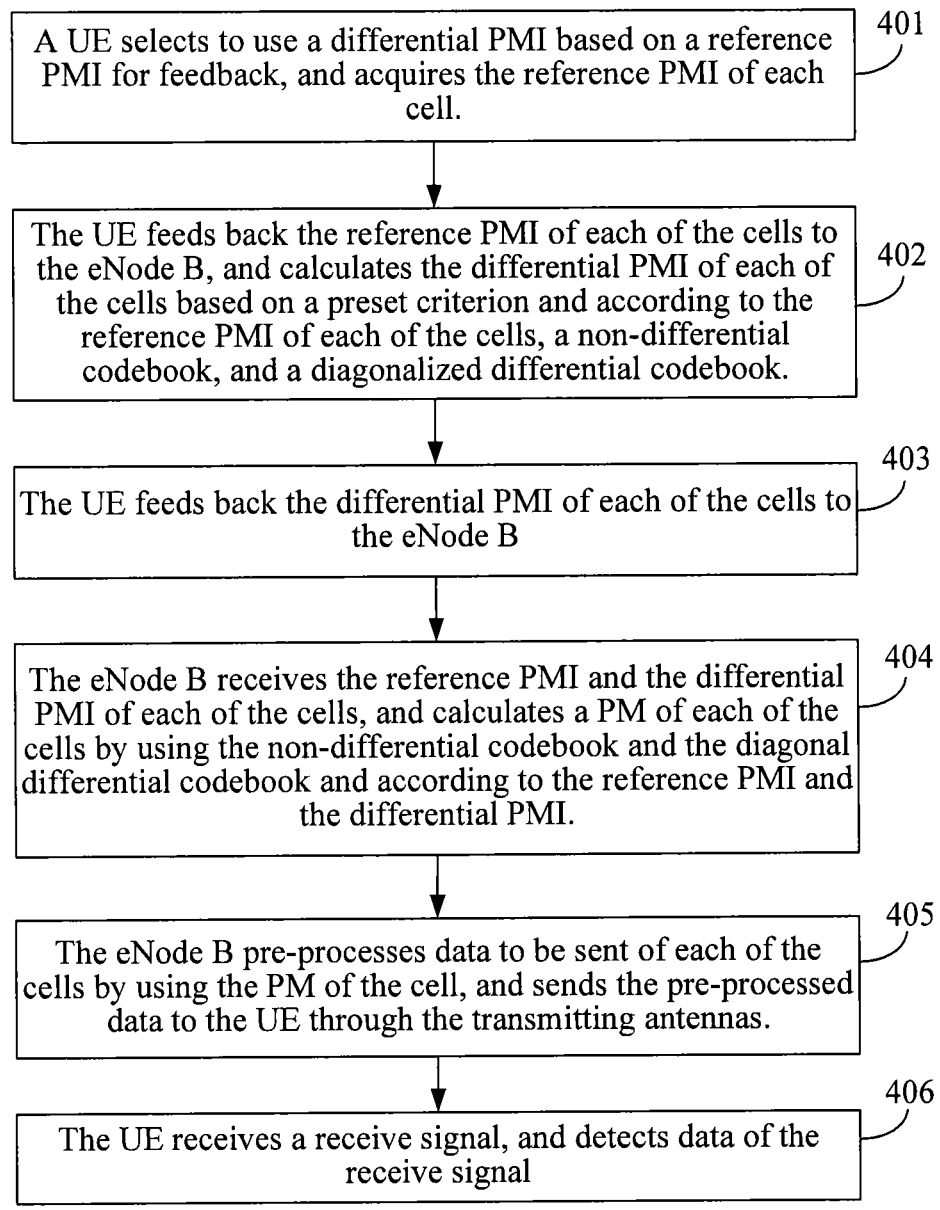
FIG. 4 is a flowchart of a method for acquiring a PMI according to Embodiment 4 of the present invention.

Referring to FIG. 4, this embodiment of the present invention provides a method for acquiring a PMI, where the method includes the following steps.

401: A UE selects to use a differential PMI based on a reference PMI for feedback, and acquires the reference PMI of each cell.

Specifically, BSs in all cells of the CoMP system where the UE is located can, through a high-level signaling or a downlink physical control channel, instruct the UE to use the differential PMI based on the reference PMI for feedback, and after receiving the instruction, the UE selects to use the differential PMI based on the reference PMI for feedback. Moreover, it should be noted that, in the embodiment of the present invention, the BSs in all the cells of the CoMP system are centrally controlled by an evolved NodeB (eNode B).

In the embodiment of the present invention, it is supposed that the CoMP system has M cells in total (M is a positive integer), and the reference PMI of each of the cells is $n_1$, $n_2$, ..., $n_M$ respectively. It should be noted that, in the embodiment of the present invention, the reference PMI of each of the cells may be in the form of either the reference PMI described in the step 201 of Embodiment 2 or the reference PMI described in the step 301 of Embodiment 3, and may be selected flexibly depending on actual applications.

402: The UE feeds back the reference PMI of each of the cells to the eNode B, and calculates the differential PMI of each of the cells based on a preset criterion and according to the reference PMI of each of the cells, a non-differential codebook $W^{(r)}$, and a diagonal differential codebook D.

The non-differential codebook $W^{(r)}$ is identical to that in the step 202 of Embodiment 2, and will not be further described herein. The diagonal differential codebook D may be identical to that in the step 202 of Embodiment 2, or may be a diagonal matrix obtained by multiplication of each of matrixes in the diagonal differential codebook in the step 202 of Embodiment 2 with one phase shift matrix (for example, multiplication of $C_k$ with $\operatorname{diag}\{e^{j\zeta_k}, e^{j\zeta_k}, \ldots, e^{j\zeta_k}, \ldots, e^{j\zeta_k}\}$).

The differential PMI of each of the cells is calculated as $k_1$, $k_2$, 6 $k_M$ respectively based on the preset criterion and according to the reference PMI of each of the cells, the non-differential codebook $W^{(r)}$ and the diagonal differential codebook D, as shown in Equation (15):

$$(k_1 \quad k_2 \quad \cdots \quad k_M) = \underset{(i_1 \; i_2 \; \cdots \; i_M), C_{ij} \in D, j=1,\ldots,M}{\operatorname{argmax}} \quad (15)$$

$$f\left(\operatorname{norm}\{[\,(\sqrt{p_1}\,C_{i_1}W_{n_1})^H \quad (\sqrt{p_2}\,C_{i_2}W_{n_2})^H \quad \cdots \quad (\sqrt{p_M}\,C_{i_M}W_{n_M})^H\,]\}^H\right)$$

where, M represents the number of cells and is a positive integer; $C_{i_1}$, $C_{i_2}$ ... $C_{i_M}$ represent codewords in the diagonal differential codebook D corresponding to the differential PMIs $i_1, i_2, \ldots, i_M$ respectively; $W_{n_1}, W_{n_2} \ldots W_{n_M}$ represent codewords in the non-differential codebook $W^{(r)}$ corresponding to the reference PMIs $n_1, n_2, \ldots, n_M$ respectively; $f(\bullet)$ represents an objective function corresponding to the preset criterion; $p_i$ represents long-scale fading corresponding from the UE to a BS of a cell i and is a power control parameter known by both the eNode B and the UE; norm$\{\bullet\}$ represents normalization of individual columns of a matrix; $i_1=0, 1 \ldots |D|-1, C_{i_1}\in D, i_2=0, 1 \ldots |D|-1, C_{i_2}\in D, \ldots i_M=0, 1 \ldots |D|-1, C_{i_M}\in D$; and $(\bullet)^H$ represents a conjugate transpose operation of a matrix or vectors.

403: The UE feeds back the differential PMI of each of the cells to the eNode B.

In the embodiment of the present invention, the differential PMIs of all the cells are $k_1, k_2 \cdots k_M$ respectively, so $k_1, k_2 \cdots k_M$ are fed back to the eNode B.

404: The eNode B receives the reference PMI and the differential PMI of each of the cells, and calculates a PM $\hat{V}$ of each of the cells by using the non-differential codebook $W^{(r)}$ and the diagonal differential codebook D and according to the reference PMI and the differential PMI.

In the embodiment of the present invention, there are M cells in total, and it is supposed that the PM $\hat{V}$ of each of the cells is the PM $\hat{V}_1$, the PM $\hat{V}_2, \ldots$, and the PM $\hat{V}_M$ respectively. The eNode B calculates the PM $\hat{V}$ of each of the cells by using the non-differential codebook $W^{(r)}$ and the diagonal differential codebook D and according to the reference PMI and the differential PMI, as shown in Equation (16):

$$((\hat{V}_1)^H(\hat{V}_2)^H\cdots(\hat{V}_M)^H]^H = \operatorname{norm}\{[(\sqrt{p_1}C_{i_1}W_{n_1})^H \\ (\sqrt{p_2}C_{i_2}W_{n_2})^H\cdots(\sqrt{p_M}C_{i_M}W_{n_M})^H]\}^H \quad (16)$$

where, M represents the number of cells and is a positive integer; $C_{i_1}, C_{i_2} \ldots C_{i_M}$ represent codewords in the diagonal differential codebook D corresponding to the differential PMIs $i_1, i_2, \ldots, i_M$ respectively; $W_{n_1}, W_{n_2} \ldots W_{n_M}$ represent codewords in the non-differential codebook $W^{(r)}$ corresponding to the reference PMIs $n_1, n_2, \ldots, n_M$ respectively; $p_i$ represents long-scale fading corresponding from the UE to a BS of a cell i and is a power control parameter known by both the eNode B and the UE; norm $\{\bullet\}$ represents normalization of individual columns of a matrix; $(\bullet)^H$ represents a conjugate transpose operation of a matrix or vectors; and $i_1=0, 1 \ldots |D|-1, C_{i_1}\in D, i_2=0, 1 \ldots |D|-1, C_{i_2}\in D \ldots i_M=0, 1 \ldots |D|-1, C_{i_M}\in D$.

405: The eNode B pre-processes data s to be sent of each of the cells by using the PM $\hat{V}$ of the cell, and sends the pre-processed data s to the UE through the transmitting antennas.

406: The UE receives a receive signal y, and detects data of the receive signal y.

Specifically, the receive signal y received by the UE is as shown in Equation (17):

$$y = \operatorname{diag}\{H_1, H_2, \ldots, H_i, \ldots, H_M\} \operatorname{norm}\{[(\sqrt{p_1}C_{i_1}W_{n_1})^H \\ (\sqrt{p_2}C_{i_2}W_{n_2})^H\cdots(\sqrt{p_M}C_{i_M}W_{n_M})^H]\}^H s + n \quad (17)$$

where, $H_i$ (i=1, 2 ... M) represents a channel matrix from the UE to a BS of a cell i; and other symbols therein have the same meanings as those in Equation (15) and Equation (16), and will not be further described herein.

In the method for acquiring a PMI according to the embodiment of the present invention, acquiring a reference PMI and a differential PMI according to a non-differential codebook and a diagonal differential codebook can reduce the feedback overhead and improve the feedback precision so as to improve the feedback performance; and the fact that a codeword included in the diagonal differential codebook is a diagonal matrix can maintain amplitude characteristics (for example, a constant modulus characteristic, and a finite character set constraint characteristic) of elements already existing in the non-differential codebook. Moreover, a non-differential codebook obtained from a rotated Hadamard matrix may be used. Individual columns of the Hadamard matrix may be matched with eigenvectors of strongly correlated channels and weakly correlated channels in a uniform linear array transmitting antenna arrangement and a dual-polarized transmitting antenna arrangement respectively so as to improve the accuracy of quantization. The rotated matrix is in the form of a diagonal matrix, and this can maintain a fine quantization of the space on basis of the quantization of the Hadamard matrix. Furthermore, each of elements of the Hadamard matrix is +1 or −1, which can maintain the constant modulus characteristic of the non-differential codebook; and multiplication of the Hadamard matrix with other matrixes or vectors may be simplified into addition or subtraction operations, which can significantly reduce the computational complexity of CQI calculation based on the SINR, PMI selection and rank adaptation. The individual columns of the Hadamard matrix are orthogonal to each other, and this can maintain the unitary matrix characteristic of codewords in the non-differential codebook so that individual sent spatial streams are guaranteed to have the same power distribution and, in case of a full rank, individual transmitting antennas have the same power distribution. Further, the approach to obtain a non-differential codebook from a rotated Hadamard matrix may be applied to cases where the number of transmitting antennas is 2, 4, 8, 16, 32, 64 or the like, and the obtained non-differential codebook may satisfy the constant modulus characteristic and the unitary matrix characteristic and reduce the computational complexity of CQI calculation based on the SINR, PMI selection and rank adaptation. Additionally, the method can acquire the reference PMI and the differential PMI of each of the cells and can be applied to the CoMP system, which enlarges the application scope thereof.

Additionally, it should be noted that, in consideration of power distribution of the transmitting antennas, the structure of the codeword $C_k$ included in the diagonal differential codebook in Embodiments 2-4 may also be as shown in Equation (18):

$$C_k = \operatorname{diag}\{a_{k,1}e^{j\theta_{k,1}}, a_{k,2}e^{j\theta_{k,2}}, \ldots, \\ a_{k,i}e^{j\theta_{k,i}}, \ldots, a_{k,N}e^{j\theta_{k,N}}\} \quad (18)$$

where, k represents the differential PMI in the diagonal differential codebook D, k=0, 1 ... |D|−1, |D| represents the number of codewords included in the diagonal differential codebook D, $j^2=-1$, N represents the number of transmitting antennas and is a positive integer, $a_{k,i}$ is a real number, $\theta_{k,i}$ (i=1, 2, 3 ... N) represents a phase shift of an $i^{th}$ transmitting antenna, and $\theta_{k,i}$ may be obtained according to the number of the transmitting antennas and the) arrangement of the transmitting antennas. A value of $a_{k,i}e^{j\Theta_{k,i}}$ (i=1, 2 . . . N) may be set depending on actual applications, for example, may be obtained through selection from constellation points of a constellation diagram of 16 Quadrature Amplitude Modulation (16QAM), 64QAM or the like. When the codewords in the diagonal differential codebook have a structure as shown in Equation (18), the power distribution of the transmitting antennas can be implemented.

Embodiment 5

It should be noted that, this embodiment of the present invention differs from Embodiments 1-4 in that, for a strongly-correlated transmitting antenna arrangement, the structure of the codeword $C_k$ included in the diagonal differential codebook in Embodiments 1-4 may further be optimized as shown in Equation (19):

$$C_k = \mathrm{diag}\{e^{j0\cdot(m\theta)}, e^{j1*(m\theta)}, \ldots, e^{j(i)*(m\theta)}, \ldots, e^{j(N-1)*(m\theta)}\} \quad (19)$$

where, k represents a differential PMI included in the diagonal differential codebook D, k=0, 1 . . . |D|−1, |D| represents the number of codewords included in the diagonal differential codebook D, $j^2=-1$, N represents the number of transmitting antennas and is a positive integer, $i*(m\theta)$ represents a phase shift of an $i^{th}$ transmitting antenna, i=1, 2 . . . N, and $m\theta$ represents a phase shift difference between adjacent transmitting antennas.

Furthermore, it should be noted that, the aforesaid diagonal elements may also have their positions swapped according to the specific antenna arrangement, for example, having their positions shifted circularly along the diagonal or all the diagonal elements being multiplied by one phase shift factor.

It should be noted that, values of the phase shift difference $m\theta$ should be distributed symmetrically around 0 as much as possible; and as long as the feedback overhead allows, more differential matrixes may be distributed around the 0 phase shift; for example, a value of m may be: m=0, ±1, ±2, ±4, ±8, ±16, ±32, ±64 . . . . For example, in the embodiment of the present invention, a 2-bit 4-antenna diagonal differential codebook is as shown in Table 5 and Table 8, a 3-bit 4-antenna diagonal differential codebook is as shown in Table 6 and Table 9, and a 4-bit 4-antenna diagonal differential codebook is as shown in Table 7 and Table 10; also, a 2-bit 8-antenna diagonal differential codebook is as shown in Table 11 and Table 14, a 3-bit 8-antenna diagonal differential codebook is as shown in Table 12 and Table 15, and a 4-bit 8-antenna diagonal differential codebook is as shown in Table 13 and Table 16.

TABLE 5

| Differential PMI | Differential PM |
|---|---|
| 0 | diag{1, 1, 1, 1} |
| 1 | diag$\{1, e^{j\frac{\pi}{16}}, e^{j\frac{2\pi}{16}}, e^{j\frac{3\pi}{16}}\}$ |
| 2 | diag$\{1, e^{j\frac{-\pi}{16}}, e^{j\frac{-2\pi}{16}}, e^{j\frac{-3\pi}{16}}\}$ |
| 3 | diag$\{1, e^{j\frac{\pi}{8}}, e^{j\frac{2\pi}{8}}, e^{j\frac{3\pi}{8}}\}$ |

TABLE 6

| Differential PMI | Differential PM |
|---|---|
| 0 | diag{1, 1, 1, 1} |
| 1 | diag$\{1, e^{j\frac{\pi}{8}}, e^{j\frac{2\pi}{8}}, e^{j\frac{3\pi}{8}}\}$ |
| 2 | diag$\{1, e^{-j\frac{\pi}{8}}, e^{-j\frac{2\pi}{8}}, e^{-j\frac{3\pi}{8}}, e^{-j\frac{4\pi}{8}}\}$ |
| 3 | diag$\{1, e^{j\frac{\pi}{4}}, e^{j\frac{2\pi}{4}}, e^{j\frac{3\pi}{4}}\}$ |
| 4 | diag$\{1, e^{-j\frac{\pi}{4}}, e^{-j\frac{2\pi}{4}}, e^{-j\frac{3\pi}{4}}\}$ |
| 5 | diag{1, j, −1, −j} |
| 6 | diag{1, −j, −1, j} |
| 7 | diag{1, −1, 1, −1} |

TABLE 7

| Differential PMI | Differential PM |
|---|---|
| 0 | diag{1, 1, 1, 1} |
| 1 | diag$\{1, e^{j\frac{\pi}{16}}, e^{j\frac{2\pi}{16}}, e^{j\frac{3\pi}{16}}\}$ |
| 2 | diag$\{1, e^{-j\frac{\pi}{16}}, e^{-j\frac{2\pi}{16}}, e^{-j\frac{3\pi}{16}}\}$ |
| 3 | diag$\{1, e^{j\frac{\pi}{8}}, e^{j\frac{2\pi}{8}}, e^{j\frac{3\pi}{8}}\}$ |
| 4 | diag$\{1, e^{-j\frac{\pi}{8}}, e^{-j\frac{2\pi}{8}}, e^{-j\frac{3\pi}{8}}\}$ |
| 5 | diag$\{1, e^{j\frac{3\pi}{16}}, e^{j\frac{6\pi}{16}}, e^{j\frac{9\pi}{16}}\}$ |
| 6 | diag$\{1, e^{-j\frac{3\pi}{16}}, e^{-j\frac{6\pi}{16}}, e^{-j\frac{9\pi}{16}}\}$ |
| 7 | diag$\{1, e^{j\frac{\pi}{4}}, e^{j\frac{2\pi}{4}}, e^{j\frac{3\pi}{4}}\}$ |
| 8 | diag$\{1, e^{-j\frac{\pi}{4}}, e^{-j\frac{2\pi}{4}}, e^{-j\frac{3\pi}{4}}\}$ |
| 9 | diag$\{1, e^{j\frac{3\pi}{8}}, e^{j\frac{6\pi}{8}}, e^{j\frac{9\pi}{8}}\}$ |
| 10 | diag$\{1, e^{-j\frac{3\pi}{8}}, e^{-j\frac{6\pi}{8}}, e^{-j\frac{9\pi}{8}}\}$ |
| 11 | diag{1, j, −1, −j} |
| 12 | diag{1, −j, −1, j} |
| 13 | diag$\{1, e^{j\frac{3\pi}{4}}, -j, e^{j\frac{\pi}{4}}\}$ |
| 14 | diag$\{1, e^{-j\frac{3\pi}{4}}, j, e^{-j\frac{\pi}{4}}\}$ |
| 15 | diag{1, −1, 1, −1} |

TABLE 8

| Differential PMI | Differential PM |
|---|---|
| 0 | $\text{diag}\{1, 1, 1, 1\}$ |
| 1 | $\text{diag}\{e^{j\frac{\pi}{16}}, e^{j\frac{2\pi}{16}}, e^{j\frac{3\pi}{16}}, e^{j\frac{4\pi}{16}}\}$ |
| 2 | $\text{diag}\{e^{j\frac{-\pi}{16}}, e^{j\frac{-2\pi}{16}}, e^{j\frac{-3\pi}{16}}, e^{j\frac{-4\pi}{16}}\}$ |
| 3 | $\text{diag}\{e^{j\frac{\pi}{8}}, e^{j\frac{2\pi}{8}}, e^{j\frac{3\pi}{8}}, e^{j\frac{4\pi}{8}}\}$ |

TABLE 9

| Differential PMI | Differential PM |
|---|---|
| 0 | $\text{diag}\{1, 1, 1, 1\}$ |
| 1 | $\text{diag}\{e^{j\frac{\pi}{8}}, e^{j\frac{2\pi}{8}}, e^{j\frac{3\pi}{8}}, e^{j\frac{4\pi}{8}}\}$ |
| 2 | $\text{diag}\{e^{-j\frac{\pi}{8}}, e^{-j\frac{2\pi}{8}}, e^{-j\frac{3\pi}{8}}, e^{-j\frac{4\pi}{8}}\}$ |
| 3 | $\text{diag}\{e^{j\frac{\pi}{4}}, e^{j\frac{2\pi}{4}}, e^{j\frac{3\pi}{4}}, e^{j\frac{4\pi}{4}}\}$ |
| 4 | $\text{diag}\{e^{-j\frac{\pi}{4}}, e^{-j\frac{2\pi}{4}}, e^{-j\frac{3\pi}{4}}, e^{-j\frac{4\pi}{4}}\}$ |
| 5 | $\text{diag}\{j, -1, -j, 1\}$ |
| 6 | $\text{diag}\{-j, -1, j, 1\}$ |
| 7 | $\text{diag}\{-1, 1, -1, 1\}$ |

TABLE 10

| Differential PMI | Differential PM |
|---|---|
| 0 | $\text{diag}\{1, 1, 1, 1\}$ |
| 1 | $\text{diag}\{e^{j\frac{\pi}{16}}, e^{j\frac{2\pi}{16}}, e^{j\frac{3\pi}{16}}, e^{j\frac{4\pi}{16}}\}$ |
| 2 | $\text{diag}\{e^{-j\frac{\pi}{16}}, e^{-j\frac{2\pi}{16}}, e^{-j\frac{3\pi}{16}}, e^{-j\frac{4\pi}{16}}\}$ |
| 3 | $\text{diag}\{e^{j\frac{\pi}{8}}, e^{j\frac{2\pi}{8}}, e^{j\frac{3\pi}{8}}, e^{j\frac{4\pi}{8}}\}$ |
| 4 | $\text{diag}\{e^{-j\frac{\pi}{8}}, e^{-j\frac{2\pi}{8}}, e^{-j\frac{3\pi}{8}}, e^{-j\frac{4\pi}{8}}\}$ |
| 5 | $\text{diag}\{e^{j\frac{3\pi}{16}}, e^{j\frac{6\pi}{16}}, e^{j\frac{9\pi}{16}}, e^{j\frac{12\pi}{16}}\}$ |
| 6 | $\text{diag}\{e^{-j\frac{3\pi}{16}}, e^{-j\frac{6\pi}{16}}, e^{-j\frac{9\pi}{16}}, e^{-j\frac{12\pi}{16}}\}$ |
| 7 | $\text{diag}\{e^{j\frac{\pi}{4}}, e^{j\frac{2\pi}{4}}, e^{j\frac{3\pi}{4}}, e^{j\frac{4\pi}{4}}\}$ |
| 8 | $\text{diag}\{e^{-j\frac{\pi}{4}}, e^{-j\frac{2\pi}{4}}, e^{-j\frac{3\pi}{4}}, e^{-j\frac{4\pi}{4}}\}$ |
| 9 | $\text{diag}\{e^{j\frac{3\pi}{8}}, e^{j\frac{6\pi}{8}}, e^{j\frac{9\pi}{8}}, e^{j\frac{12\pi}{8}}\}$ |
| 10 | $\text{diag}\{e^{-j\frac{3\pi}{8}}, e^{-j\frac{6\pi}{8}}, e^{-j\frac{9\pi}{8}}, e^{-j\frac{12\pi}{8}}\}$ |
| 11 | $\text{diag}\{e^{j\frac{\pi}{2}}, e^{j\frac{2\pi}{2}}, e^{j\frac{3\pi}{2}}, e^{j\frac{4\pi}{2}}\}$ |
| 12 | $\text{diag}\{e^{-j\frac{\pi}{2}}, e^{-j\frac{2\pi}{2}}, e^{-j\frac{3\pi}{2}}, e^{-j\frac{4\pi}{2}}\}$ |
| 13 | $\text{diag}\{e^{j\frac{3\pi}{4}}, e^{j\frac{6\pi}{4}}, e^{j\frac{9\pi}{4}}, e^{j\frac{12\pi}{4}}\}$ |
| 14 | $\text{diag}\{e^{-j\frac{3\pi}{4}}, e^{-j\frac{6\pi}{4}}, e^{-j\frac{9\pi}{4}}, e^{-j\frac{12\pi}{4}}\}$ |
| 15 | $\text{diag}\{e^{j\pi}, e^{j2\pi}, e^{j3\pi}, e^{j4\pi}\}$ |

TABLE 11

| Differential PMI | Differential PM |
|---|---|
| 0 | $\text{diag}\{1, 1, 1, 1, 1, 1, 1, 1\}$ |
| 1 | $\text{diag}\{1, e^{j\frac{\pi}{16}}, e^{j\frac{2\pi}{16}}, e^{j\frac{3\pi}{16}}, e^{j\frac{4\pi}{16}}, e^{j\frac{5\pi}{16}}, e^{j\frac{6\pi}{16}}, e^{j\frac{7\pi}{16}}\}$ |
| 2 | $\text{diag}\{1, e^{-j\frac{\pi}{16}}, e^{-j\frac{2\pi}{16}}, e^{-j\frac{3\pi}{16}}, e^{-j\frac{4\pi}{16}}, e^{-j\frac{5\pi}{16}}, e^{-j\frac{6\pi}{16}}, e^{-j\frac{7\pi}{16}}\}$ |
| 3 | $\text{diag}\{1, e^{j\frac{\pi}{8}}, e^{j\frac{2\pi}{8}}, e^{j\frac{3\pi}{8}}, e^{j\frac{4\pi}{8}}, e^{j\frac{5\pi}{8}}, e^{j\frac{6\pi}{8}}, e^{j\frac{7\pi}{8}}\}$ |

TABLE 12

| Differential PMI | Differential PM |
|---|---|
| 0 | $\text{diag}\{1, 1, 1, 1, 1, 1, 1, 1\}$ |
| 1 | $\text{diag}\{1, e^{j\frac{\pi}{8}}, e^{j\frac{2\pi}{8}}, e^{j\frac{3\pi}{8}}, e^{j\frac{4\pi}{8}}, e^{j\frac{5\pi}{8}}, e^{j\frac{6\pi}{8}}, e^{j\frac{7\pi}{8}}\}$ |
| 2 | $\text{diag}\{1, e^{-j\frac{\pi}{8}}, e^{-j\frac{2\pi}{8}}, e^{-j\frac{3\pi}{8}}, e^{-j\frac{4\pi}{8}}, e^{-j\frac{5\pi}{8}}, e^{-j\frac{6\pi}{8}}, e^{-j\frac{7\pi}{8}}\}$ |
| 3 | $\text{diag}\{1, e^{j\frac{\pi}{4}}, e^{j\frac{2\pi}{4}}, e^{j\frac{3\pi}{4}}, e^{j\frac{4\pi}{4}}, e^{j\frac{5\pi}{4}}, e^{j\frac{6\pi}{4}}, e^{j\frac{7\pi}{4}}\}$ |
| 4 | $\text{diag}\{1, e^{-j\frac{\pi}{4}}, e^{-j\frac{2\pi}{4}}, e^{-j\frac{3\pi}{4}}, e^{-j\frac{4\pi}{4}}, e^{-j\frac{5\pi}{4}}, e^{-j\frac{6\pi}{4}}, e^{-j\frac{7\pi}{4}}\}$ |
| 5 | $\text{diag}\{1, j, -1, -j, 1, j, -1, -j\}$ |
| 6 | $\text{diag}\{1, -j, -1, j, 1, -j, -1, j\}$ |
| 7 | $\text{diag}\{1, -1, 1, -1, 1, -1, 1, -1\}$ |

TABLE 13

| Differential PMI | Differential PM |
|---|---|
| 0 | $\mathrm{diag}\{1, 1, 1, 1, 1, 1, 1, 1\}$ |
| 1 | $\mathrm{diag}\{1, e^{j\frac{\pi}{16}}, e^{j\frac{2\pi}{16}}, e^{j\frac{3\pi}{16}}, e^{j\frac{4\pi}{16}}, e^{j\frac{5\pi}{16}}, e^{j\frac{6\pi}{16}}, e^{j\frac{7\pi}{16}}\}$ |
| 2 | $\mathrm{diag}\{1, e^{-j\frac{\pi}{16}}, e^{-j\frac{2\pi}{16}}, e^{-j\frac{3\pi}{16}}, e^{-j\frac{4\pi}{16}}, e^{-j\frac{5\pi}{16}}, e^{-j\frac{6\pi}{16}}, e^{-j\frac{7\pi}{16}}\}$ |
| 3 | $\mathrm{diag}\{1, e^{j\frac{\pi}{8}}, e^{j\frac{2\pi}{8}}, e^{j\frac{3\pi}{8}}, e^{j\frac{4\pi}{8}}, e^{j\frac{5\pi}{8}}, e^{j\frac{6\pi}{8}}, e^{j\frac{7\pi}{8}}\}$ |
| 4 | $\mathrm{diag}\{1, e^{-j\frac{\pi}{8}}, e^{-j\frac{2\pi}{8}}, e^{-j\frac{3\pi}{8}}, e^{-j\frac{4\pi}{8}}, e^{-j\frac{5\pi}{8}}, e^{-j\frac{6\pi}{8}}, e^{-j\frac{7\pi}{8}}\}$ |
| 5 | $\mathrm{diag}\{1, e^{j\frac{3\pi}{16}}, e^{j\frac{6\pi}{16}}, e^{j\frac{9\pi}{16}}, e^{j\frac{12\pi}{16}}, e^{j\frac{15\pi}{16}}, e^{j\frac{18\pi}{16}}, e^{j\frac{21\pi}{16}}\}$ |
| 6 | $\mathrm{diag}\{1, e^{-j\frac{3\pi}{16}}, e^{-j\frac{6\pi}{16}}, e^{-j\frac{9\pi}{16}}, e^{-j\frac{12\pi}{16}}, e^{-j\frac{15\pi}{16}}, e^{-j\frac{18\pi}{16}}, e^{-j\frac{21\pi}{16}}\}$ |
| 7 | $\mathrm{diag}\{1, e^{j\frac{\pi}{4}}, e^{j\frac{2\pi}{4}}, e^{j\frac{3\pi}{4}}, e^{j\frac{4\pi}{4}}, e^{j\frac{5\pi}{4}}, e^{j\frac{6\pi}{4}}, e^{j\frac{7\pi}{4}}\}$ |
| 8 | $\mathrm{diag}\{1, e^{-j\frac{\pi}{4}}, e^{-j\frac{2\pi}{4}}, e^{-j\frac{3\pi}{4}}, e^{-j\frac{4\pi}{4}}, e^{-j\frac{5\pi}{4}}, e^{-j\frac{6\pi}{4}}, e^{-j\frac{7\pi}{4}}\}$ |
| 9 | $\mathrm{diag}\{1, e^{j\frac{3\pi}{8}}, e^{j\frac{6\pi}{8}}, e^{j\frac{9\pi}{8}}, e^{j\frac{12\pi}{8}}, e^{j\frac{15\pi}{8}}, e^{j\frac{18\pi}{8}}, e^{j\frac{21\pi}{8}}\}$ |
| 10 | $\mathrm{diag}\{1, e^{-j\frac{3\pi}{8}}, e^{-j\frac{6\pi}{8}}, e^{-j\frac{9\pi}{8}}, e^{-j\frac{12\pi}{8}}, e^{-j\frac{15\pi}{8}}, e^{-j\frac{18\pi}{8}}, e^{-j\frac{21\pi}{8}}\}$ |
| 11 | $\mathrm{diag}\{1, j, -1, -j, 1, j, -1, -j\}$ |
| 12 | $\mathrm{diag}\{1, -j, -1, j, 1, -j, -1, j\}$ |
| 13 | $\mathrm{diag}\{1, e^{j\frac{3\pi}{4}}, -j, e^{j\frac{\pi}{4}}, -1, -e^{j\frac{3\pi}{4}}, j, -e^{j\frac{\pi}{4}}\}$ |
| 14 | $\mathrm{diag}\{1, e^{-j\frac{3\pi}{4}}, j, e^{-j\frac{\pi}{4}}, -1, -e^{-j\frac{3\pi}{4}}, -j, -e^{-j\frac{\pi}{4}}\}$ |
| 15 | $\mathrm{diag}\{1, -1, 1, -1, 1, -1, 1, -1\}$ |

TABLE 14

| Differential PMI | Differential PM |
|---|---|
| 0 | $\mathrm{diag}\{1, 1, 1, 1, 1, 1, 1, 1\}$ |
| 1 | $\mathrm{diag}\{e^{j\frac{\pi}{16}}, e^{j\frac{2\pi}{16}}, e^{j\frac{3\pi}{16}}, e^{j\frac{4\pi}{16}}, e^{j\frac{5\pi}{16}}, e^{j\frac{6\pi}{16}}, e^{j\frac{7\pi}{16}}, e^{j\frac{8\pi}{16}}\}$ |
| 2 | $\mathrm{diag}\{e^{-j\frac{\pi}{16}}, e^{-j\frac{2\pi}{16}}, e^{-j\frac{3\pi}{16}}, e^{-j\frac{4\pi}{16}}, e^{-j\frac{5\pi}{16}}, e^{-j\frac{6\pi}{16}}, e^{-j\frac{7\pi}{16}}, e^{-j\frac{8\pi}{16}}\}$ |
| 3 | $\mathrm{diag}\{e^{j\frac{\pi}{8}}, e^{j\frac{2\pi}{8}}, e^{j\frac{3\pi}{8}}, e^{j\frac{4\pi}{8}}, e^{j\frac{5\pi}{8}}, e^{j\frac{6\pi}{8}}, e^{j\frac{7\pi}{8}}, e^{j\frac{8\pi}{8}}\}$ |

TABLE 15

| Differential PMI | Differential PM |
|---|---|
| 0 | $\mathrm{diag}\{1, 1, 1, 1, 1, 1, 1, 1\}$ |
| 1 | $\mathrm{diag}\{e^{j\frac{\pi}{8}}, e^{j\frac{2\pi}{8}}, e^{j\frac{3\pi}{8}}, e^{j\frac{4\pi}{8}}, e^{j\frac{5\pi}{8}}, e^{j\frac{6\pi}{8}}, e^{j\frac{7\pi}{8}}, e^{j\frac{8\pi}{8}}\}$ |

TABLE 15-continued

| Differential PMI | Differential PM |
|---|---|
| 2 | $\mathrm{diag}\{e^{-j\frac{\pi}{8}}, e^{-j\frac{2\pi}{8}}, e^{-j\frac{3\pi}{8}}, e^{-j\frac{4\pi}{8}}, e^{-j\frac{5\pi}{8}}, e^{-j\frac{6\pi}{8}}, e^{-j\frac{7\pi}{8}}, e^{-j\frac{8\pi}{8}}\}$ |
| 3 | $\mathrm{diag}\{e^{j\frac{\pi}{4}}, e^{j\frac{2\pi}{4}}, e^{j\frac{3\pi}{4}}, e^{j\frac{4\pi}{4}}, e^{j\frac{5\pi}{4}}, e^{j\frac{6\pi}{4}}, e^{j\frac{7\pi}{4}}, e^{j\frac{8\pi}{4}}\}$ |
| 4 | $\mathrm{diag}\{e^{-j\frac{\pi}{4}}, e^{-j\frac{2\pi}{4}}, e^{-j\frac{3\pi}{4}}, e^{-j\frac{4\pi}{4}}, e^{-j\frac{5\pi}{4}}, e^{-j\frac{6\pi}{4}}, e^{-j\frac{7\pi}{4}}, e^{-j\frac{8\pi}{4}}\}$ |
| 5 | $\mathrm{diag}\{j, -1, -j, 1, j, -1, -j, 1\}$ |
| 6 | $\mathrm{diag}\{-j, -1, j, 1, -j, -1, j, 1\}$ |
| 7 | $\mathrm{diag}\{-1, 1, -1, 1, -1, 1, -1, 1\}$ |

TABLE 16

| Differential PMI | Differential PM |
|---|---|
| 0 | $\mathrm{diag}\{1, 1, 1, 1, 1, 1, 1, 1\}$ |
| 1 | $\mathrm{diag}\{e^{j\frac{\pi}{16}}, e^{j\frac{2\pi}{16}}, e^{j\frac{3\pi}{16}}, e^{j\frac{4\pi}{16}}, e^{j\frac{5\pi}{16}}, e^{j\frac{6\pi}{16}}, e^{j\frac{7\pi}{16}}, e^{j\frac{8\pi}{16}}\}$ |
| 2 | $\mathrm{diag}\{e^{-j\frac{\pi}{16}}, e^{-j\frac{2\pi}{16}}, e^{-j\frac{3\pi}{16}}, e^{-j\frac{4\pi}{16}}, e^{-j\frac{5\pi}{16}}, e^{-j\frac{6\pi}{16}}, e^{-j\frac{7\pi}{16}}, e^{-j\frac{8\pi}{16}}\}$ |
| 3 | $\mathrm{diag}\{e^{j\frac{\pi}{8}}, e^{j\frac{2\pi}{8}}, e^{j\frac{3\pi}{8}}, e^{j\frac{4\pi}{8}}, e^{j\frac{5\pi}{8}}, e^{j\frac{6\pi}{8}}, e^{j\frac{7\pi}{8}}, e^{j\frac{8\pi}{8}}\}$ |
| 4 | $\mathrm{diag}\{e^{-j\frac{\pi}{8}}, e^{-j\frac{2\pi}{8}}, e^{-j\frac{3\pi}{8}}, e^{-j\frac{4\pi}{8}}, e^{-j\frac{5\pi}{8}}, e^{-j\frac{6\pi}{8}}, e^{-j\frac{7\pi}{8}}, e^{-j\frac{8\pi}{8}}\}$ |
| 5 | $\mathrm{diag}\{e^{j\frac{3\pi}{16}}, e^{j\frac{6\pi}{16}}, e^{j\frac{9\pi}{16}}, e^{j\frac{12\pi}{16}}, e^{j\frac{15\pi}{16}}, e^{j\frac{18\pi}{16}}, e^{j\frac{21\pi}{16}}, e^{j\frac{24\pi}{16}}\}$ |
| 6 | $\mathrm{diag}\{e^{-j\frac{3\pi}{16}}, e^{-j\frac{6\pi}{16}}, e^{-j\frac{9\pi}{16}}, e^{-j\frac{12\pi}{16}}, e^{-j\frac{15\pi}{16}}, e^{-j\frac{18\pi}{16}}, e^{-j\frac{21\pi}{16}}, e^{-j\frac{24\pi}{16}}\}$ |
| 8 | $\mathrm{diag}\{e^{-j\frac{\pi}{4}}, e^{-j\frac{2\pi}{4}}, e^{-j\frac{3\pi}{4}}, e^{-j\frac{4\pi}{4}}, e^{-j\frac{5\pi}{4}}, e^{-j\frac{6\pi}{4}}, e^{-j\frac{7\pi}{4}}, e^{-j\frac{8\pi}{4}}\}$ |
| 9 | $\mathrm{diag}\{e^{j\frac{3\pi}{8}}, e^{j\frac{6\pi}{8}}, e^{j\frac{9\pi}{8}}, e^{j\frac{12\pi}{8}}, e^{j\frac{15\pi}{8}}, e^{j\frac{18\pi}{8}}, e^{j\frac{21\pi}{8}}, e^{j\frac{24\pi}{8}}\}$ |
| 10 | $\mathrm{diag}\{e^{-j\frac{3\pi}{8}}, e^{-j\frac{6\pi}{8}}, e^{-j\frac{9\pi}{8}}, e^{-j\frac{12\pi}{8}}, e^{-j\frac{15\pi}{8}}, e^{-j\frac{18\pi}{8}}, e^{-j\frac{21\pi}{8}}, e^{-j\frac{24\pi}{8}}\}$ |
| 11 | $\mathrm{diag}\{j, -1, -j, 1, j, -1, -j, 1\}$ |
| 12 | $\mathrm{diag}\{-j, -1, j, 1, -j, -1, j, 1\}$ |
| 13 | $\mathrm{diag}\{e^{j\frac{3\pi}{4}}, -j, e^{j\frac{\pi}{4}}, -1, -e^{j\frac{3\pi}{4}}, j, -e^{j\frac{\pi}{4}}, 1\}$ |
| 14 | $\mathrm{diag}\{e^{-j\frac{3\pi}{4}}, j, e^{-j\frac{\pi}{4}}, -1, -e^{-j\frac{3\pi}{4}}, -j, -e^{-j\frac{\pi}{4}}, 1\}$ |
| 15 | $\mathrm{diag}\{-1, 1, -1, 1, -1, 1, -1, 1\}$ |

In the method for acquiring a PMI according to the embodiment of the present invention, acquiring a reference PMI and a differential PMI according to a non-differential codebook and a diagonal differential codebook can reduce the feedback overhead and improve the feedback precision so as to improve the feedback performance; and the fact that a codeword included in the diagonal differential codebook is a diagonal matrix can maintain amplitude characteristics (for example, a constant modulus characteristic, and a finite character set constraint characteristic) of elements already existing in the non-differential codebook. Moreover, a non-differential codebook obtained from a rotated Hadamard matrix may be used. Individual columns of the Hadamard matrix may be matched with eigenvectors of strongly correlated channels and weakly correlated channels in a uniform linear array transmitting antenna arrangement and a dual-polarized transmitting antenna arrangement respectively so as to improve the accuracy of quantization. The rotated matrix is in the form of a diagonal matrix, and this can maintain a fine quantization of the space on basis of the quantization of the Hadamard matrix. Furthermore, each of elements of the Hadamard matrix is +1 or −1, which can satisfy the constant modulus characteristic; and multiplication of the Hadamard matrix with other matrixes or vectors may be simplified into addition or subtraction operations, which can significantly reduce the computational complexity of CQI calculation based on the SINR, PMI selection and rank adaptation. The individual columns of the normalized Hadamard matrix are orthogonal to each other, and this can maintain the unitary matrix characteristic of codewords in the non-differential codebook so that individual sent spatial streams are guaranteed to have the same power distribution and, in case of a full rank, individual transmitting antennas have the same power distribution. Furthermore, the approach to obtain a non-differential codebook from a rotated Hadamard matrix may be applied to cases where the number of transmitting antennas is 2, 4, 8, 16, 32, 64 or the like, and the obtained non-differential codebook may satisfy the constant modulus characteristic and the unitary matrix characteristic and reduce the computational complexity of CQI calculation based on the SINR, PMI selection and rank adaptation. Additionally, the feedback performance can be further improved through further optimization of the codewords in the diagonal differential codebook.

Embodiment 6

With increase of transmitting antennas, a dual-polarized transmitting antenna array will become a universal arrangement. Therefore, this embodiment of the present invention provides a method for acquiring a PMI. This method differs from the methods described in Embodiments 2-5 in that, the method according to the embodiment of the present invention acquires a diagonal differential codebook of a dual-polarized transmitting antenna array (which may be referred to as a dual-polarized diagonal differential codebook) by using a diagonal differential codebook of monopolar transmitting antennas (which may be referred to as a monopolar diagonal differential codebook) in Embodiment 2-5.

Specifically, when, in a dual-polarized transmitting antenna array including N transmitting antennas, the first N/2 ($1^{st}$, $2^{nd}$, $3^{rd}$, . . . , $N/2^{th}$) transmitting antennas form a group of co-polarized transmitting antennas and the remaining N/2 ($N/2+1^{th}$, $N/2+2^{th}$, . . . , $N^{th}$) transmitting antennas form another group of co-polarized transmitting antennas, the codeword $C_k$ included in the diagonal differential codebook has a structure as shown in Equation (20):

$$C_k = \text{diag}\{S_m, e^{j\phi_n} S_m\} \quad (20)$$

where, $S_m = \text{diag}\{e^{j\theta_{m,1}}, e^{j\theta_{m,2}}, \ldots, e^{j\theta_{m,i}}, \ldots, e^{j\theta_{m,N/2}}\}$, k represents a differential PMI included in the diagonal differential codebook D, k=0, 1 . . . |D|−1, |D| represents the number of codewords included in the diagonal differential codebook D, $j^2=-1$, N represents the number of transmitting antennas and is an even integer, $\phi_n$ and $\theta_{m,i}$ represent phase shift parameters, m and n are natural numbers, and i=1, 2 . . . , N/2.

It should be noted that, in the matrix of Equation (20), the first N/2 diagonal elements correspond to a group of co-polarized transmitting antennas and the remaining N/2 diagonal elements correspond to another group of co-polarized transmitting antennas. Moreover, if the arrangement of the dual-polarized transmitting antenna array changes, then it just needs to have positions of the aforesaid elements swapped correspondingly; and the structure is similar to those described before, and will not be further described herein.

In the method for acquiring a PMI according to the embodiment of the present invention, acquiring a reference PMI and a differential PMI according to a non-differential codebook and a diagonal differential codebook can reduce the feedback overhead and improve the feedback precision so as to improve the feedback performance; and the fact that a codeword included in the diagonal differential codebook is form a diagonal matrix can maintain amplitude characteristics (for example, a constant modulus characteristic, and a finite character set constraint characteristic) of elements already existing in the non-differential codebook. Moreover, a non-differential codebook obtained from a rotated Hadamard matrix may be used. Individual columns of the Hadamard matrix may be matched with eigenvectors of strongly correlated channels and weakly correlated channels in a uniform linear array transmitting antenna arrangement and a dual-polarized transmitting antenna arrangement respectively so as to improve the accuracy of quantization. The rotated matrix is in the form of a diagonal matrix, and this can maintain a fine quantization of the space on basis of the quantization of the Hadamard matrix. Furthermore, each of elements of the Hadamard matrix is +1 or −1, which can satisfy the constant modulus characteristic; and multiplication of the Hadamard matrix with other matrixes or vectors may be simplified into addition or subtraction operations, which can significantly reduce the computational complexity of CQI calculation based on the SINR, PMI selection and rank adaptation. The individual columns of the normalized Hadamard matrix are orthogonal to each other, and this can maintain the unitary matrix characteristic of codewords in the non-differential codebook so that individual sent spatial streams are guaranteed to have the same power distribution and, in case of a full rank, individual transmitting antennas have the same power distribution. Furthermore, the approach to obtain a non-differential codebook from a rotated Hadamard matrix may be applied to cases where the number of transmitting antennas is 2, 4, 8, 16, 32, 64 or the like, and the obtained non-differential codebook may satisfy the constant modulus characteristic and the unitary matrix characteristic and reduce the computational complexity of CQI calculation based on the SINR, PMI selection and rank adaptation. Additionally, forming a diagonal differential codebook of a dual-polarized transmitting antenna array by using a diagonal differential codebook of monopolar transmitting antennas can make full use of features of the dual-polarized transmitting antenna array so as to improve the performance of the diagonal differential codebook in the dual-polarized transmitting antenna array arrangement.

The methods in Embodiments 2-6 have been described by taking the downlink system (where the NodeB sends data to the UE) as an example. It should be noted that, the methods described in Embodiments 2-6 are also applicable to an uplink system (for example, a system where the UE sends data to the NodeB). The methods described in Embodiments 2-6 applied to the uplink system differs from those applied to the downlink system in that: the NodeB acquires a reference PMI and a differential PMI and notifies the UE of the reference PMI and the differential PMI in steps similar to those of Embodiments 2-6; and the UE receives the notification from the NodeB and performs precoding, and sends data to the NodeB, which receives and detects the data.

Embodiment 7

Figure 5:
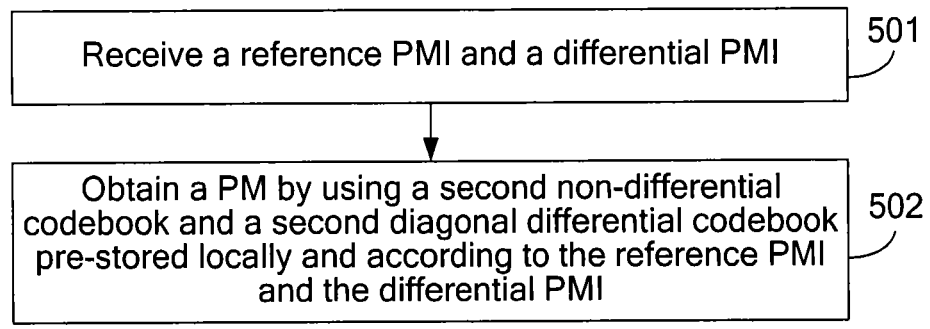
FIG. 5 is a flowchart of a method for acquiring a PM according to Embodiment 7 of the present invention.

Referring to FIG. 5, this embodiment of the present invention provides a method for acquiring a PM, where the method includes the following steps.

501: Receive a reference PMI and a differential PMI.

The reference PMI and the differential PMI are obtained according to a first non-differential codebook and a first diagonal differential codebook and then sent by a data receiving end, and a codeword included in the first diagonal differential codebook is a diagonal matrix.

The first non-differential codebook $W^{(r)}$ may be a non-differential codebook set according to the embodiment of the present invention. Codewords in the first non-differential codebook $W^{(r)}$ are obtained from a rotated Hadamard matrix, and specifically, a codeword $W_k^{(r)}$ included in the first non-differential codebook $W^{(r)}$ may have the following structure:

$$W_k^{(r)} = \frac{1}{\sqrt{r}}(R_{i_k} H_{n,j_k})^{(r)}$$

where, k represents a non-differential PMI included in the first non-differential codebook $W^{(r)}$, k=0, 1 ... $|W^{(r)}|-1$, $|W^{(r)}|$ represents the number of codewords included in the first non-differential codebook $W^{(r)}$, r represents a rank of the codewords included in the first non-differential codebook, $i_k$ represents an index of a diagonal matrix $R_{i_k}$ corresponding to k, $R_{i_k}$ represents a $n^{th}$ order diagonal matrix corresponding to $i_k$, $j_k$ represents an index of a normalized Hadamard matrix corresponding to k, $H_{n,j_k}$ represents a $n^{th}$ order normalized Hadamard matrix corresponding to $j_k$, a value of n is equal to the number of transmitting antennas, and $(R_{i_k} H_{n,j_k})^{(r)}$ represents a matrix formed by selecting r columns from a rotated Hadamard matrix $R_{i_k} H_{n,j_k}$. The structure of the diagonal matrix $R_{i_k}$ may be represented as:

$$R_{i_k} = \text{diag}\{b_{i_k,1} e^{j\delta_{i_k,1}}, b_{i,2} e^{j\delta_{i_k,2}} \ldots b_{i,t} e^{j\delta_{i_k,t}} \ldots b_{i,n} e^{j\delta_{i_k,n}}\}$$

where, $b_{i_k}$ is a real number, $j^2=-1$, $\delta_{i_k,t}$ represents a phase shift, t=1, 2, . . . , n, and a value of n is equal to the number of transmitting antennas. In the step of forming the matrix $(R_{i_k} H_{n,j_k})^{(r)}$ by selecting r columns from the rotated Hadamard matrix $R_{i_k} H_{n,j_k}$, which r columns are selected may be determined by using a correlation method depending on actual applications. For uncorrelated channels, the columns should be selected in such a way that in a set) $\{(R_{i_k} H_{n,j_k})^{(r)}\}$ formed by extracting one r-column sub-matrix from each matrix $R_{i_k} H_{n,j_k}$, each of matrixes has a maximum chordal distance (for the uncorrelated channel); and for correlated channels, the columns should be selected in such a way that in a set $\{(R_{i_k} H_{n,j_k})^{(r)}\}$ formed by extracting one r-column sub-matrix from each matrix $R_{i_k} H_{n,j_k}$, each of matrixes has a maximum gain in a zero direction of a spatial projection of an antenna array. Any other feasible method may also be employed for selection, and no limitation is made thereon.

Specifically, the codeword $W_k^{(r)}$ included in the first non-differential codebook may have the following structure:

$$W_k^{(r)} = \frac{1}{\sqrt{r}}(R_{i_k} H_{n,j_k} R_{i_k}^H)^{(r)}$$

where, k represents a PMI included in the first non-differential codebook $W^{(r)}$, k=0, 1 ... $|W^{(r)}|-1$, $|W^{(r)}|$ represents the number of codewords included in the first non-differential codebook $W^{(r)}$, r represents a rank of the codewords included in the first non-differential codebook $W^{(r)}$, $i_k$ represents an index of a diagonal matrix $R_{i_k}$ corresponding to k, $R_{i_k}$ represents a $n^{th}$ order diagonal matrix corresponding to $i_k$, $j_k$ represents an index of a normalized Hadamard matrix corresponding to k, $H_{n,j_k}$ represents a $n^{th}$ order normalized Hadamard matrix corresponding to $j_k$, a value of n is equal to the number of transmitting antennas, and $(R_{i_k} H_{n,j_k} R_{i_k}^H)^{(r)}$ represents a matrix formed by selecting r columns from a rotated Hadamard matrix $R_{i_k} H_{n,j_k} R_{i_k}^H$.

The structure of the diagonal matrix $R_{i_k}$ may be represented as:

$$R_{i_k} = \text{diag}\{b_{i_k,1} e^{j\delta_{i_k,1}}, b_{i,2} e^{j\delta_{i_k,2}} \ldots b_{i,t} e^{j\delta_{i_k,t}} \ldots b_{i,n} e^{j\delta_{i_k,n}}\}$$

where, $b_{i_k,t}$ is a real number, $j^2=-1$, $\delta_{i_k,t}$ represents a phase shift, t=1, 2, . . . , n and a value of n is equal to the number of transmitting antennas. In the step of forming the matrix $(R_{i_k} H_{n,j_k} R_{i_k}^H)^{(r)}$ by selecting r columns from the rotated Hadamard matrix $R_{i_k} H_{n,j_k} R_{i_k}^H$ which r columns are selected may be determined by using a correlation method depending on actual applications. For example, for uncorrelated channels, the columns should be selected in such a way that in a set $\{(R_{i_k} H_{n,j_k} R_{i_k}^H)^{(r)}\}$ formed by extracting one r-column sub-matrix from each matrix $R_{i_k} H_{n,j_k} R_{i_k}^H$ respectively, each of matrixes has a maximum chordal distance; and for correlated channels, the columns should be selected in such a way that in a set $\{(R_{i_k} H_{n,j_k} R_{i_k}^H)^{(r)}\}$ formed by extracting one r-column sub-matrix from each matrix $R_{i_k} H_{n,j_k} R_{i_k}^H$ respectively, each of matrixes has a maximum gain in a zero direction of a spatial projection of an antenna array. Any other feasible method may also be employed for selection, and no limitation is made thereon.

502: Obtain a PM by using a second non-differential codebook and a second diagonal differential codebook pre-stored locally and according to the reference PMI and the differential PMI.

The second non-differential codebook and the second diagonal differential codebook are consistent with the first non-differential codebook and the first diagonal differential codebook respectively.

Further, for an SU-MIMO system, the step of obtaining the PM by using the second non-differential codebook and the second diagonal differential codebook pre-stored locally and according to the reference PMI and the differential PMI may include:

obtaining a codeword corresponding to the reference PMI through query from the second non-differential codebook according to the reference PMI, and obtaining a codeword corresponding to the differential PMI through query from the second diagonal differential codebook according to the differential PMI; and multiplying the codeword corresponding to the reference PMI by the codeword corresponding to the differential PMI to obtain a multiplication result for use as the PM.

Further, for an MU-MIMO system, the step of obtaining the PM by using the second non-differential codebook and the second diagonal differential codebook pre-stored locally and according to the reference PMI and the differential PMI may include:

calculating the PM by using the ZF-BF algorithm or based on the maximum SLNR criterion and according to reference PMIs and differential PMIs of individual data receiving ends that are simultaneously paired.

In the method for acquiring a PM according to the embodiment of the present invention, a PM is acquired by using a second non-differential codebook and a second diagonal differential codebook pre-stored locally and according to a reference PMI and a differential PMI. The fact that a codeword included in the second diagonal differential codebook is few a diagonal matrix can maintain amplitude characteristics (for example, a constant modulus characteristic, and a finite character set constraint characteristic) of elements already existing in the non-differential codebook or facilitate power distribution among antennas. Moreover, a non-differential codebook obtained from a rotated Hadamard matrix may be used as the second non-differential codebook. Individual columns of the Hadamard matrix may be matched with eigenvectors of strongly correlated channels and weakly correlated channels in a uniform linear array transmitting antenna arrangement and a dual-polarized transmitting antenna arrangement respectively so as to improve the accuracy of quantization. The rotated matrix is in the form of a diagonal matrix, and this can maintain a fine quantization of the space on basis of the quantization of the Hadamard matrix. Furthermore, each of elements of the Hadamard matrix is +1 or −1, which can maintain the constant modulus characteristic of the non-differential codebook; and multiplication of the Hadamard matrix with other matrixes or vectors may be simplified into addition or subtraction operations, which can significantly reduce the computational complexity of CQI calculation based on the SINR, PMI selection and rank adaptation. The individual columns of the normalized Hadamard matrix are orthogonal to each other, and this can maintain the unitary matrix characteristic of codewords in the non-differential codebook so that individual sent spatial streams are guaranteed to have the same power distribution and, in case of a full rank, individual transmitting antennas have the same power distribution. Additionally, the approach to obtain a non-differential codebook from a rotated Hadamard matrix may be applied to cases where the number of transmitting antennas is 2, 4, 8, 16, 32, 64 or the like, and the obtained non-differential codebook may satisfy the constant modulus characteristic and the unitary matrix characteristic and reduce the computational complexity of CQI calculation based on the SINR, PMI selection and rank adaptation.

Embodiment 8

Figure 6:
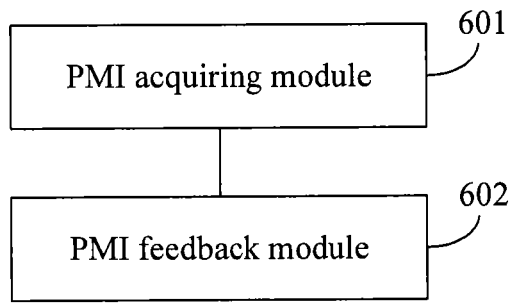
FIG. 6 is a schematic structure diagram of an apparatus for acquiring a PMI according to Embodiment 8 of the present invention.

Referring to FIG. 6, this embodiment of the present invention provides an apparatus for acquiring a PMI, where the apparatus includes:

a PMI acquiring module 601, configured to acquire a reference PMI and a differential PMI according to a first non-differential codebook and a first diagonal differential codebook, where a codeword included in the first diagonal differential codebook is a diagonal matrix.

The first non-differential codebook $W^{(r)}$ may be a non-differential codebook set according to the embodiment of the present invention. Codewords in the first non-differential codebook $W^{(r)}$ are obtained from a rotated Hadamard matrix, and specifically, a codeword $W_k^{(r)}$ included in the first non-differential codebook $W^{(r)}$ may have the following structure:

$$W_k^{(r)} = \frac{1}{\sqrt{r}} (R_{i_k} H_{n,j_k})^{(r)}$$

where, k represents a non-differential PMI included in the first non-differential codebook $W^{(r)}$, k=0, 1 ... $|W^{(r)}|-1$, $|W^{(r)}|$ represents the number of codewords included in the first non-differential codebook $W^{(r)}$, r represents a rank of the codewords included in the first non-differential codebook, $i_k$ represents an index of a diagonal matrix $R_{i_k}$ corresponding to k, $R_{i_k}$ represents a $n^{th}$ order diagonal matrix corresponding to $i_k$, $j_k$ represents an index of a normalized Hadamard matrix corresponding to k, $H_{n,j_k}$ represents a $n^{th}$ order normalized Hadamard matrix corresponding to $j_k$, a value of n is equal to the number of transmitting antennas, and $(R_{i_k} H_{n,j_k})^{(r)}$ represents a matrix formed by selecting r columns from a rotated Hadamard matrix $R_{i_k} H_{n,j_k}$.

The structure of the diagonal matrix $R_{i_k}$ may be represented as:

$$R_{i_k} = \text{diag}\{b_{i_k,1} e^{j\delta_{i_k,1}}, b_{i_k,2} e^{j\delta_{i_k,2}} \ldots b_{i,t} e^{j\delta_{i_k,t}} \ldots b_{i,n} e^{j\delta_{i_k,n}}\}$$

where, $b_{i_k,t}$ is a real number, $j^2=-1$, $\delta_{i_k,t}$ represents a phase shift, t=1, 2, ..., n, and a value of n is equal to the number of transmitting antennas. In the step of forming the matrix $(R_{i_k} H_{n,j_k})^{(r)}$ by selecting r columns from the rotated Hadamard matrix $R_{i_k} H_{n,j_k}$, which r columns are selected may be determined by using a correlation method depending on actual applications. For example, for uncorrelated channels, the columns should be selected in such a way that in a set $\{(R_{i_k} H_{n,j_k})^{(r)}\}$ formed by extracting one r-column sub-matrix from each matrix $R_{i_k} H_{n,j_k}$, each of matrixes has a maximum chordal distance (for the uncorrelated channels); and for correlated channels, the columns should be selected in such a way that in a set $\{(R_{i_k} H_{n,j_k})^{(r)}\}$ formed by extracting one r-column sub-matrix from each matrix $R_{i_k} H_{n,j_k}$, each of matrixes has a maximum gain in a zero direction of a spatial projection of an antenna array. Any other feasible method may also be employed for selection, and no limitation is made thereon. Specifically, the codeword $W_k^{(r)}$ included in the first non-differential codebook may have the following structure:

$$W_k^{(r)} = \frac{1}{\sqrt{r}} (R_{i_k} H_{n,j_k} R_{i_k}^H)^{(r)}$$

where, k represents a PMI included in the first non-differential codebook $W^{(r)}$, k=0, 1 ... $|W^{(r)}|-1$, $|W^{(r)}|$ represents the number of codewords included in the first non-differential codebook $W^{(r)}$, r represents a rank of the codewords included in the first non-differential codebook $W^{(r)}$, $i_k$ represents an index of a diagonal matrix $R_{i_k}$ corresponding to k, $R_{i_k}$ represents a $n^{th}$ order diagonal matrix corresponding to $i_k$, $j_k$ represents an index of a normalized Hadamard matrix corresponding to k, $H_{n,j_k}$ represents a $n^{th}$ order normalized Hadamard matrix corresponding to $j_k$, a value of n is equal to the number of transmitting antennas, and $(R_{i_k} H_{n,j_k} R_{i_k}^H)^{(r)}$ represents a matrix formed by selecting r columns from a rotated Hadamard matrix $R_{i_k} H_{n,j_k} R_{i_k}^H$.

The structure of the diagonal matrix $R_{i_k}$ may be represented as:

$$R_{i_k} = \text{diag}\{b_{i_k,1} e^{j\delta_{i_k,1}}, b_{i,2} e^{j\delta_{i_k,2}} \ldots b_{i,t} e^{\delta_{i_k,t}} \ldots b_{i,n} e^{\delta_{i_k,n}}\}$$

where, $b_{i_k,t}$ is a real number, $\delta_{i_k,t}$ represents a phase shift, t=1, 2, ..., n, and a value of n is equal to the number of transmitting antennas. In the step of forming the matrix $(R_{i_k} H_{n,j_k} R_{i_k}^H)^{(r)}$ by selecting r columns from the rotated Hadamard matrix $R_{i_k} H_{n,j_k} R_{i_k}^H$, which r columns are selected may be determined by using a correlation method depending on actual applications. For example, for uncorrelated channels, the columns should be selected in such a way that in a set $\{(R_{i_k}H_{n,j_k}R_{i_k}{}^H)^{(r)}\}$ formed by extracting one r-column sub-matrix from each matrix $R_{i_k}H_{n,j_k}R_{i_k}{}^H$, each of matrixes has a maximum chordal distance; and for correlated channels, the columns should be selected in such a way that in a set $\{(R_{i_k}H_{n,j_k}R_{i_k}{}^H)^{(r)}\}$ formed by extracting one r-column sub-matrix from each matrix $R_{i_k}H_{n,j_k}R_{i_k}{}^H$, each of matrixes has a maximum gain in a zero direction of a spatial projection of an antenna array. Any other feasible method may also be employed for selection, and no limitation is made thereon.

Further, the PMI acquiring module 601 may include:

a reference PMI calculating unit, configured to calculate the reference PMI based on a preset criterion and according to the first non-differential codebook; and a differential PMI calculating unit, configured to, after the reference PMI is obtained by the reference PMI calculating unit, calculate the differential PMI based on the preset criterion and according to the first non-differential codebook, the first diagonal differential codebook, and the reference PMI; or the PMI acquiring module 601 may include:

a reference PMI and differential PMI calculating unit, configured to calculate the reference PMI and the differential PMI based on the preset criterion and according to the first non-differential codebook and the first diagonal differential codebook.

Further, referring to FIG. 6, the apparatus further includes:

a PMI feedback module 602, configured to, after the reference PMI and the differential PMI are obtained by the PMI acquiring module 601, feed back the reference PMI and the differential PMI to a data sending end so that, according to the reference PMI and the differential PMI, a PM is obtained by the data sending end using a second non-differential codebook and a second diagonal differential codebook pre-stored locally, where the second non-differential codebook and the second diagonal differential codebook are consistent with the first non-differential codebook and the first diagonal differential codebook respectively.

In the apparatus for acquiring a PMI according to the embodiment of the present invention, acquiring a reference PMI and a differential PMI according to a non-differential codebook and a diagonal differential codebook can reduce the feedback overhead and improve the feedback precision so as to improve the feedback performance; and the fact that a codeword included in the diagonal differential codebook is to form a diagonal matrix can maintain amplitude characteristics (for example, a constant modulus characteristic, and a finite character set constraint characteristic) of elements already existing in the non-differential codebook. Moreover, a non-differential codebook obtained from a rotated Hadamard matrix may be used. Individual columns of the Hadamard matrix may be matched with eigenvectors of strongly correlated channels and weakly correlated channels in a uniform linear array transmitting antenna arrangement and a dual-polarized transmitting antenna arrangement respectively so as to improve the accuracy of quantization. The rotated matrix is in the form of a diagonal matrix, and this can maintain a fine quantization of the space on basis of the quantization of the Hadamard matrix. Furthermore, each of elements of the Hadamard matrix is +1 or −1, which can maintain the constant modulus characteristic of the non-differential codebook. Moreover, multiplication of the Hadamard matrix with other matrixes or vectors may be simplified into addition or subtraction operations, which can significantly reduce the computational complexity of CQI calculation based on the SINR, PMI selection and rank adaptation. The individual columns of the normalized Hadamard matrix are orthogonal to each other, and this can maintain the unitary matrix characteristic of codewords in the non-differential codebook so that individual sent spatial streams are guaranteed to have the same power distribution and, in case of a full rank, individual transmitting antennas have the same power distribution. Additionally, the approach to obtain a non-differential codebook from a rotated Hadamard matrix may be applied to cases where the number of transmitting antennas is 2, 4, 8, 16, 32, 64 or the like, and the obtained non-differential codebook may satisfy the constant modulus characteristic and the unitary matrix characteristic and reduce the computational complexity of CQI calculation based on the SINR, PMI selection and rank adaptation.

Embodiment 9

Figure 7:
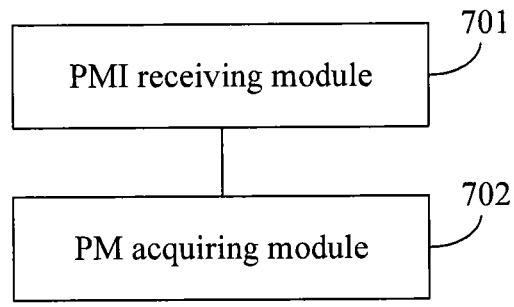
FIG. 7 is a schematic structure diagram of an apparatus for acquiring a PM according to Embodiment 9 of the present invention.

Referring to FIG. 7, this embodiment of the present invention provides an apparatus for acquiring a PM, which includes a PMI receiving module 701 and a PM acquiring module 702.

The PMI receiving module 701 is configured to receive a reference PMI and a differential PMI, where the reference PMI and the differential PMI are obtained according to a first non-differential codebook and a first diagonal differential codebook and then sent by a data receiving end, and a codeword included in the first diagonal differential codebook is a diagonal matrix.

The first non-differential codebook $W^{(r)}$ may be a non-differential codebook set according to the embodiment of the present invention. Codewords in the first non-differential codebook $W^{(r)}$ are obtained from a rotated Hadamard matrix, and specifically, a codeword $W_k^{(r)}$ included in the first non-differential codebook $W^{(r)}$ may have the following structure:

$$W_k^{(r)} = \frac{1}{\sqrt{r}}(R_{i_k}H_{n,j_k})^{(r)}$$

where, k represents a non-differential PMI included in the first non-differential codebook $W^{(r)}$, $k=0, 1 \ldots |W^{(r)}|-1$, $|W^{(r)}|$ represents the number of codewords included in the first non-differential codebook $W^{(r)}$, r represents a rank of the codewords included in the first non-differential codebook, $i_k$ represents an index of a diagonal matrix $R_{i_k}$ corresponding to k, $R_{i_k}$ represents a $n^{th}$ order diagonal matrix corresponding to $i_k$, $j_k$ represents an index of a normalized Hadamard matrix corresponding to k, $H_{n,j_k}$ represents a $n^{th}$ order Hadamard matrix corresponding to $j_k$, a value of n is equal to the number of transmitting antennas, and $(R_{i_k}H_{n,j_k})^{(r)}$ represents a matrix formed by selecting r columns from a rotated Hadamard matrix $R_{i_k}H_{n,j_k}$.

The structure of the diagonal matrix $R_{i_k}$ may be represented as:

$$R_{i_k} = \text{diag}\{b_{i_k,1}e^{j\delta_{i_k,1}}, b_{i,2}e^{j\delta_{i_k,2}} \ldots b_{i,t}e^{j\delta_{i_k,t}} \ldots b_{i,n}e^{j\delta_{i_k,n}}\}$$

where, $b_{i_k,t}$ is a real number, $j^2=-1$, $\delta_{i_k,t}$ represents a phase shift, $t=1, 2, \ldots, n$ and a value of n is equal to the number of transmitting antennas. In the step of forming the matrix $(R_{i_k}H_{n,j_k})^{(r)}$ by selecting r columns from the rotated Hadamard matrix $R_{i_k}H_{n,j_k}$, which r columns are selected may be determined by using a correlation method depending on actual applications. For example, for uncorrelated channels, the columns should be selected in such a way that in a set $\{(R_{i_k}H_{n,j_k})^{(r)}\}$ formed by extracting one r-column sub-matrix from each matrix $R_{i_k}H_{n,j_k}$, each of matrixes has a maximum chordal distance (for the uncorrelated channels); and for correlated channels, the columns should be selected in such a way that in a set $\{(R_{i_k}H_{n,j_k})^{(r)}\}$ formed by extracting one r-column sub-matrix from each matrix $R_{i_k}H_{n,j_k}$, each of matrixes has a maximum gain in a zero direction of a spatial projection of an antenna array. Any other feasible method may also be employed for selection, and no limitation is made thereon. Specifically, the codeword $W_k^{(r)}$ included in the first non-differential codebook may have the following structure:

$$W_k^{(r)} = \frac{1}{\sqrt{r}}(R_{i_k}H_{n,j_k}R_{i_k}^H)^{(r)}$$

where, k represents a PMI included in the first non-differential codebook $W^{(r)}$, k=0, 1 ... $|W^{(r)}|-1$, $|W^{(r)}|$ represents the number of codewords included in the first non-differential codebook $W^{(r)}$, r represents a rank of the codewords included in the first non-differential codebook $W^{(r)}$, $i_k$ represents an index of a diagonal matrix $R_{i_k}$ corresponding to k, $R_{i_k}$ represents a $n^{th}$ order diagonal matrix corresponding to $i_k$, $j_k$ represents an index of a normalized Hadamard matrix corresponding to k, $H_{n,j_k}$ represents a $n^{th}$ order normalized Hadamard matrix corresponding to $j_k$, a value of n is equal to the number of transmitting antennas, and $(R_{i_k}H_{n,j_k}R_{i_k}^H)^{(r)}$ represents a matrix formed by selecting r columns from a rotated Hadamard matrix $R_{i_k}H_{n,j_k}R_{i_k}^H$.

The structure of the diagonal matrix $R_{i_k}$ may be represented as:

$$R_{i_k} = \text{diag}\{b_{i_k,1}e^{j\delta_{i_k,1}}, b_{i,2}e^{j\delta_{i_k,2}}, \ldots b_{i,t}e^{j\delta_{i_k,t}}, \ldots b_{i,n}e^{j\delta_{i_k,n}}\}$$

where, $b_{i_k,t}$ is a real number, $j^2=-1$, $\delta_{i_k,t}$ represents a phase shift, t=1, 2, ..., n and a value of n is equal to the number of transmitting antennas. In the step of forming the matrix $(R_{i_k}H_{n,j_k}R_{i_k}^H)^{(r)}$ by selecting r columns from the rotated Hadamard matrix $R_{i_k}H_{n,j_k}R_{i_k}^H$, which r columns are selected may be determined by using a correlation method depending on actual applications. For example, for uncorrelated channels, the columns should be selected in such a way that in a set $\{(R_{i_k}H_{n,j_k}R_{i_k}^H)^{(r)}\}$ formed by extracting one r-column sub-matrix from each matrix $R_{i_k}H_{n,j_k}R_{i_k}^H$, each of matrixes has a maximum chordal distance; and for correlated channels, the columns should be selected in such a way that in a set $\{(R_{i_k}H_{n,j_k}R_{i_k}^H)^{(r)}\}$ formed by extracting one r-column sub-matrix from each matrix $R_{i_k}H_{n,j_k}R_{i_k}^H$, matrixes has a maximum gain in a zero direction of a spatial projection of an antenna array. Any other feasible method may also be employed for selection, and no limitation is made thereon.

The PM acquiring module 702 is configured to, after the reference PMI and the differential PMI are received by the PMI receiving module 701, obtain a PM by using a second non-differential codebook and a second diagonal differential codebook pre-stored locally and according to the reference PMI and the differential PMI, where the second non-differential codebook and the second diagonal differential codebook are consistent with the first non-differential codebook and the first diagonal differential codebook respectively.

Further, for an SU-MIMO system, the PM acquiring module 702 may include:

a codeword acquiring unit, configured to, after the reference PMI and the differential PMI are received by the PMI receiving module 701, obtain a codeword corresponding to the reference PMI through query from the second non-differential codebook according to the reference PMI, and obtain a codeword corresponding to the differential PMI through query from the second diagonal differential codebook according to the differential PMI; and a first PM acquiring unit, configured to, after the codeword corresponding to the differential PMI and the codeword corresponding to the reference PMI are obtained by the codeword acquiring unit, multiply the codeword corresponding to the reference PMI by the codeword corresponding to the differential PMI to obtain a multiplication result for use as the PM.

Further, for an MU-MIMO system, the PM acquiring module 702 includes:

a second PM acquiring unit, configured to, after the reference PMI and the differential PMI are received by the PMI receiving module 701, calculate the PM by using the ZF-BF algorithm or based on the maximum SLNR criterion and according to reference PMIs and differential PMIs of individual data receiving ends that are simultaneously paired.

In the apparatus for acquiring a PM according to the embodiment of the present invention, acquiring a reference PMI and a differential PMI according to a non-differential codebook and a diagonal differential codebook can reduce the feedback overhead and improve the feedback precision so as to further improve the feedback performance; and the fact that a codeword included in the diagonal differential codebook is a diagonal matrix can maintain amplitude characteristics (for example, a constant modulus characteristic, and a finite character set constraint characteristic) of elements already existing in the non-differential codebook. Moreover, a non-differential codebook obtained from a rotated Hadamard matrix may be used. Individual columns of the Hadamard matrix may be matched with eigenvectors of strongly correlated channels and weakly correlated channels in a uniform linear array transmitting antenna arrangement and a dual-polarized transmitting antenna arrangement respectively so as to improve the accuracy of quantization. The rotated matrix is in the form of a diagonal matrix, and this can maintain a fine quantization of the space on basis of the quantization of the Hadamard matrix. Furthermore, each of elements of the Hadamard matrix is +1 or −1, which can maintain the constant modulus characteristic of the non-differential codebook. Furthermore, multiplication of the Hadamard matrix with other matrixes or vectors may be simplified into addition or subtraction operations, which can significantly reduce the computational complexity of CQI calculation based on the SINR, PMI selection and rank adaptation. The individual columns of the normalized Hadamard matrix are orthogonal to each other, and this can maintain the unitary matrix characteristic of codewords in the non-differential codebook so that individual sent spatial streams are guaranteed to have the same power distribution and, in case of a full rank, individual transmitting antennas have the same power distribution. Further, the approach to obtain a non-differential codebook from a rotated Hadamard matrix may be applied to cases where the number of transmitting antennas is 2, 4, 8, 16, 32, 64 or the like, and the obtained non-differential codebook may satisfy the constant modulus characteristic and the unitary matrix characteristic and reduce the computational complexity of CQI calculation based on the SINR, PMI selection and rank adaptation.

Embodiment 10

Figure 8:
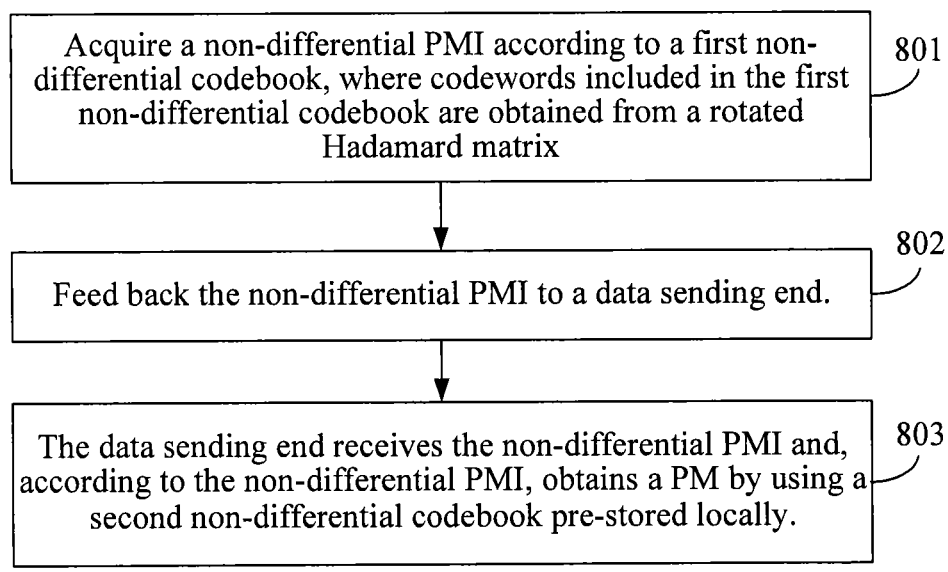
FIG. 8 is a flowchart of a method for acquiring a PMI according to Embodiment 10 of the present invention.

Referring to FIG. 8, this embodiment of the present invention provides a method for acquiring a PMI, where the method includes the following steps.

801: Calculate a non-differential PMI based on a preset criterion and according to a first non-differential codebook.

The first non-differential codebook $W^{(r)}$ may be a non-differential codebook set according to the embodiment of the present invention. Codewords in the first non-differential codebook $W^{(r)}$ are obtained from a rotated Hadamard matrix, and specifically, a codeword $W_k^{(r)}$ included in the first non-differential codebook $W^{(r)}$ may have the following structure:

$$W_k^{(r)} = \frac{1}{\sqrt{r}}(R_{i_k} H_{n,j_k})^{(r)}$$

where, k represents a non-differential PMI included in the first non-differential codebook $W^{(r)}$, k=0, 1 ... $|W^{(r)}|-1$, $|W^{(r)}|$ represents the number of codewords included in the first non-differential codebook $W^{(r)}$ r represents a rank of the codewords included in the first non-differential codebook, $i_k$ represents an index of a diagonal matrix $R_{i_k}$ corresponding to k, $R_{i_k}$ represents a $n^{th}$ order diagonal matrix corresponding to $i_k$, $j_k$ represents an index of a normalized Hadamard matrix corresponding to k, $H_{n,j_k}$ represents a $n^{th}$ order Hadamard matrix corresponding to $j_k$, a value of n is equal to the number of transmitting antennas, and $(R_{i_k} H_{n,j_k})^{(r)}$ represents a matrix formed by selecting r columns from a rotated Hadamard matrix $R_{i_k} H_{n,j_k}$.

The structure of the diagonal matrix $R_{i_k}$ may be represented as:

$$R_{i_k} = \text{diag}\{b_{i_k,1} e^{j\delta_{i_k,1}}, b_{i,2} e^{j\delta_{i_k,2}}, \ldots b_{i,t} e^{j\delta_{i_k,t}}, \ldots b_{i,n} e^{j\delta_{i_k,n}}\}$$

where, $b_{i_k,t}$ is a real number, $j^2=-1$, $\delta_{i_k,t}$ represents a phase shift, t=1, 2, ..., n, and a value of n is equal to the number of transmitting antennas. In the step of forming the matrix $(R_{i_k} H_{n,j_k})^{(r)}$ by selecting r columns from the rotated Hadamard matrix $R_{i_k} H_{n,j_k}$, which r columns are selected may be determined by using a correlation method depending on actual applications. For example, for uncorrelated channels, the columns should be selected in such a way that in a set $\{(R_{i_k} H_{n,j_k})^{(r)}\}$ formed by extracting one r-column sub-matrix from each matrix $R_{i_k} H_{n,j_k}$, each of matrixes has a maximum chordal distance; and for correlated channels, the columns should be selected in such a way that in a set $\{(R_{i_k} H_{n,j_k})^{(r)}\}$ formed by extracting one r-column sub-matrix from each matrix $R_{i_k} H_{n,j_k}$, each of matrixes has a maximum gain in a zero direction of a spatial projection of an antenna array. Any other feasible method may also be employed for selection, and no limitation is made thereon.

Specifically, the codeword $W_k^{(r)}$ included in the first non-differential codebook may have the following structure:

$$W_k^{(r)} = \frac{1}{\sqrt{r}}\left(R_{i_k} H_{n,j_k} R_{i_k}^H\right)^{(r)}$$

where, k represents a PMI included in the first non-differential codebook $W^{(r)}$, k=0, 1 ... $|W^{(r)}|-1$, $|W^{(r)}|$ represents the number of codewords included in the first non-differential codebook $W^{(r)}$, r represents a rank of the codewords included in the first non-differential codebook $W^{(r)}$, $i_k$ represents an index of a diagonal matrix $R_{i_k}$ corresponding to k, $R_{i_k}$ represents a $n^{th}$ order diagonal matrix corresponding to $i_k$, $j_k$ represents an index of a normalized Hadamard matrix corresponding to k, $H_{n,j_k}$ represents a $n^{th}$ order normalized Hadamard matrix corresponding to $j_k$, a value of n is equal to the number of transmitting antennas, and $(R_{i_k} H_{n,j_k} R_{i_k}^H)^{(r)}$ represents a matrix formed by selecting r columns from a rotated Hadamard matrix $R_{i_k} H_{n,j_k} R_{i_k}^H$.

The structure of the diagonal matrix $R_{i_k}$ may be represented as:

$$R_{i_k} = \text{diag}\{b_{i_k,1} e^{j\delta_{i_k,1}}, b_{i,2} e^{j\delta_{i_k,2}}, \ldots, b_{i,t} e^{j\delta_{i_k,t}}, \ldots, b_{i,n} e^{j\delta_{i_k,n}}\}$$

where, $b_{i_k,t}$ is a real number, $j^2=-1$, $\delta_{i_k,t}$ represents a phase shift, t=1, 2, ..., n, and a value of n is equal to the number of transmitting antennas. In the step of forming the matrix $(R_{i_k} H_{n,j_k} R_{i_k}^H)^{(r)}$ by selecting r columns from the rotated Hadamard matrix $R_{i_k} H_{n,j_k} R_{i_k}^H$, which r columns are selected may be determined by using a correlation method depending on actual applications. For example, for uncorrelated channels, the columns should be selected in such a way that in a set $\{(R_{i_k} H_{n,j_k} R_{i_k}^H)^{(r)}\}$ formed by extracting one r-column sub-matrix from each matrix $R_{i_k} H_{n,j_k} R_{i_k}^H$, each of matrixes has a maximum chordal distance; and for correlated channels, the columns should be selected in such a way that in a set $\{(R_{i_k} H_{n,j_k} R_{i_k}^H)^{(r)}\}$ formed by extracting one r-column sub-matrix from each matrix $R_{i_k} H_{n,j_k} R_{i_k}^H$, each of matrixes has a maximum gain in a zero direction of a spatial projection of an antenna array. Any other feasible method may also be employed for selection, and no limitation is made thereon.

Optionally, the codeword $W_k^{(r)}$ included in the first non-differential codebook may further have the following structure:

$$W_k^{(r)} = R_{i_k} B_{n,j_k}^{(r)}$$

where, k represents a PMI included in the non-differential codebook $W^{(r)}$, k=0, 1 ... $|W^{(r)}|-1$, $|W^{(r)}|$ represents the number of codewords included in the non-differential codebook $W^{(r)}$, r represents a rank of the codewords included in the non-differential codebook $W^{(r)}$, $i_k$ represents an index of a diagonal matrix $R_{i_k}$ corresponding to k, $R_{i_k}$ represents a $n^{th}$ order diagonal matrix corresponding to $i_k$, $B_{n,j_k}^{(r)}$ represents a codeword in a non-differential codebook having a rank of r for n transmitting antennas and corresponding to an index $j_k$, and $j_k$ corresponds to k.

Further, referring to FIG. 8, after acquiring the first PMI, the method may further include:

802: Feed back the non-differential PMI to a data sending end.

803: The data sending end receives the non-differential PMI and, according to the non-differential PMI, obtains a PM by using a second non-differential codebook pre-stored locally.

The second non-differential codebook is consistent with the first non-differential codebook.

In the method for acquiring a PMI according to the embodiment of the present invention, a non-differential codebook obtained from a rotated Hadamard matrix is used. Individual columns of the Hadamard matrix may be matched with eigenvectors of strongly correlated channels and weakly correlated channels in a uniform linear array transmitting antenna arrangement and a dual-polarized transmitting antenna arrangement respectively so as to improve the accuracy of quantization. The rotated matrix is in the form of a diagonal matrix, and this can maintain a fine quantization of the space on basis of the quantization of the Hadamard matrix. Furthermore, each of elements of the Hadamard matrix is +1 or −1, which can maintain the constant modulus characteristic of the non-differential codebook. Additionally, multiplication of the Hadamard matrix with other matrixes or vectors may be simplified into addition or subtraction operations, which can significantly reduce the computational complexity of CQI calculation based on the SINR, PMI selection and rank adaptation. The individual columns of the normalized Hadamard matrix are orthogonal to each other, and this can maintain the unitary matrix characteristic of codewords in the non-differential codebook so that individual sent spatial streams are guaranteed to have the same power distribution and, in case of a full rank, individual transmitting antennas have the same power distribution. Further, the approach to obtain a non-differential codebook from a rotated Hadamard matrix may be applied to cases where the number of transmitting antennas is 2, 4, 8, 16, 32, 64 or the like, and the obtained non-differential codebook may satisfy the constant modulus characteristic and the unitary matrix characteristic and reduce the computational complexity of CQI calculation based on the SINR, PMI selection and rank adaptation.

Embodiment 11

Figure 9:
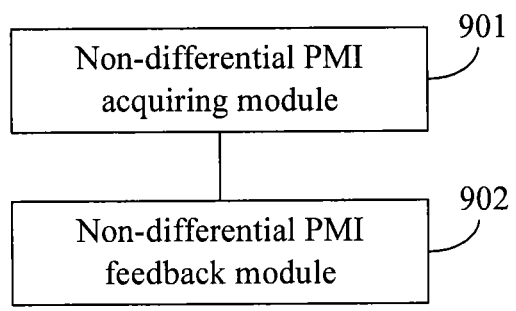
FIG. 9 is a schematic structure diagram of an apparatus for acquiring a PMI according to Embodiment 11 of the present invention.

Referring to FIG. 9, this embodiment of the present invention provides an apparatus for acquiring a PMI, where the apparatus includes:

a non-differential PMI acquiring module 901, configured to calculate a non-differential PMI based on a preset criterion and according to a first non-differential codebook, where codewords included in the first non-differential codebook are obtained from a rotated Hadamard matrix.

The preset criterion is similar to that in Embodiment 2, and will not be further described herein. The first non-differential codebook $W^{(r)}$ may be a non-differential codebook set according to the embodiment of the present invention. The codewords in the first non-differential codebook $W^{(r)}$ are obtained from a rotated Hadamard matrix, and specifically, a codeword $W_k^{(r)}$ included in the first non-differential codebook $W^{(r)}$ may have the following structure:

$$W_k^{(r)} = \frac{1}{\sqrt{r}}(R_{i_k} H_{n,j_k})^{(r)}$$

where, k represents a non-differential PMI included in the first non-differential codebook $W^{(r)}$, k=0, 1 ... $|W^{(r)}|-1$, $|W^{(r)}|$ represents the number of codewords included in the first non-differential codebook r represents a rank of the codewords included in the first non-differential codebook, $i_k$ represents an index of a diagonal matrix $R_{i_k}$ corresponding to k, $R_{i_k}$ represents a $n^{th}$ order diagonal matrix corresponding to $i_k$, $j_k$ represents an index of a normalized Hadamard matrix corresponding to k, $H_{n,j_k}$ represents a $n^{th}$ order normalized Hadamard matrix corresponding to $j_k$, a value of n is equal to the number of transmitting antennas, and $(R_{i_k} H_{n,j_k})^{(r)}$ represents a matrix formed by selecting r columns from a rotated Hadamard matrix $R_{i_k} H_{n,j_k}$.

The structure of the diagonal matrix $R_{i_k}$ may be represented as:

$$R_{i_k} = \text{diag}\{b_{i_k,1} e^{j\delta_{i_k,1}}, b_{i,2} e^{j\delta_{i_k,2}} \ldots b_{i,t} e^{j\delta_{i_k,t}} \ldots b_{i,n} e^{j\delta_{i_k,n}}\}$$

where, $b_{i_k,t}$ is s a real number, $j^2=-1$, $\delta_{i_k,t}$ represents a phase shift, t=1, 2, ..., n and a value of n is equal to the number of transmitting antennas. In the step of forming the matrix $(R_{i_k} H_{n,j_k})^{(r)}$ by selecting r columns from the rotated Hadamard matrix $R_{i_k} H_{n,j_k}$, which r columns are selected may be determined by using a correlation method depending on actual applications. For example, for uncorrelated channels, the columns should be selected in such a way that in a set) $\{(R_{i_k} H_{n,j_k})^{(r)}\}$ formed by extracting one r-column sub-matrix from each matrix $R_{i_k} H_{n,j_k}$, each of matrixes has a maximum chordal distance; and for correlated channels, the columns should be) selected in such a way that in a set $\{(R_{i_k} H_{n,j_k})^{(r)}\}$ formed by extracting one r-column sub-matrix from each matrix $R_{i_k} H_{n,j_k}$, each of matrixes has a maximum gain in a zero direction of a spatial projection of an antenna array. Any other feasible method may also be employed for selection, and no limitation is made thereon.

Specifically, the codeword $W_k^{(r)}$ included in the first non-differential codebook may have the following structure:

$$W_k^{(r)} = \frac{1}{\sqrt{r}}(R_{i_k} H_{n,j_k} R_{i_k}^H)^{(r)}$$

where, k represents a PMI included in the first non-differential codebook $W^{(r)}$, k=0, 1 ... $|W^{(r)}|-1$, $|W^{(r)}|$ represents the number of codewords included in the first non-differential codebook $W^{(r)}$, r represents a rank of the codewords included in the first non-differential codebook $W^{(r)}$, $i_k$ represents an index of a diagonal matrix $R_{i_k}$ corresponding to k, $R_{i_k}$ represents a $n^{th}$ order diagonal matrix corresponding to $i_k$, $i_k$ represents an index of a normalized Hadamard matrix corresponding to k, $H_{n,j_k}$ represents a $n^{th}$ order normalized Hadamard matrix corresponding to $j_k$, a value of n is equal to the number of transmitting antennas, and $(R_{i_k} H_{n,j_k} R_{i_k}^H)^{(r)}$ represents a matrix formed by selecting r columns from a rotated Hadamard matrix $R_{i_k} H_{n,j_k} R_{i_k}^H$.

The structure of the diagonal matrix $R_{i_k}$ may be represented as:

$$R_{i_k} = \text{diag}\{b_{i_k,1} e^{j\delta_{i_k,1}}, b_{i,2} e^{j\delta_{i_k,2}} \ldots b_{i,t} e^{j\delta_{i_k,t}} \ldots b_{i,n} e^{j\delta_{i_k,n}}\}$$

where, $b_{i_k,t}$ is a real number, $j^2=-1$, $\delta_{i_k,t}$ represents a phase shift, t=1, 2, ..., n, and a value of n is equal to the number of transmitting antennas. In the step of forming the matrix $(R_{i_k} H_{n,j_k} R_{i_k}^H)^{(r)}$ by selecting r columns from the rotated Hadamard matrix $R_{i_k} H_{n,j_k} R_{i_k}^H$, which r columns are selected may be determined by using a correlation method depending on actual applications. For example, for uncorrelated channels, the columns should be selected in such a way that in a set $\{(R_{i_k} H_{n,j_k} R_{i_k}^H)^{(r)}\}$ formed by extracting one r-column sub-matrix from each matrix $R_{i_k} H_{n,j_k} R_{i_k}^H$, each of matrixes has a maximum chordal distance; and for correlated channels, the columns should be selected in such a way that in a set $\{(R_{i_k} H_{n,j_k} R_{i_k}^H)^{(r)}\}$ formed by extracting one r-column sub-matrix from each matrix H, $R_{i_k} H_{n,j_k} R_{i_k}^H$, matrixes has a maximum gain in a zero direction of a spatial projection of an antenna array. Any other feasible method may also be employed for selection, and no limitation is made thereon.

Further, referring to FIG. 9, the apparatus may further include:

a non-differential PMI feedback module 902, configured to, after the non-differential PMI is obtained by the non-differential PMI acquiring module 901, feed back the non-differential PMI to a data sending end so that, according to the non-differential PMI, a PM is obtained by the data sending end using a second non-differential codebook pre-stored locally, where the second non-differential codebook is consistent with the first non-differential codebook.

In the apparatus for acquiring a PMI according to the embodiment of the present invention, a non-differential codebook obtained from a rotated Hadamard matrix is used. Individual columns of the Hadamard matrix may be matched with eigenvectors of strongly correlated channels and weakly correlated channels in a uniform linear array transmitting antenna arrangement and a dual-polarized transmitting antenna arrangement respectively so as to improve the accuracy of quantization. The rotated matrix is in the form of a diagonal matrix, and this can maintain a fine quantization of the space on basis of the quantization of the Hadamard matrix. Furthermore, each of elements of the Hadamard matrix is +1 or −1, which can maintain the constant modulus characteristic of the non-differential codebook. Additionally, multiplication of the Hadamard matrix with other matrixes or vectors may be simplified into addition or subtraction operations, which can significantly reduce the computational complexity of CQI calculation based on the SINR, PMI selection and rank adaptation. The individual columns of the normalized Hadamard matrix are orthogonal to each other, and this can maintain the unitary matrix characteristic of codewords in the non-differential codebook so that individual sent spatial streams are guaranteed to have the same power distribution and, in case of a full rank, individual transmitting antennas have the same power distribution. Further, the approach to obtain a non-differential codebook from a rotated Hadamard matrix may be applied to cases where the number of transmitting antennas is 2, 4, 8, 16, 32, 64 or the like, and the obtained non-differential codebook may satisfy the constant modulus characteristic and the unitary matrix characteristic and reduce the computational complexity of CQI calculation based on the SINR, PMI selection and rank adaptation.

Embodiment 12

Figure 10:
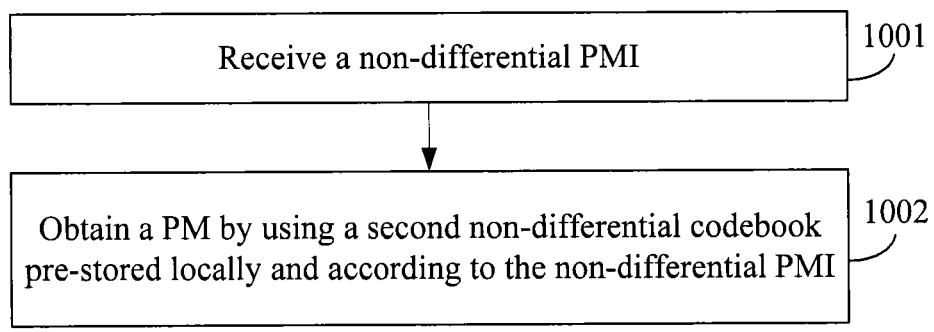
FIG. 10 is a flowchart of a method for acquiring a PM according to Embodiment 12 of the present invention.

Referring to FIG. 10, this embodiment of the present invention provides a method for acquiring a PM, where the method includes the following steps.

1001: Receive a non-differential PMI, where the non-differential PMI is obtained according to a first non-differential codebook and then sent by a data receiving end, and codewords included in the first non-differential codebook are obtained from a rotated Hadamard matrix.

The first non-differential codebook $W^{(r)}$ may be a non-differential codebook set according to the embodiment of the present invention. The codewords in the first non-differential codebook $W^{(r)}$ are obtained from a rotated Hadamard matrix, and specifically, a codeword $W^{(r)}$ included in the first non-differential codebook $W^{(r)}$ may have the following structure:

$$W_k^{(r)} = \frac{1}{\sqrt{r}}(R_{i_k} H_{n,j_k})^{(r)}$$

where, k represents a non-differential PMI included in the first non-differential codebook $W^{(r)}$, k=0, 1 ... $|W^{(r)}|-1$, $|W^{(r)}|$ represents the number of codewords included in the first non-differential codebook $W^{(r)}$, r represents a rank of the codewords included in the first non-differential codebook, $i_k$ represents an index of a diagonal matrix $R_{i_k}$ corresponding to k, $R_{i_k}$ represents a $n^{th}$ order diagonal matrix corresponding to $i_k$, $j_k$ represents an index of a normalized Hadamard matrix corresponding to k, $H_{n,j_k}$ represents a $n^{th}$ order Hadamard matrix) corresponding to $j_k$, a value of n is equal to the number of transmitting antennas, and $(R_{i_k} H_{n,j_k})^{(r)}$ represents a matrix formed by selecting r columns from a rotated Hadamard matrix $R_{i_k} H_{n,j_k}$.

The structure of the diagonal matrix may be represented as:

$$R_{i_k} = \text{diag}\{b_{i_k,1} e^{j\delta_{i_k,1}}, b_{i,2} e^{j\delta_{i_k,2}} \ldots b_{i,t} e^{j\delta_{i_k,t}} \ldots b_{i,n} e^{j\delta_{i_k,n}}\}$$

where, $b_{i_k,t}$ is a real number, $j^2=-1$, $\delta_{i_k,t}$ represents a phase shift, t=1, 2, ..., n, and a value of n is equal to the number of transmitting antennas. In the step of forming the matrix $(R_{i_k} H_{n,j_k})^{(r)}$ by selecting r columns from the rotated Hadamard matrix $R_{i_k} H_{n,j_k}$, which r columns are selected may be determined by using a correlation method depending on actual applications. For example, for uncorrelated channels, the columns should be selected in such a way that in a set $\{(R_{i_k} H_{n,j_k})^{(r)}\}$ formed by extracting one r-column sub-matrix from each matrix $R_{i_k} H_{n,j_k}$, each of matrixes has a maximum chordal distance; and for correlated channels, the columns should be selected in such a way that in a set $\{(R_{i_k} H_{n,j_k})^{(r)}\}$ formed by extracting one r-column sub-matrix from each matrix $R_{i_k} H_{n,j_k}$, each of matrixes has a maximum gain in a zero direction of a spatial projection of an antenna array. Any other feasible method may also be employed for selection, and no limitation is made thereon.

Specifically, the codeword $W_k^{(r)}$ included in the first non-differential codebook may have the following structure:

$$W_k^{(r)} = \frac{1}{\sqrt{r}}(R_{i_k} H_{n,j_k} R_{i_k}^H)^{(r)}$$

where, k represents a PMI included in the first non-differential codebook $W^{(r)}$, k=0, 1 ... $|W^{(r)}|-1$, $|W^{(r)}|$ represents the number of codewords included in the first non-differential codebook $W^{(r)}$, r represents a rank of the codewords included in the first non-differential codebook $W^{(r)}$, $i_k$ represents an index of a diagonal matrix $R_{i_k}$ corresponding to k, $R_{i_k}$ represents a $n^{th}$ order diagonal matrix corresponding to $i_k$, $j_k$ represents an index of a normalized Hadamard matrix corresponding to k, $H_{n,j_k}$ represents a $n^{th}$ order normalized Hadamard matrix corresponding to $j_k$, a value of n is equal to the number of transmitting antennas, and $(R_{i_k} H_{n,j_k} R_{i_k}^H)^{(r)}$ represents a matrix formed by selecting r columns from a rotated Hadamard matrix $R_{i_k} H_{n,j_k} R_{i_k}^H$.

The structure of the diagonal matrix $R_{i_k}$ may be represented as:

$$R_{i_k} = \text{diag}\{b_{i_k,1} e^{j\delta_{i_k,1}}, b_{i,2} e^{j\delta_{i_k,2}}, \ldots, b_{i,t} e^{j\delta_{i_k,t}}, \ldots, b_{i,n} e^{j\delta_{i_k,n}}\}$$

where, $b_{i_k,t}$ is a real number, $j^2=-1$, $\delta_{i_k,t}$ represents a phase shift, t=1, 2, ..., n, and a value of n is equal to the number of transmitting antennas. In the step of forming the matrix $(R_{i_k} H_{n,j_k} R_{i_k}^H)^{(r)}$ by selecting r columns from the rotated Hadamard matrix $R_{i_k} H_{n,j_k} R_{i_k}^H$, which r columns are selected may be determined by using a correlation method depending on actual applications. For example, for uncorrelated channels, the columns should be selected in such a way that in a set $\{(R_{i_k} H_{n,j_k} R_{i_k}^H)^{(r)}\}$ formed by extracting one r-column sub-matrix from each matrix $R_{i_k} H_{n,j_k} R_{i_k}^H$, each of matrixes has a maximum chordal distance; and for correlated channels, the columns should be selected in such a way that in a set $\{(R_{i_k} H_{n,j_k} R_{i_k}^H)^{(r)}\}$ formed by extracting one r-column sub-matrix from each matrix $R_{i_k}H_{n,j_k}R_{i_k}{}^H$, each of matrixes has a maximum gain in a zero direction of a spatial projection of an antenna array. Any other feasible method may also be employed for selection, and no limitation is made thereon.

1002: Obtain a PM by using a second non-differential codebook pre-stored locally and according to the non-differential PMI, where the second non-differential codebook is consistent with the first non-differential codebook.

Further, for an SU-MIMO system, the step of obtaining the PM by using the second non-differential codebook pre-stored locally and according to the non-differential PMI includes: obtaining a codeword corresponding to the non-differential PMI through query from the second non-differential codebook according to the non-differential PMI; and using the codeword corresponding to the non-differential PMI as the PM.

Further, for an MU-MIMO system, the step of obtaining the PM by using the second non-differential codebook pre-stored locally and according to the non-differential PMI includes: calculating the PM by using the ZF-BF algorithm or based on the maximum SLNR criterion and according to non-differential PMIs of individual data receiving ends that are simultaneously paired.

In the method for acquiring a PM according to the embodiment of the present invention, a PM is acquired according to a non-differential PMI and a non-differential codebook is obtained from a rotated Hadamard matrix. Individual columns of the Hadamard matrix may be matched with eigenvectors of strongly correlated channels and weakly correlated channels in a uniform linear array transmitting antenna arrangement and a dual-polarized transmitting antenna arrangement respectively so as to improve the accuracy of quantization. The rotated matrix is in the form of a diagonal matrix, and this can maintain a fine quantization of the space on basis of the quantization of the Hadamard matrix. Furthermore, each of elements of the Hadamard matrix is +1 or −1, which can maintain the constant modulus characteristic of the non-differential codebook. Additionally, multiplication of the Hadamard matrix with other matrixes or vectors may be simplified into addition or subtraction operations, which can significantly reduce the computational complexity of CQI calculation based on the SINR, PMI selection and rank adaptation. The individual columns of the normalized Hadamard matrix are orthogonal to each other, and this can maintain the unitary matrix characteristic of codewords in the non-differential codebook so that individual sent spatial streams are guaranteed to have the same power distribution and, in case of a full rank, individual transmitting antennas have the same power distribution. Additionally, the approach to obtain a non-differential codebook from a rotated Hadamard matrix may be applied to cases where the number of transmitting antennas is 2, 4, 8, 16, 32, 64 or the like, and the obtained non-differential codebook may satisfy the constant modulus characteristic and the unitary matrix characteristic and reduce the computational complexity of CQI calculation based on the SINR, PMI selection and rank adaptation.

Embodiment 13

Figure 11:
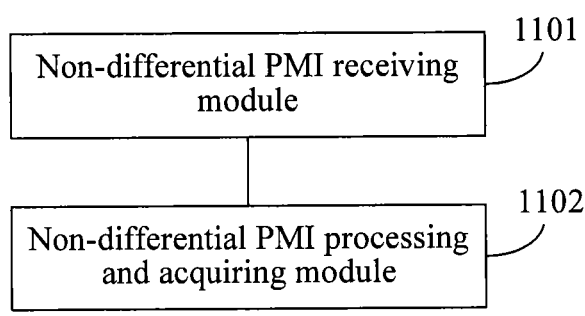
FIG. 11 is a schematic structure diagram of an apparatus for acquiring a PM according to Embodiment 13 of the present invention.

Referring to FIG. 11, this embodiment of the present invention provides an apparatus for acquiring a PM, which includes a non-differential PMI receiving module 1101 and a non-differential PM acquiring module 1102.

The non-differential PMI receiving module 1101 is configured to receive a non-differential PMI, where the non-differential PMI is obtained according to a first non-differential codebook and then sent by a data receiving end, and codewords included in the first non-differential codebook are obtained from a rotated Hadamard matrix.

The first non-differential codebook $W^{(r)}$ may be a non-differential codebook set according to the embodiment of the present invention. The codewords in the first non-differential codebook $W^{(r)}$ are obtained from a rotated Hadamard matrix, and specifically, a codeword $W_k^{(r)}$ included in the first non-differential codebook $W^{(r)}$ may have the following structure:

$$W_k^{(r)} = \frac{1}{\sqrt{r}}(R_{i_k} H_{n,j_k})^{(r)}$$

where, k represents a non-differential PMI included in the first non-differential codebook $W^{(r)}$, k=0, 1 ... $|W^{(r)}|-1$, $|W^{(r)}|$ represents the number of codewords included in the first non-differential codebook $W^{(r)}$, r represents a rank of the codewords included in the first non-differential codebook, $i_k$ represents an index of a diagonal matrix $R_{i_k}$ corresponding to k, $R_{i_k}$ represents a $n^{th}$ order diagonal matrix corresponding to $i_k$, $j_k$ represents an index of a normalized Hadamard matrix corresponding to k, $H_{n,j_k}$ represents a $n^{th}$ order Hadamard matrix corresponding to $j_k$, a value of n is equal to the number of transmitting antennas, and $(R_{i_k}H_{n,j_k})^{(r)}$ represents a matrix formed by selecting r columns from a rotated Hadamard matrix $R_{i_k}H_{n,j_k}$.

The structure of the diagonal matrix $R_{i_k}$ may be represented as:

$$R_{i_k} = \text{diag}\{b_{i_k,1}e^{j\delta_{i_k,1}}, b_{i,2}e^{j\delta_{i_k,2}} \ldots b_{i,t}e^{j\delta_{i_k,t}} \ldots b_{i,n}e^{j\delta_{i_k,n}}\}$$

where, $b_{i_k,t}$ is a real number, $j^2=-1$, $\delta_{i_k,t}$ represents a phase shift, t=1, 2, ..., n, and a value of n is equal to the number of transmitting antennas. In the step of forming the matrix $(R_{i_k}H_{n,j_k})^{(r)}$ by selecting r columns from the rotated Hadamard matrix $R_{i_k}H_{n,j_k}$, which r columns are selected may be determined by using a correlation method depending on actual applications. For example, for uncorrelated channels, the columns should be selected in such a way that in a set $\{(R_{i_k}H_{n,j_k})^{(r)}\}$ formed by extracting one r-column sub-matrix from each matrix $R_{i_k}H_{n,j_k}$, each of matrixes has a maximum chordal distance; and for correlated channels, the columns should be selected in such a way that in a set $\{(R_{i_k}H_{n,j_k})^{(r)}\}$ formed by extracting one r-column sub-matrix from each matrix $R_{i_k}H_{n,j_k}$, each of matrixes has a maximum gain in a zero direction of a spatial projection of an antenna array. Any other feasible method may also be employed for selection, and no limitation is made thereon.

Specifically, the codeword $W_k^{(r)}$ included in the first non-differential codebook may have the following structure:

$$W_k^{(r)} = \frac{1}{\sqrt{r}}(R_{i_k} H_{n,j_k} R_{i_k}^H)^{(r)}$$

where, k represents a PMI included in the first non-differential codebook $W^{(r)}$, k=0, 1 ... $|W^{(r)}|-1$, $|W^{(r)}|$ represents the number of codewords included in the first non-differential codebook $W^{(r)}$, r represents a rank of the codewords included in the first non-differential codebook $W^{(r)}$, $i_k$ represents an index of a diagonal matrix $R_{i_k}$ corresponding to k, $R_{i_k}$ represents a $n^{th}$ order diagonal matrix corresponding to $i_k$, $j_k$ represents an index of a normalized Hadamard matrix corresponding to k, $H_{n,j_k}$ represents a $n^{th}$ order normalized Hadamard matrix corresponding to $j_k$, a value of n is equal to the number of transmitting antennas, and $(R_{i_k} H_{n,j_k} R_{i_k}^H)^{(r)}$ represents a matrix formed by selecting r columns from a rotated Hadamard matrix $R_{i_k} H_{n,j_k} R_{i_k}^H$.

The structure of the diagonal matrix $R_{i_k}$ may be represented as:

$$R_{i_k} = \text{diag}\{b_{i_k,1} e^{j\delta_{i_k,1}}, b_{i,2} e^{j\delta_{i_k,2}}, \ldots, b_{i,t} e^{j\delta_{i_k,t}}, \ldots, b_{i,n} e^{j\delta_{i_k,n}}\}$$

where, $b_{i_k,t}$ is a real number, $j^2 = -1$, $\delta_{i_k,t}$ represents a phase shift, $t=1, 2, \ldots, n$, and a value of n is equal to the number of transmitting antennas. In the step of forming the matrix $(R_{i_k} H_{n,j_k} R_{i_k}^H)^{(r)}$ by selecting r columns from the rotated Hadamard matrix $R_{i_k} H_{n,j_k} R_{i_k}^H$, which r columns are selected may be determined by using a correlation method depending on actual applications. For example, for uncorrelated channels, the columns should be selected in such a way that in a set $\{(R_{i_k} H_{n,j_k} R_{i_k}^H)^{(r)}\}$ formed by extracting one r-column sub-matrix from each matrix $R_{i_k} H_{n,j_k} R_{i_k}^H$, each of matrixes has a maximum chordal distance; and for correlated channels, the columns should be selected in such a way that in a set $\{(R_{i_k} H_{n,j_k} R_{i_k}^H)^{(r)}\}$ formed by extracting one r-column sub-matrix from each matrix $R_{i_k} H_{n,j_k} R_{i_k}^H$, each of matrixes has a maximum gain in a zero direction of a spatial projection of an antenna array. Any other feasible method may also be employed for selection, and no limitation is made thereon.

The non-differential PM acquiring module 1102 is configured to, after the non-differential PMI is received by the non-differential PMI receiving module 1101, calculate a PM by using a second non-differential codebook pre-stored locally and according to the non-differential PMI, where the second non-differential codebook is consistent with the first non-differential codebook.

Further, for an SU-MIMO system, the non-differential PM acquiring module 1102 is configured to, after the non-differential PMI is received by the non-differential PMI receiving module 1101, obtain a codeword corresponding to the non-differential PMI through query from the second non-differential codebook according to the non-differential PMI and use the codeword corresponding to the non-differential PMI as the PM.

Further, for an MU-MIMO system, the PM acquiring module 1102 is configured to, after the non-differential PMI is received by the non-differential PMI receiving module 1101, calculate the PM based on by using the ZF-BF algorithm or based on the maximum SLNR criterion and according to non-differential PMIs of individual data receiving ends that are simultaneously paired.

In the apparatus for acquiring a PM according to the embodiment of the present invention, a PM is acquired according to a non-differential PMI and a non-differential codebook is obtained from a rotated Hadamard matrix. Individual columns of the Hadamard matrix may be matched with eigenvectors of strongly correlated channels and weakly correlated channels in a uniform linear array transmitting antenna arrangement and a dual-polarized transmitting antenna arrangement respectively so as to improve the accuracy of quantization. The rotated matrix is in the form of a diagonal matrix, and this can maintain a fine quantization of the space on basis of the quantization of the Hadamard matrix. Furthermore, each of elements of the Hadamard matrix is +1 or −1, which can maintain the constant modulus characteristic of the non-differential codebook. Additionally, multiplication of the Hadamard matrix with other matrixes or vectors may be simplified into addition or subtraction operations, which can significantly reduce the computational complexity of CQI calculation based on the SINR, PMI selection and rank adaptation. The individual columns of the normalized Hadamard matrix are orthogonal to each other, and this can maintain the unitary matrix characteristic of codewords in the non-differential codebook so that individual sent spatial streams are guaranteed to have the same power distribution and, in case of a full rank, individual transmitting antennas have the same power distribution. Additionally, the approach to obtain a non-differential codebook from a rotated Hadamard matrix may be applied to cases where the number of transmitting antennas is 2, 4, 8, 16, 32, 64 or the like, and the obtained non-differential codebook may satisfy the constant modulus characteristic and the unitary matrix characteristic and reduce the computational complexity of CQI calculation based on the SINR, PMI selection and rank adaptation.

All or part of the technical solutions provided in the above embodiments can be achieved through software programming, and the software programs are stored in a readable storage medium such as a hard disk, a compact disk (CD) or a soft disk in a computer.

What described above is only preferred embodiments of the present invention and is not intended to limit the present invention. Any modification, equivalent replacement and improvement made within the spirits and principles of the present invention are all covered within the scope of the present invention.

What is claimed is:

1. A method for acquiring a Precoding Matrix Indicator (PMI), comprising:
    acquiring a reference PMI and a differential PMI according to a first non-differential codebook and a first diagonal differential codebook, wherein a codeword comprised in the first diagonal differential codebook is a diagonal matrix;
    feeding back the reference PMI and the differential PMI to a data sending end.

2. The method for acquiring a PMI according to claim 1, wherein the step of acquiring the reference PMI and the differential PMI according to the first non-differential codebook and the first diagonal differential codebook comprises:
    calculating the reference PMI based on a preset criterion and according to the first non-differential codebook; and
    calculating the differential PMI based on the preset criterion and according to the first non-differential codebook, the first diagonal differential codebook, and the reference PMI; or
    the step of acquiring the reference PMI and the differential PMI according to the first non-differential codebook and the first diagonal differential codebook comprises:
    calculating the reference PMI and the differential PMI based on the preset criterion and according to the first non-differential codebook and the first diagonal differential codebook.

3. The method for acquiring a PMI according to claim 1, wherein a codeword $C_k$ comprised in the first diagonal differential codebook has the following structure:

$$C_k = \text{diag}\{e^{j\theta_{k,1}}, e^{j\theta_{k,2}}, \ldots, e^{j\theta_{k,i}}, \ldots, e^{j\theta_{k,N}}\}$$

where, k represents a differential PMI comprised in a first diagonal differential codebook D, $k=0, 1 \ldots |D|-1$, $|D|$ represents the number of codewords comprised in the first diagonal differential codebook D, $j^2 = -1$, N represents the number of transmitting antennas and is a positive integer, $\theta_{k,j}$ represents a phase shift, and $i=1, 2 \ldots N$.

4. The method for acquiring a PMI according to claim 1, wherein a codeword $C_k$ comprised in the first diagonal differential codebook has the following structure:

$$C_k = \text{diag}\{e^{j0\cdot(m\theta)}, e^{j1*(m\theta)}, \ldots, e^{j(i)*(m\theta)}, \ldots, e^{j(N-1)*(m\theta)}\}$$

where, k represents a differential PMI comprised in a first diagonal differential codebook D, k=0, 1 ... |D|−1, |D| represents the number of codewords comprised in the first diagonal differential codebook D, $j^2$=−1, N represents the number of transmitting antennas and is a positive integer, i*(mθ) represents a phase shift, i=1, 2 ... N, and mθ represents a phase shift difference between adjacent transmitting antennas.

5. The method for acquiring a PMI according to claim 1, wherein when, in a dual-polarized transmitting antenna array comprising N transmitting antennas, the first N/2 transmitting antennas form a group of co-polarized transmitting antennas and the remaining N/2 transmitting antennas form another group of co-polarized transmitting antennas, a codeword $C_k$ comprised in the first diagonal differential codebook has the following structure:

$$C_k = \text{diag}\{S_m, e^{j\phi_n}S_m\}$$

where, $S_m = \text{diag}\{e^{j\theta_{m,1}}, e^{j\theta_{m,2}}, \ldots, e^{j\theta_{m,i}}, \ldots, e^{j\theta_{m,N/2}}\}$, k represents a differential PMI comprised in a first diagonal differential codebook D, k=0, 1 ..., |D|−1, |D| represents the number of codewords comprised in the first diagonal differential codebook D, $j^2$=−1, N represents the number of transmitting antennas and is an even integer, $\phi_n$ and $\theta_{m,i}$ represent phase shifts, m and n are natural numbers, and i=1, 2 ..., N/2.

6. The method for acquiring a PMI according to claim 1, wherein a codeword $C_k$ comprised in the first diagonal differential codebook has the following structure:

$$C_k = \text{diag}\{a_{k,1}e^{j\theta_{k,1}}, a_{k,2}e^{j\theta_{k,2}}, \ldots, a_{k,i}e^{j\theta_{k,i}}, \ldots, a_{k,N}e^{j\theta_{k,N}}\}$$

where, k represents a differential PMI comprised in a first diagonal differential codebook D, k=0, 1 ... |D|−1, |D| represents the number of codewords comprised in the first diagonal differential codebook D, $j^2$=−1, N represents the number of transmitting antennas and is a positive integer, $a_{k,i}$ is a real number, $\theta_{k,i}$ represents a phase shift, and i=1, 2 ... N.

7. The method for acquiring a PMI according to claim 1, wherein a codeword $W_{k'}^{(r)}$ comprised in the first non-differential codebook has the following structure:

$$W_{k'}^{(r)} = \frac{1}{\sqrt{r}}(R_{i_{k'}} H_{n,j_{k'}})^{(r)}$$

where, k' represents a non-differential PMI comprised in a first non-differential codebook $W^{(r)}$, k'=0, 1 ... |$W^{(r)}$|−1, |$W^{(r)}$| represents the number of codewords comprised in the first non-differential codebook $W^{(r)}$, r represents a rank of the codewords comprised in the first non-differential codebook $W^{(r)}$, $i_{k'}$ represents an index of a diagonal matrix $R_{i_{k'}}$ corresponding to k', $R_{i_{k'}}$ represents a $n^{th}$ order diagonal matrix corresponding to $i_{k'}$, $j_{k'}$ represents an index of a normalized Hadamard matrix corresponding to k', $H_{n,j_{k'}}$ represents a $n^{th}$ order normalized Hadamard matrix corresponding to $j_{k'}$, a value of n is equal to the number of the transmitting antennas, and $(R_{i_{k'}}H_{n,j_{k'}})^{(r)}$ represents a matrix formed by selecting r columns from a rotated Hadamard matrix $R_{i_{k'}}H_{n,k_{k'}}$; or a codeword $W_{k'}^{(r)}$ comprised in the first non-differential codebook has the following structure:

$$W_{k'}^{(r)} = \frac{1}{\sqrt{r}}(R_{i_{k'}} H_{n,j_{k'}} R_{i_{k'}}^H)^{(r)}$$

where, k' represents a PMI comprised in a first non-differential codebook $W^{(r)}$, k'=0, 1 ... |$W^{(r)}$|1, |$W^{(r)}$| represents the number of codewords comprised in the first non-differential codebook $W^{(r)}$, r represents a rank of the codewords comprised in the first non-differential codebook $W^{(r)}$, $i_{k'}$ represents an index of a diagonal matrix $R_{i_{k'}}$ corresponding to k', $R_{i_{k'}}$ represents a $n^{th}$ order diagonal matrix corresponding to $i_{k'}$, $j_{k'}$ represents an index of a normalized Hadamard matrix corresponding to k', $H_{n,j_{k'}}$ represents a $n^{th}$ order normalized Hadamard matrix corresponding to $j_{k'}$, a value of n is equal to the number of the transmitting antennas, and $(R_{i_{k'}}H_{n,j_{k'}}R_{i_{k'}}^H)^{(r)}$ represents a matrix formed by selecting r columns from a rotated Hadamard matrix $R_{i_{k'}}H_{n,j_{k'}}R_{i_{k'}}^H$; or a codeword $W_{k'}^{(r)}$ comprised in the first non-differential codebook has the following structure:

$$W_{k'}^{(r)} = R_{i_{k'}} B_{n,j_{k'}}^{(r)}$$

where, k' represents a PMI comprised in a non-differential codebook $W^{(r)}$, k=0, 1 ... |$W^{(r)}$|−1, |$W^{(r)}$| represents the number of codewords comprised in the non-differential codebook $W^{(r)}$, r represents a rank of the codewords comprised in the non-differential codebook $W^{(r)}$, $i_{k'}$ represents an index of a diagonal matrix $R_{i_{k'}}$ corresponding to k', $R_{i_{k'}}$ represents a $n^{th}$ order diagonal matrix corresponding to $i_{k'}$, $B_{n,k_{k'}}^{(r)}$ represents a codeword in a non-differential codebook having a rank of r for n transmitting antennas and corresponding to an index $j_{k'}$, and $j_{k'}$ corresponds to k'.

8. The method for acquiring a PMI according to claim 1, wherein the reference PMI and the differential PMI is used for obtaining, according to the reference PMI and the differential PMI, a Precoding Matrix (PM) by the data sending end using a second non-differential codebook and a second diagonal differential codebook pre-stored locally, wherein the second non-differential codebook and the second diagonal differential codebook are consistent with the first non-differential codebook and the first diagonal differential codebook respectively.

9. The method for acquiring a PMI according to claim 8, wherein the first non-differential codebook is a first basic codebook and the first diagonal differential codebook is a first transformed codebook; and the second non-differential codebook is a second basic codebook and the second diagonal differential codebook is a second transformed codebook.

10. The method for acquiring a PMI according to claim 1, wherein the first non-differential codebook is a first basic codebook and the first diagonal differential codebook is a first transformed codebook.

11. The method for acquiring a PMI according to claim 1, wherein the reference PMI and the differential PMI are configured to indicate a Precoding Matrix (PM), $\hat{V}$, where the PM $\hat{V}=C_k W_n$, $C_k$ is a codeword in the first diagonal differential codebook when the differential PMI is k, and $W_n$ is a codeword in the first non-differential codebook when the reference PMI is n.

12. A method for acquiring a Precoding Matrix (PM), comprising:

receiving a reference Precoding Matrix Indicator (PMI) and a differential PMI, wherein the reference PMI and the differential PMI are obtained according to a first non-differential codebook and a first diagonal differential codebook and then sent by a data receiving end, and a codeword comprised in the first diagonal differential codebook is a diagonal matrix; and obtaining a PM by using a second non-differential codebook and a second diagonal differential codebook pre-stored locally and according to the reference PMI and the differential PMI, wherein the second non-differential codebook and the second diagonal differential codebook are consistent with the first non-differential codebook and the first diagonal differential codebook respectively.

13. The method for acquiring a PM according to claim 12, wherein for a Single User Multiple Input Multiple Output (SU-MIMO) system, the step of obtaining the PM by using the second non-differential codebook and the second diagonal differential codebook pre-stored locally and according to the reference PMI and the differential PMI comprises:

obtaining a codeword corresponding to the reference PMI through query from the second non-differential codebook according to the reference PMI, and obtaining a codeword corresponding to the differential PMI through query from the second diagonal differential codebook according to the differential PMI; and multiplying the codeword corresponding to the reference PMI by the codeword corresponding to the differential PMI to obtain a multiplication result for use as the PM.

14. The method for acquiring a PM according to claim 12, wherein for a Multiple User Multiple Input Multiple Output (MU-MIMO) system, the step of obtaining the PM by using the second non-differential codebook and the second diagonal differential codebook pre-stored locally and according to the reference PMI and the differential PMI comprises:

calculating the PM by using a Zero-Forcing Beam Forming (ZF-BF) algorithm or based on a maximum Signal-Leakage Plus Noise Ratio (SLNR) criterion and according to reference PMIs and differential PMIs of individual data receiving ends that are simultaneously paired.

15. The method for acquiring a PM according to claim 12, wherein a codeword $C_k$ comprised in the first diagonal differential codebook has the following structure:

$$C_k = \text{diag}\{e^{j\theta_{k,1}}, e^{j\theta_{k,2}}, \ldots, e^{j\theta_{k,i}}, \ldots, e^{j\theta_{k,N}}\}$$

where, k represents a differential PMI comprised in a first diagonal differential codebook D, k=0, 1 ..., |D|−1, |D| represents the number of codewords comprised in the first diagonal differential codebook D, $j^2=-1$, N represents the number of transmitting antennas and is a positive integer, $\theta_{k,i}$ a phase shift, and i=1, 2 ... N.

16. The method for acquiring a PM according to claim 12, wherein when, in a dual-polarized transmitting antenna array comprising N transmitting antennas, the first N/2 transmitting antennas form a group of co-polarized transmitting antennas and the remaining N/2 transmitting antennas form another group of co-polarized transmitting antennas, a codeword $C_k$ comprised in the first diagonal differential codebook has the following structure:

$$C_k = \text{diag}\{S_m, e^{j\phi_n} S_m\}$$

where, $S_m = \text{diag}\{e^{j\theta_{m,1}}, e^{j\theta_{m,2}}, \ldots, e^{j\theta_{m,i}}, \ldots, e^{j\theta_{m,N/2}}\}$, k represents a differential PMI comprised in a first diagonal differential codebook D, k=0, 1 ... |D|−1, |D| represents the number of codewords comprised in the first diagonal differential codebook D, $j^2=-1$, N represents the number of transmitting antennas and is an even integer, $\phi_n$ and $\theta_{m,i}$ phase shifts, m and n are natural numbers, and i=1, 2 ..., N/2.

17. The method for acquiring a PM according to claim 12, wherein a codeword $W_{k'}^{(r)}$ comprised in the first non-differential codebook has the following structure:

$$W_{k'}^{(r)} = \frac{1}{\sqrt{r}} (R_{i_{k'}}, H_{n,j_{k'}})^{(r)}$$

where, k' represents a non-differential PMI comprised in a first non-differential codebook $W^{(r)}$, k'=0, 1 ... |$W^{(r)}$|−1, |$W^{(r)}$| represents the number of codewords comprised in the first non-differential codebook $W^{(r)}$, r represents a rank of the codewords comprised in the first non-differential codebook $W^{(r)}$, $i_{k'}$ represents an index of a diagonal matrix $R_{i_{k'}}$ corresponding to k', $R_{i_{k'}}$ represents a $n^{th}$ order diagonal matrix corresponding to $i_{k'}$, $j_{k'}$ represents an index of a normalized Hadamard matrix corresponding to k', $H_{n,j_{k'}}$ represents a $n^{th}$ order normalized Hadamard matrix corresponding to $j_{k'}$, a value of n is equal to the number of the transmitting antennas, and $(R_{i_{k'}} H_{n,j_{k'}})^{(r)}$ represents a matrix formed by selecting r columns from a rotated Hadamard matrix $R_{i_{k'}} H_{n,j_{k'}}$; or a codeword $W_{k'}^{(r)}$ comprised in the first non-differential codebook has the following structure:

$$W_{k'}^{(r)} = \frac{1}{\sqrt{r}} (R_{i_{k'}}, H_{n,j_{k'}}, R_{i_{k'}}^H)^{(r)}$$

where, k' represents a PMI comprised in a first non-differential codebook $W^{(r)}$, k'=0, 1 ... |$W^{(r)}$|−1, |$W^{(r)}$|, represents the number of codewords comprised in the first non-differential codebook $W^{(r)}$, r represents a rank of the codewords comprised in the first non-differential codebook $W^{(r)}$, $i_{k'}$ represents an index of a diagonal matrix $R_{i_{k'}}$ corresponding to k', $R_{i_{k'}}$ represents a $n^{th}$ order diagonal matrix corresponding to $i_{k'}$, $j_{k'}$ represents an index of a normalized Hadamard matrix corresponding to k', $H_{n,j_{k'}}$ represents a $n^{th}$ order normalized Hadamard matrix corresponding to $j_{k'}$, a value of n is equal to the number of the transmitting antennas, and $(R_{i_{k'}} H_{n,j_{k'}} R_{j_{k'}}^H)^{(r)}$ represents a matrix formed by selecting r columns from a rotated Hadamard matrix $R_{i_{k'}} H_{n,j_{k'}} R_{j_{k'}}^H$; or a codeword $W_{k'}^{(r)}$ comprised in the first non-differential codebook has the following structure:

$$W_{k'}^{(r)} = R_{i_{k'}} B_{n,j_{k'}}^{(r)}$$

where, k' represents a PMI comprised in a non-differential codebook $W^{(r)}$ k=0, 1 ... |$W^{(r)}$|−1, |$W^{(r)}$| represents the number of codewords comprised in the non-differential codebook $W^{(r)}$, r represents a rank of the codewords comprised in the non-differential codebook $W^{(r)}$, $i_{k'}$ represents an index of a diagonal matrix $R_{i_{k'}}$ corresponding to k', $R_{i_{k'}}$ represents a $n^{th}$ order diagonal matrix corresponding to $i_{k'}$, $B_{n,j_{k'}}^{(r)}$ represents a codeword in a non-differential codebook having a rank of r for n transmitting antennas and corresponding to an index $j_{k'}$, and $j_{k'}$ corresponds to k'.

18. The method for acquiring a PM according to claim 12, wherein the reference PMI and the differential PMI are configured to indicate a PM $\hat{V}$, where the PM $\hat{V}=C_k W_n$, $C_k$ is a codeword in the first diagonal differential codebook when the differential PMI is k, $W_n$ is a codeword in the first non-differential codebook when the reference PMI is n.

19. An apparatus for acquiring a Precoding Matrix Indicator (PMI), comprising:
a PMI acquiring module, configured to acquire a reference PMI and a differential PMI according to a first non-differential codebook and a first diagonal differential codebook, wherein a codeword comprised in the first diagonal differential codebook is a diagonal matrix;
a PMI feedback module, configured to, after the reference PMI and the differential PMI are obtained by the PMI acquiring module, feed back the reference PMI and the differential PMI to a data sending end.

20. The apparatus for acquiring a PMI according to claim 19, wherein the PMI acquiring module comprises:
a reference PMI calculating unit, configured to calculate the reference PMI based on a preset criterion and according to the first non-differential codebook; and
a differential PMI calculating unit, configured to, after the reference PMI is obtained by the reference PMI calculating unit, calculate the differential PMI based on the preset criterion and according to the first non-differential codebook, the first diagonal differential codebook, and the reference PMI; or
the PMI acquiring module comprises:
a reference PMI and differential PMI calculating unit, configured to calculate the reference PMI and the differential PMI based on the preset criterion and according to the first non-differential codebook and the first diagonal differential codebook.

21. The apparatus for acquiring a PMI according to claim 19, wherein the reference PMI and the differential PMI is used for obtaining, according to the reference PMI and the differential PMI, a Precoding Matrix (PM) by the data sending end using a second non-differential codebook and a second diagonal differential codebook pre-stored locally, wherein the second non-differential codebook and the second diagonal differential codebook are consistent with the first non-differential codebook and the first diagonal differential codebook respectively.

22. The apparatus for acquiring a PMI according to claim 19, wherein a codeword $C_k$ comprised in the first diagonal differential codebook has the following structure:

$$C_k = \mathrm{diag}\{e^{j\theta_{k,1}}, e^{j\theta_{k,2}}, \ldots, e^{j\theta_{k,i}}, \ldots, e^{j\theta_{k,N}}\}$$

where, k represents a differential PMI comprised in a first diagonal differential codebook D, k=0, 1 ... |D|−1, |D| represents the number of codewords comprised in the first diagonal differential codebook D, $j^2=-1$, N represents the number of transmitting antennas and is a positive integer, $\theta_{k,i}$ a phase shift, and i=1, 2 ... N.

23. The apparatus for acquiring a PMI according to claim 19, wherein when, in a dual-polarized transmitting antenna array comprising N transmitting antennas, the first N/2 transmitting antennas form a group of co-polarized transmitting antennas and the remaining N/2 transmitting antennas form another group of co-polarized transmitting antennas, a codeword $C_k$ comprised in the first diagonal differential codebook has the following structure:

$$C_k = \mathrm{diag}\{S_m, e^{j\phi_n} S_m\}$$

where, $S_m = \mathrm{diag}\{e^{j\theta_{m,1}}, e^{j\theta_{m,2}}, \ldots, e^{j\theta_{m,i}}, \ldots, e^{j\theta_{m,N/2}}\}$, k represents a differential PMI comprised in a first diagonal differential codebook D, k=0, 1 ... |D|−1, |D| represents the number of codewords comprised in the first diagonal differential codebook D, $j^2=-1$, N represents the number of transmitting antennas and is an even integer, $\phi_n$ and $\theta_{m,i}$ phase shifts, m and n are natural numbers, and i=1, 2 ... , N/2.

24. The apparatus for acquiring a PMI according to claim 19, wherein a codeword $W_{k'}^{(r)}$ comprised in the first non-differential codebook has the following structure:

$$W_{k'}^{(r)} = \frac{1}{\sqrt{r}}(R_{i_{k'}} H_{n,j_{k'}})^{(r)}$$

where, k' represents a non-differential PMI comprised in a first non-differential codebook $W^{(r)}$, k'=0, 1 ... |$W^{(r)}$|−1, |$W^{(r)}$| represents the number of codewords comprised in the first non-differential codebook $W^{(r)}$, r represents a rank of the codewords comprised in the first non-differential codebook $W^{(r)}$, $i_{k'}$ represents an index of a diagonal matrix $R_{i_{k'}}$ corresponding to k', $R_{i_{k'}}$ represents a $n^{th}$ order diagonal matrix corresponding to $i_{k'}$, $j_{k'}$ represents an index of a normalized Hadamard matrix corresponding to k', $H_{n,j_{k'}}$ represents a $n^{th}$ order normalized Hadamard matrix corresponding to $j_{k'}$, a value of n is equal to the number of the transmitting antennas, and $(R_{i_{k'}} H_{n,j_{k'}})^{(r)}$ represents a matrix formed by selecting r columns from a rotated Hadamard matrix $R_{i_{k'}} H_{n,j_{k'}}$; or
a codeword $W_{k'}^{(r)}$ comprised in the first non-differential codebook has the following structure:

$$W_{k'}^{(r)} = \frac{1}{\sqrt{r}}(R_{i_{k'}} H_{n,j_{k'}} R_{i_{k'}}^H)^{(r)}$$

where, k' represents a PMI comprised in a first non-differential codebook $W^{(r)}$, k'=0, 1 ... |$W^{(r)}$|−1, |$W^{(r)}$| represents the number of codewords comprised in the first non-differential codebook $W^{(r)}$, r represents a rank of the codewords comprised in the first non-differential codebook $W^{(r)}$, $i_{k'}$ represents an index of a diagonal matrix $R_{i_{k'}}$ corresponding to k', $R_{i_{k'}}$ represents a $n^{th}$ order diagonal matrix corresponding to $i_{k'}$, $j_{k'}$ represents an index of a normalized Hadamard matrix corresponding to k', $H_{n,j_{k'}}$ represents a $n^{th}$ order normalized Hadamard matrix corresponding to $j_{k'}$, a value of n is equal to the number of the transmitting antennas, and $(R_{i_{k'}} H_{n,j_{k'}} R_{i_{k'}}^H)^{(r)}$ represents a matrix formed by selecting r columns from a rotated Hadamard matrix $R_{i_{k'}} H_{n,j_{k'}} R_{i_{k'}}^H$; or
a codeword $W_{k'}^{(r)}$ comprised in the first non-differential codebook has the following structure:

$$W_{k'}^{(r)} = R_{i_{k'}} B_{n,j_{k'}}^{(r)}$$

where, k' represents a PMI comprised in a non-differential codebook $W^{(r)}$, k=0, 1 ... |$W^{(r)}$|−1, |$W^{(r)}$| represents the number of codewords comprised in the non-differential codebook $W^{(r)}$, r represents a rank of the codewords comprised in the non-differential codebook $W^{(r)}$, $i_{k'}$ represents an index of a diagonal matrix $R_{i_{k'}}$ corresponding to k', $R_{i_{k'}}$ represents a $n^{th}$ order diagonal matrix corresponding to $i_{k'}$, $B_{n,j_{k'}}^{(r)}$ represents a codeword in a non-differential codebook having a rank of r for n transmitting antennas and corresponding to an index $j_{k'}$, and $j_{k'}$ corresponds to k'.

25. An apparatus for acquiring a Precoding Matrix (PM), comprising:
a Precoding Matrix Indicator (PMI) receiving module, configured to receive a reference PMI and a differential PMI, wherein the reference PMI and the differential PMI are obtained according to a first non-differential codebook and a first diagonal differential codebook and then sent by a data receiving end, and a codeword comprised in the first diagonal differential codebook is a diagonal matrix; and a PM acquiring module, configured to, after the reference PMI and the differential PMI are received by the PMI receiving module, obtain a PM by using a second non-differential codebook and a second diagonal differential codebook pre-stored locally and according to the reference PMI and the differential PMI, wherein the second non-differential codebook and the second diagonal differential codebook are consistent with the first non-differential codebook and the first diagonal differential codebook respectively.

26. The apparatus for acquiring a PM according to claim 25, wherein for a Single User Multiple Input Multiple Output (SU-MIMO) system, the PM acquiring module comprises:

a codeword acquiring unit, configured to, after the reference PMI and the differential PMI are received by the PMI receiving module, obtain a codeword corresponding to the reference PMI through query from the second non-differential codebook according to the reference PMI, and obtain a codeword corresponding to the differential PMI through query from the second diagonal differential codebook according to the differential PMI; and a first PM acquiring unit, configured to, after the codeword corresponding to the differential PMI and the codeword corresponding to the reference PMI are obtained by the codeword acquiring unit, multiply the codeword corresponding to the reference PMI by the codeword corresponding to the differential PMI to obtain a multiplication result for use as the PM;

for a Multiple User Multiple Input Multiple Output (MU-MIMO) system, the PM acquiring module comprises:

a second PM acquiring unit, configured to, after the reference PMI and the differential PMI are received by the PMI receiving module, calculate the PM by using a Zero-Forcing Beam Forming (ZF-BF) algorithm or based on a maximum Signal-Leakage Plus Noise Ratio (SLNR) criterion and according to reference PMIs and differential PMIs of individual data receiving ends that are simultaneously paired.

27. The apparatus for acquiring a PM according to claim 25, wherein a codeword $C_k$ comprised in the first diagonal differential codebook has the following structure:

$$C_k = \text{diag}\{e^{j\theta_{k,1}}, e^{j\theta_{k,2}}, \ldots, e^{j\theta_{k,i}}, \ldots, e^{j\theta_{k,N}}\}$$

where, k' represents a differential PMI comprised in a first diagonal differential codebook D, k=0, 1, ..., |D|−1, |D| represents the number of codewords comprised in the first diagonal differential codebook D, $j^2=-1$, N represents the number of transmitting antennas and is a positive integer, $\theta_{k,i}$ represents a phase shift, and i=1, 2 ... N.

28. The apparatus for acquiring a PM according to claim 25, wherein when, in a dual-polarized transmitting antenna array comprising N transmitting antennas, the first N/2 transmitting antennas form a group of co-polarized transmitting antennas and the remaining N/2 transmitting antennas form another group of co-polarized transmitting antennas, a codeword $C_k$ comprised in the first diagonal differential codebook has the following structure:

$$C_k = \text{diag}\{S_m, e^{j\phi_n}S_m\}$$

where, $S_m = \text{diag}\{e^{j\theta_{m,1}}, e^{j\theta_{m,2}}, \ldots, e^{j\theta_{m,i}}, \ldots, e^{j\theta_{m,N/2}}\}$, k represents a differential PMI comprised in a first diagonal differential codebook D, k=0, 1 ... |D|−1, |D| represents the number of codewords comprised in the first diagonal differential codebook D, $j^2=-1$, N represents the number of transmitting antennas and is an even integer, $\phi_n$ and $\theta_{m,i}$ phase shifts, m and n are natural numbers, and i=1, 2 ..., N/2.

29. The apparatus for acquiring a PM according to claim 25, wherein a codeword $W_{k'}^{(r)}$ comprised in the first non-differential codebook has the following structure:

$$W_{k'}^{(r)} = \frac{1}{\sqrt{r}}(R_{i_{k'}}H_{n,j_{k'}})^{(r)}$$

where, k' represents a non-differential PMI comprised in a first non-differential codebook $W^{(r)}$, k'=0, 1 ... |$W^{(r)}$|−1, |$W^{(r)}$| represents the number of codewords comprised in the first non-differential codebook $W^{(r)}$, r represents a rank of the codewords comprised in the first non-differential codebook $W^{(r)}$, $i_{k'}$ represents an index of a diagonal matrix $R_{i_{k'}}$ corresponding to k', $R_{i_{k'}}$ represents a $n^{th}$ order diagonal matrix corresponding to $i_{k'}$, $j_{k'}$ represents an index of a normalized Hadamard matrix corresponding to k', $H_{n,j_{k'}}$ represents a $n^{th}$ order normalized Hadamard matrix corresponding to $j_{k'}$, a value of n is equal to the number of the transmitting antennas, and $(R_{i_{k'}}H_{n,j_{k'}})^{(r)}$ represents a matrix formed by selecting r columns from a rotated Hadamard matrix $R_{i_{k'}}H_{n,j_{k'}}$; or a codeword $W_{k'}^{(r)}$ comprised in the first non-differential codebook has the following structure:

$$W_{k'}^{(r)} = \frac{1}{\sqrt{r}}(R_{i_{k'}}H_{n,j_{k'}}R_{i_{k'}}^H)^{(r)}$$

where, k' represents a PMI comprised in a first non-differential codebook $W^{(r)}$, k'=0, 1 ... |$W^{(r)}$|−1, |$W^{(r)}$| represents the number of codewords comprised in the first non-differential codebook $W^{(r)}$, r represents a rank of the codewords comprised in the first non-differential codebook $W^{(r)}$, $i_{k'}$ represents an index of a diagonal matrix $R_{i_{k'}}$ corresponding to k', $R_{i_{k'}}$ represents a $n^{th}$ order diagonal matrix corresponding to $i_{k'}$, $j_{k'}$ represents an index of a normalized Hadamard matrix corresponding to k', $H_{n,j_{k'}}$ represents a $n^{th}$ order normalized Hadamard matrix corresponding to $j_{k'}$, a value of n is equal to the number of the transmitting antennas, and $(R_{i_{k'}}H_{n,j_{k'}}R_{i_{k'}}^H)^{(r)}$ represents a matrix formed by selecting r columns from a rotated Hadamard matrix $R_{i_{k'}}H_{n,j_{k'}}R_{i_{k'}}^H$; or a codeword $W_{k'}^{(r)}$ comprised in the first non-differential codebook has the following structure:

$$W_{k'}^{(r)} = R_{i_k}B_{n,j_{k'}}^{(r)}$$

where, k' represents a PMI comprised in a non-differential codebook $W^{(r)}$, k=0, 1 ... |$W^{(r)}$|−1, |$W^{(r)}$| represents the number of codewords comprised in the non-differential codebook $W^{(r)}$, r represents a rank of the codewords comprised in the non-differential codebook $W^{(r)}$, $i_{k'}$ represents an index of a diagonal matrix $R_{i_{k'}}$ corresponding to k', $R_{i_{k'}}$ represents a $n^{th}$ order diagonal matrix corresponding to $i_{k'}$, $B_{n,j_{k'}}^{(r)}$ represents a codeword in a non-differential codebook having a rank of r for n transmitting antennas and corresponding to an index $j_{k'}$, and $j_{k'}$ corresponds to k'.

30. The apparatus for acquiring a PM according to claim 25, wherein the reference PMI and the differential PMI are configured to indicate a PM $\hat{V}$, where the PM $\hat{V}=C_k W_n$, $C_k$ is a codeword in the first diagonal differential codebook when the differential PMI is k, $W_n$ is a codeword in the first non-differential codebook when the reference PMI is n.

\* \* \* \* \*